US012568360B2

(12) United States Patent (10) Patent No.: US 12,568,360 B2
Guo et al. (45) Date of Patent: Mar. 3, 2026

(54) METHOD FOR ESTABLISHING SECURE TRANSMISSION CHANNEL, KEY DETERMINING METHOD, AND COMMUNICATION APPARATUS

(71) Applicant: HUAWEI TECHNOLOGIES CO., LTD., Shenzhen (CN)

(72) Inventors: Longhua Guo, Shanghai (CN); Yuanping Zhu, Shanghai (CN); Rong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 18/427,313

(22) Filed: Jan. 30, 2024

(65) Prior Publication Data

US 2024/0171970 A1 May 23, 2024

Related U.S. Application Data

(63) Continuation of application No. PCT/CN2022/108633, filed on Jul. 28, 2022.

(30) Foreign Application Priority Data

Jul. 31, 2021 (CN) .......................... 202110877235.9

(51) Int. Cl.
*H04W 12/041* (2021.01)
*H04W 12/033* (2021.01)
(Continued)

(52) U.S. Cl.
CPC ....... *H04W 12/041* (2021.01); *H04W 12/033* (2021.01); *H04W 12/037* (2021.01); *H04W 12/08* (2013.01)

(58) Field of Classification Search
CPC ............. H04W 12/041; H04W 12/037; H04W 12/033; H04W 12/08; H04L 63/0272;
(Continued)

(56) References Cited

U.S. PATENT DOCUMENTS 10,172,042 B2 * 1/2019 Zhang ............... H04W 36/0058
10,455,414 B2 * 10/2019 Lee .......................... H04L 63/06
(Continued)

FOREIGN PATENT DOCUMENTS

CN 106375992 A 2/2017
CN 110365470 A 10/2019
(Continued)

OTHER PUBLICATIONS

"3rd Generation Partnership Project; Technical Specification Group Services and System Aspects; Study on Security for NR Integrated Access and Backhaul; (Release 17)," 3GPP TR 33.824 V0.9.0, total 21 pages, 3rd Generation Partnership Project, Valbonne, France (May 2021).
(Continued)

*Primary Examiner* — Samson B Lemma
(74) *Attorney, Agent, or Firm* — Leydig, Voit & Mayer, Ltd.

(57) ABSTRACT

This application provides a key determining method, and a communication apparatus. The method is applied to a donor node central unit which contains a control plane entity and a user plane entity, and the method includes: deriving a first key based on a root key, an internet protocol (IP) address of a distributed unit of an integrated access and backhaul node, and a first IP address of the user plane entity; and sending a first message to the user plane entity, wherein the first message comprises the first key. According to this applica-
(Continued)

tion, a user plane secure transmission channel may be established between the user plane entity and the distributed unit based on the first key.

20 Claims, 10 Drawing Sheets

(51) Int. Cl.
H04W 12/037 (2021.01)
H04W 12/08 (2021.01)

(58) Field of Classification Search
CPC ..... H04L 63/0435; H04L 63/166; H04L 9/08; H04L 9/0838
USPC .......................................................... 726/4
See application file for complete search history.

(56) References Cited

U.S. PATENT DOCUMENTS

| | | | | |
|---|---|---|---|---|
| 11,523,277 | B2 * | 12/2022 | Rajadurai | H04W 12/041 |
| 12,075,243 | B2 * | 8/2024 | Rajadurai | H04L 63/164 |
| 2013/0028139 | A1 * | 1/2013 | Sanneck | H04L 41/0803 |
| | | | | 370/254 |
| 2014/0160977 | A1 * | 6/2014 | Serbest | H04W 64/003 |
| | | | | 370/254 |
| 2016/0127897 | A1 * | 5/2016 | Lee | H04W 12/04 |
| | | | | 455/410 |
| 2020/0100102 | A1 * | 3/2020 | Xu | H04W 12/033 |
| 2020/0120725 | A1 * | 4/2020 | Mildh | H04W 76/12 |
| 2020/0396611 | A1 * | 12/2020 | Rajadurai | H04L 63/0869 |
| 2021/0058771 | A1 * | 2/2021 | Wu | H04L 9/0861 |
| 2021/0105622 | A1 | 4/2021 | Rajadurai | |
| 2023/0354023 | A1 * | 11/2023 | Rajadurai | H04W 12/08 |
| 2024/0106705 | A1 * | 3/2024 | Pauliac | H04L 41/0813 |

FOREIGN PATENT DOCUMENTS

| | | |
|---|---|---|
| CN | 112399409 A | 2/2021 |
| EP | 3751817 A1 | 12/2020 |
| WO | 2020164506 A1 | 8/2020 |

OTHER PUBLICATIONS

"3rd Generation Partnership Project; Technical Specification Group Services and System Aspects; Security architecture and procedures for 5G system (Release 16)," 3GPP TS 33.501 V16.7.1, total 255 pages, 3rd Generation Partnership Project, Valbonne, France (Jun. 2021).

Huawei, Hisilicon, "Security for CU-CP and CU-UP split," 3GPP TSG SA WG3 (Security) Meeting #90Bis, San Diego, USA, S3-180839, total 3 pages, 3rd Generation Partnership Project, Valbonne, France (Feb. 26-Mar. 2, 2018).

"3rd Generation Partnership Project; Technical Specification Group Radio Access Network; Evolved Universal Terrestrial Radio Access Network(E-UTRAN); X2 application protocol (X2AP) (Release 16)," 3GPP TS 36.423 V16.5.0, total 500 pages, 3rd Generation Partnership Project, Valbonne, France (Apr. 2021).

CATT, "Discussion on Security of Multi-CU-UP connectivity," 3GPP TSG-SA WG3 Meeting #97, Reno (US), S3-194138 revision of S3-19xabc, total 4 pages, 3rd Generation Partnership Project, Valbonne, France (Nov. 18-22, 2019).

"3rd Generation Partnership Project; Technical Specification Group Radio Access Network; NG-RAN; Architecture description (Release 16)," 3GPP TS 38.401 V16.5.0, total 79 pages, 3rd Generation Partnership Project, Valbonne, France (Apr. 2021).

Ericsson, "CU-UPs supported by DC," 3GPP TSG-SA3 Meeting #100bis-e, e-meeting, S3-202592 Revision of S3-20xxxx, total 2 pages, 3rd Generation Partnership Project, Valbonne, France (Oct. 12-16, 2020).

Huawei, "Discussions on Security handling for CP-UP separation of IAB-donor," 3GPP TSG-RAN WG3 Meeting #113-e, E-Meeting, R3-21xxxx, total 3 pages, 3rd Generation Partnership Project, Valbonne, France (Aug. 2021).

"3rd Generation Partnership Project; Technical Specification Group Services and System Aspects; Study on Security for NR Integrated Access and Backhaul; (Release 17)," 3GPP Standard; Technical Report; 3GPP TR 33.824 V0.9.0, 3rd Generation Partnership Project (3GPP), Mobile Competence Centre; 650, Route Des Lucioles; F-06921Sophia-Antipolis Cedex; France, Total 21 pages, XP052029404 (May 2021).

Huawei et al., "Security for CU-CP and CU-UP split," 3GPP TSG WG3 (Security) Meeting #90Bis, S3-180839 Security-for-CU-CP-and-CU -UP-Split, 3rd Generation Partnership Project, Mobile Competence Centre; 650, Route Des Lucioles; F-06921Sophia-Antipolis Cedex; France, San Diego, USA, XP051409251, Total 3 pages (Feb. 26-Mar. 2, 2018).

CATT, "Discussion on Security of Multi-CU-UP connectivity," 3GPP TSG-SA WG3 Meeting #97, S3-194138, 3rd Generation Partnership Project, Mobile Competence Centre; 650, Route Deslucioles; F-06921 Sophia-Antipolis Cedex; France, Total 4 pages (Nov. 18-22, 2019).

* cited by examiner

500

900

1000

1100

METHOD FOR ESTABLISHING SECURE TRANSMISSION CHANNEL, KEY DETERMINING METHOD, AND COMMUNICATION APPARATUS

CROSS-REFERENCE TO RELATED APPLICATIONS

This application is a continuation of International Application No. PCT/CN2022/108633, filed on Jul. 28, 2022, which claims priority to Chinese Patent Application No. 202110877235.9, filed on Jul. 31, 2021. The disclosures of the aforementioned applications are hereby incorporated by reference in their entireties.

TECHNICAL FIELD

Embodiments of this application relate to an integrated access and backhaul network, and in particular, to a method for establishing a secure transmission channel, a key determining method, and a communication apparatus.

BACKGROUND

To satisfy an ultra-high-capacity requirement of a 5th generation (5G) mobile communication system, high-frequency small cell networking becomes a mainstream. As high-frequency carriers have a poor propagation characteristic, severe attenuation due to blocking, and narrow coverage, a large quantity of small cells need to be densely deployed. An integrated access and backhaul (IAB) technology provides a thought to resolve the foregoing problem. A wireless transmission solution is used on both an access link and a backhaul link in an IAB network to avoid optical-fiber deployment.

As shown in FIG. 3 and FIG. 4, an F1 interface needs to be established between an IAB node and a donor node. To protect security of the F1 interface, an internet protocol (IP) security (IPsec) secure connection may be established between the IAB node and the IAB donor.

In the case of an architecture of separation between a control plane and a user plane of an IAB donor central unit, how to establish an IPsec secure connection between a distributed unit of the IAB node and a user plane entity of the IAB donor central unit becomes an urgent problem to be resolved.

SUMMARY

This application provides a method for establishing a secure transmission channel, to establish a user plane secure transmission channel between a user plane entity of a donor node central unit (donor-CU-UP) and a distributed unit of an IAB node (IAB-DU).

According to a first aspect, a method for establishing a secure transmission channel is provided. The method is applied to a donor-CU-UP, and the method includes: receiving a first message from a control plane entity of the donor node central unit (donor-CU-CP), where the first message includes a first key, the first key is different from a root key, and the root key is a key obtained by the donor-CU-CP from a network in a procedure in which the IAB node registers with the network; and establishing a user plane secure transmission channel between the donor-CU-UP and an IAB-DU based on the first key.

For example, in a procedure of establishing the user plane secure transmission channel by the donor-CU-UP and the IAB-DU, the first key is an authentication credential used by the donor-CU-UP and the IAB-DU.

For example, the first key is $K_{IAB}$, and the root key is $K_{gNB}$.

Based on the foregoing technical solution, the first message received by the donor-CU-UP from the donor-CU-CP includes the first key, to help the donor-CU-UP establish the user plane secure transmission channel between the donor-CU-UP and the IAB-DU based on the first key, and help avoid a problem of an authentication error generated when the donor-CU-UP and the IAB-DU establish the user plane secure transmission channel.

For example, the first message is a bearer context setup request message. For example, in a procedure in which a terminal device accesses the network via the IAB-DU, the donor-CU-CP sends the bearer context setup request message to the donor-CU-UP, where the bearer context setup request message includes the first key.

For another example, the first message is a bearer context modification request message. For example, in a procedure in which a terminal device accesses the network via the IAB-DU, the donor-CU-CP sends the bearer context modification request message to the donor-CU-UP, where the bearer context modification request message includes the first key.

With reference to the first aspect, in some implementations of the first aspect, the first message further includes a first IP address of the donor-CU-UP, and the method further includes: determining to establish the user plane secure transmission channel by using the first IP address of the donor-CU-UP; and determining the first key based on the first IP address.

Optionally, the first message further includes an IP address of the IAB-DU.

With reference to the first aspect, in some implementations of the first aspect, the first message includes a one-to-one correspondence between a plurality of internet protocol (IP) addresses of the donor-CU-UP and a plurality of keys, the plurality of keys include the first key, and the first key corresponds to a first IP address; and the method further includes: determining to establish the user plane secure transmission channel by using the first IP address of the donor-CU-UP; and determining the first key based on the first IP address.

Specifically, the donor-CU-UP determines, as the first key, a key that corresponds to the first IP address and that is in the plurality of keys included in the first message.

Based on the foregoing technical solution, when the donor-CU-UP has the plurality of IP addresses, the donor-CU-UP may receive the keys corresponding to the plurality of IP addresses, to help the donor-CU-UP establish different user plane secure transmission channels between the donor-CU-UP and the IAB-DU based on the plurality of keys and the plurality of IP addresses.

For example, the first message is the bearer context setup request message. For example, in a procedure in which a mobile termination of the IAB node (IAB-MT) accesses the network via a distributed unit of the donor node (donor-DU), the donor-CU-CP sends the bearer context setup request message to the donor-CU-UP, where the bearer context setup request message includes the one-to-one correspondence between the plurality of IP addresses of the donor-CU-UP and the plurality of keys. It should be understood that the donor-DU, the donor-CU-UP, and the donor-CU-CP belong to a same donor node, and the IAB-DU and the IAB-MT belong to a same IAB node.

Optionally, the first message further includes the IP address of the IAB-DU, and the plurality of keys all correspond to the IP address of the IAB-DU. In other words, each of the plurality of keys corresponds to one IP address of the donor-CU-UP and the IP address of the IAB-DU.

With reference to the first aspect, in some implementations of the first aspect, the method further includes: receiving first indication information from the donor-CU-CP; and sending the plurality of IP addresses of the donor-CU-UP to the donor-CU-CP based on the first indication information.

For example, the first indication information indicates that the IAB-DU belongs to the IAB node.

With reference to the first aspect, in some implementations of the first aspect, the method further includes: storing a correspondence between the first key and an IP address of the IAB-DU.

For example, the donor-CU-UP stores the correspondence between the first key and the IP address of the IAB-DU in a context of the donor-CU-UP.

With reference to the first aspect, in some implementations of the first aspect, the first message further includes the first indication information, and the first indication information indicates that the IAB-DU belongs to the IAB node.

Based on the foregoing technical solution, the donor-CU-UP determines, based on the first indication information, that the IAB-DU belongs to the IAB node, so that the first key included in the first message can be received and stored on demand.

According to a second aspect, a method for establishing a secure transmission channel is provided, where the method is applied to an IAB-DU, and the method includes: receiving a second message from a donor-CU-CP, where the second message includes a first IP address of a donor-CU-UP; sending a first request message to an IAB-MT, where the first request message requests a first key, the first key is different from a root key, the root key is a key generated by the IAB-MT in a procedure of registering with a network, and the first request message includes the first IP address; receiving a first response message from the IAB-MT, where the first response message includes the first key; and establishing a user plane secure transmission channel between the IAB-DU and the donor-CU-UP based on the first key.

For example, in a procedure of establishing the user plane secure transmission channel by the donor-CU-UP and the IAB-DU, the first key is an authentication credential used by the donor-CU-UP and the IAB-DU.

For example, the first key is $K_{IAB}$, and the root key is $K_{gNB}$.

Based on the foregoing technical solution, when receiving the first IP address of the donor-CU-UP, the IAB-DU sends the first IP address of the donor-CU-UP to the IAB-MT via the first request message, so that the IAB-MT can determine the first key based on the first IP address of the donor-CU-UP, and send the first key to the IAB-DU. When the IAB-DU receives the first key, this helps the IAB-DU establish the user plane secure transmission channel between the IAB-DU and the donor-CU-UP based on the first key, and helps avoid a problem of an authentication error generated when the donor-CU-UP and the IAB-DU establish the user plane secure transmission channel.

With reference to the second aspect, in some implementations of the second aspect, before the sending the first request message to the IAB-MT, the method further includes: receiving a user plane data request message from a terminal device, where the user plane secure transmission channel is for transmission of user plane data of the terminal device.

Based on the foregoing technical solution, the IAB-DU may request the first key from the IAB-MT on demand based on the user plane data request message.

With reference to the second aspect, in some implementations of the second aspect, before the sending the first request message to the IAB-MT, the method further includes: receiving an authentication request message from the donor-CU-UP, where the authentication request message is for establishing the user plane secure transmission channel.

Based on the foregoing technical solution, the IAB-DU may request the first key from the IAB-MT on demand based on the authentication request message.

With reference to the second aspect, in some implementations of the second aspect, the method further includes: storing a correspondence between the first key and the first IP address of the donor-CU-UP.

For example, the IAB-DU stores the correspondence between the first key and the first IP address of the donor-CU-UP in a context of the IAB-DU.

According to a third aspect, a method for establishing a secure transmission channel is provided, where the method is applied to an IAB-DU, and the method includes: receiving a second message from a donor-CU-CP, where the second message includes a first IP address of a donor-CU-UP; sending a second request message to an IAB-MT, where the second request message requests a root key, the root key is for generating a first key, the first key is different from the root key, and the root key is a key generated by the IAB-MT in a procedure of registering with a network; receiving a second response message from the IAB-MT, where the second response message includes the root key; deriving the first key based on the root key, an IP address of the IAB-DU, and the first IP address; and establishing a user plane secure transmission channel between the IAB-DU and the donor-CU-UP based on the first key.

For example, the IAB-DU derives the first key by using the root key as an input key and by using the IP address of the IAB-DU and the first IP address as input parameters.

For example, in a procedure of establishing the user plane secure transmission channel by the donor-CU-UP and the IAB-DU, the first key is an authentication credential used by the donor-CU-UP and the IAB-DU.

For example, the first key is $K_{IAB}$, and the root key is $K_{gNB}$.

Based on the foregoing technical solution, when receiving the first IP address of the donor-CU-UP, the IAB-DU obtains, from the IAB-MT, the root key for generating the first key, and may determine the first key based on the first IP address of the donor-CU-UP, the root key, and the IP address of the IAB-DU, to help the IAB-DU establish the user plane secure transmission channel between the IAB-DU and the donor-CU-UP based on the first key, and help avoid a problem of an authentication error generated when the donor-CU-UP and the IAB-DU establish the user plane secure transmission channel.

With reference to the third aspect, in some implementations of the third aspect, before the sending the second request message to the IAB-MT, the method further includes: receiving a user plane data request message from a terminal device, where the user plane secure transmission channel is for transmission of user plane data of the terminal device.

Based on the foregoing technical solution, the IAB-DU may request the root key of a donor node from the IAB-MT on demand based on the user plane data request message.

With reference to the third aspect, in some implementations of the third aspect, before the sending the second request message to the IAB-MT, the method further includes: receiving an authentication request message from the donor-CU-UP, where the authentication request message is for establishing the user plane secure transmission channel.

Based on the foregoing technical solution, the IAB-DU may request the root key of a donor node from the IAB-MT on demand based on the authentication request message.

With reference to the third aspect, in some implementations of the third aspect, the method further includes: storing a correspondence between the first key and the first IP address of the donor-CU-UP.

For example, the IAB-DU stores the correspondence between the first key and the first IP address of the donor-CU-UP in a context of the IAB-DU.

According to a fourth aspect, a key determining method is provided, where the method is applied to a donor-CU-CP, and the method includes: deriving a first key based on a root key, an IP address of an IAB-DU, and a first IP address of a donor-CU-UP, where the first key is different from the root key, and the root key is a key obtained by the donor-CU-CP from a network in a procedure in which an integrated access and backhaul node registers with the network; and sending a first message to the donor-CU-UP, where the first message includes the first key.

For example, the IAB-DU derives the first key by using the root key as an input key and by using the IP address of the IAB-DU and the first IP address as input parameters.

The first key is $K_{IAB}$, and the root key is $K_{gNB}$.

Based on the foregoing technical solution, the donor-CU-CP derives the first key based on the root key, the IP address of the IAB-DU, and the first IP address of the donor-CU-UP, and sends the first key to the donor-CU-UP via the first message, to help the donor-CU-UP be able to establish a user plane secure transmission channel between the donor-CU-UP and the IAB-DU based on the first key, and help avoid a problem of an authentication error generated when the donor-CU-UP and the IAB-DU establish the user plane secure transmission channel.

For example, the first message is a bearer context setup request message. For example, in a procedure in which a terminal device accesses the network via the IAB-DU, the donor-CU-CP sends the bearer context setup request message to the donor-CU-UP, where the bearer context request setup message includes the first key.

For another example, the first message is a bearer context modification request message. For example, in a procedure in which a terminal device accesses the network via the IAB-DU, the donor-CU-CP sends the bearer context modification request message to the donor-CU-UP, where the bearer context modification request message includes the first key.

Optionally, the first message further includes the first IP address of the donor-CU-UP.

Optionally, the first message further includes the IP address of the IAB-DU.

With reference to the fourth aspect, in some implementations of the fourth aspect, the method further includes: sending first indication information to the donor-CU-UP; and receiving one or more IP addresses from the donor-CU-UP, where the one or more IP addresses include the first IP address.

For example, the first indication information indicates that the IAB-DU belongs to the IAB node.

With reference to the fourth aspect, in some implementations of the fourth aspect, when the one or more IP addresses further include a second IP address, the method further includes: deriving a second key based on the root key, the IP address of the IAB-DU, and the second IP address, where the first message includes a correspondence between the first key and the first IP address and a correspondence between the second key and the second IP address.

Based on the foregoing technical solution, when the donor-CU-UP has the plurality of IP addresses, the donor-CU-UP may send the plurality of IP addresses to the donor-CU-CP based on the first indication information. Accordingly, the donor-CU-UP may receive keys corresponding to the plurality of IP addresses, to help the donor-CU-UP establish different user plane secure transmission channels between the donor-CU-UP and the IAB-DU based on the plurality of keys and the plurality of IP addresses.

For example, the first message is the bearer context setup request message. For example, in a procedure in which an IAB-MT accesses the network via a donor-DU, the donor-CU-CP sends the bearer context setup request message to the donor-CU-UP, where the bearer context setup request message includes a one-to-one correspondence between the plurality of IP addresses of the donor-CU-UP and the plurality of keys. It should be understood that the donor-DU, the donor-CU-UP, and the donor-CU-CP belong to a same donor node, and the IAB-DU and the IAB-MT belong to a same IAB node.

With reference to the fourth aspect, in some implementations of the fourth aspect, the method further includes: deriving a third key based on the root key, the IP address of the IAB-DU, and an IP address of the donor-CU-CP; and establishing a control plane secure transmission channel between the donor-CU-CP and the IAB-DU based on the third key.

For example, the donor-CU-CP derives the third key by using the root key as an input key and by using the IP address of the IAB-DU and the IP address of the donor-CU-CP as input parameters.

Based on the foregoing technical solution, the donor-CU-CP may further derive the third key for establishing the control plane secure transmission channel between the donor-CU-CP and the IAB-DU, to effectively avoid a problem of an authentication error generated when the donor-CU-CP and the IAB-DU establish the control plane secure transmission channel.

With reference to the fourth aspect, in some implementations of the fourth aspect, the method further includes: determining, based on a first identifier in a context of the IAB-DU, that the IAB-DU belongs to the IAB node.

Based on the foregoing technical solution, the donor-CU-CP may derive the first key on demand based on the first identifier.

With reference to the fourth aspect, in some implementations of the fourth aspect, the method further includes, sending first indication information to the donor-CU-UP, where the first indication information indicates that the IAB-DU belongs to the IAB node.

Based on the foregoing technical solution, the donor-CU-CP sends the first indication information to the donor-CU-UP, so that the donor-CU-UP can receive and store the first key on demand based on the first indication information.

According to a fifth aspect, a method for establishing a secure transmission channel is provided, where the method includes: A donor-CU-UP receives first information from a donor-CU-CP. The donor-CU-UP determines a first key based on the first information, where the first key is different from a root key, and the root key is a key obtained by the donor-CU-CP from a network in a procedure in which an IAB node registers with the network. The donor-CU-UP sets up a user plane secure transmission channel between the donor-CU-UP and the IAB node based on the first key.

For example, in a procedure of establishing a user plane secure transmission channel by the donor-CU-UP and an IAB-DU, the first key is an authentication credential used by the donor-CU-UP and the IAB-DU.

For example, the first key is $K_{IAB}$, and the root key is $K_{gNB}$.

Based on the foregoing technical solution, the donor-CU-UP determines the first key based on the received first information, to help the donor-CU-UP and the IAB-DU establish the user plane secure transmission channel based on the first key, and help avoid a problem of an authentication error generated when the donor-CU-UP and the IAB-DU establish the user plane secure transmission channel.

For example, the first information is carried in a bearer context modification request message. For example, in a procedure in which an IAB-MT accesses the network via a donor-DU, the donor-CU-CP sends the bearer context modification request message to the donor-CU-UP, where the bearer context modification request message includes the first information. It should be understood that the donor-DU, the donor-CU-UP, and the donor-CU-CP belong to a same donor node, and the IAB-DU and the IAB-MT belong to a same IAB node.

With reference to the fifth aspect, in some implementations of the fifth aspect, the first information includes at least one of the following: an intermediate key, or a user plane key that is used between the donor node and the IAB node, where the intermediate key and the user plane key are for determining the first key.

The donor node includes the donor-CU-CP and the donor-CU-UP, and the LAB node includes the IAB-DU.

With reference to the fifth aspect, in some implementations of the fifth aspect, the first information includes the intermediate key, the intermediate key includes any one of the following: a random number, or a key that is determined based on the root key and a second parameter, where the second parameter includes one or more of the following: a physical cell identifier, an absolute radio frequency channel number-downlink, a secondary node count, a constant, or a freshness parameter. That the donor-CU-UP determines a first key based on the first information includes: The donor-CU-UP derives the first key based on the intermediate key, an IP address of the IAB-DU, and an IP address of the donor-CU-UP.

For example, the donor-CU-UP derives the first key by using the intermediate key as an input key and by using the IP address of the IAB-DU and the IP address of the donor-CU-UP as input parameters.

Based on the foregoing technical solution, the donor-CU-UP derives the first key based on the intermediate key, so that input keys for deriving the user plane key, signaling plane key, and the first key can be kept independent of each other, and data transmission security is ensured.

With reference to the fifth aspect, in some implementations of the fifth aspect, the first information includes the user plane key. That the donor-CU-UP determines a first key based on the first information includes: The donor-CU-UP derives the first key based on the user plane key, an IP address of the IAB-DU, and an IP address of the donor-CU-UP.

For example, the donor-CU-UP derives the first key by using the user plane key as an input key and by using the IP address of the IAB-DU and the IP address of the donor-CU-UP as input parameters.

Based on the foregoing technical solution, the donor-CU-UP derives the first key based on the user plane key, no additional signaling transmission is needed, and management and implementation of the first key are simplified.

With reference to the fifth aspect, in some implementations of the fifth aspect, the first information includes the user plane key. That the donor-CU-UP determines a first key based on the first information includes: The donor-CU-UP determines a fourth key based on the user plane key. The donor-CU-UP derives the first key based on the fourth key, an IP address of the IAB-DU, and an IP address of the donor-CU-UP.

For example, the donor-CU-UP derives the first key by using the fourth key as an input key and by using the IP address of the IAB-DU and the IP address of the donor-CU-UP as input parameters.

With reference to the fifth aspect, in some implementations of the fifth aspect, the method further includes: storing a correspondence between the first key and the IP address of the IAB-DU.

For example, the donor-CU-UP stores the correspondence between the first key and the IP address of the IAB-DU in a context of the donor-CU-UP.

With reference to the fifth aspect, in some implementations of the fifth aspect, the method further includes: The donor-CU-UP receives first indication information; and determines the first key based on the first information when receiving the first indication information.

For example, the first indication information indicates that the IAB-DU belongs to the IAB node.

Based on the foregoing technical solution, the donor-CU-UP may determine, based on the first indication information, that the IAB-DU belongs to the IAB node, so that the first key can be derived based on the first information on demand.

According to a sixth aspect, a method for establishing a secure transmission channel is provided, where the method includes: An IAB-DU receives a second message from a donor-CU-CP, where the second message includes an IP address of a donor-CU-UP. The IAB-DU sends a third request message to an IAB-MT, where the third request message requests second information. The IAB-DU receives a third response message from the IAB-MT, where the third response message includes the second information. The IAB-DU determines a first key based on the second information, where the first key is different from a root key, and the root key is a key generated by the IAB-MT in a procedure of registering with a network. The IAB-DU establishes a user plane secure transmission channel between the IAB-DU and the donor-CU-UP based on the first key:

For example, in a procedure of establishing the user plane secure transmission channel by the donor-CU-UP and the IAB-DU, the first key is an authentication credential used by the donor-CU-UP and the IAB-DU.

For example, the first key is $K_{IAB}$, and the root key is $K_{gNB}$.

Based on the foregoing technical solution, when receiving the IP address of the donor-CU-UP, the IAB-DU obtains the second information from the IAB-MT, and the IAB-DU determines the first key based on the received second information, to help the donor-CU-UP establish the user plane secure transmission channel between the donor-CU-UP and the IAB-DU based on the first key, and help avoid a problem of an authentication error generated when the donor-CU-UP and the JAB-DU establish the user plane secure transmission channel.

With reference to the sixth aspect, in some implementations of the sixth aspect, the second information includes at least one of the following: an intermediate key, the root key and a second parameter, or a user plane key used between a donor node and an IAB node, where the intermediate key and the user plane key are for determining the first key, the second parameter is for determining the intermediate key, and the second parameter includes one or more of the following: a physical cell identifier, an absolute radio frequency channel number-downlink, a secondary node count, a constant, or a freshness parameter.

The donor node includes the donor-CU-CP and the donor-CU-UP, and the IAB node includes the IAB-DU.

With reference to the sixth aspect, in some implementations of the sixth aspect, the second information includes the intermediate key, and the intermediate key includes any one of the following: a random number, or a key that is determined based on the root key and the second parameter. That the IAB-DU determines a first key based on the second information includes: The IAB-DU derives the first key based on the intermediate key, an IP address of the IAB-DU, and the IP address of the donor-CU-UP.

For example, the IAB-DU derives the first key by using the intermediate key as an input key and by using the IP address of the IAB-DU and the IP address of the donor-CU-UP as input parameters.

Based on the foregoing technical solution, the IAB-DU derives the first key based on the intermediate key, so that input keys for deriving the user plane key, signaling plane key, and the first key can be kept independent of each other, and data transmission security is ensured.

With reference to the sixth aspect, in some implementations of the sixth aspect, the second information includes the user plane key. That the IAB-DU determines a first key based on the second information includes: The IAB-DU derives the first key based on the user plane key, an IP address of the IAB-DU, and the IP address of the donor-CU-UP.

For example, the IAB-DU derives the first key by using the user plane key as an input key and by using the IP address of the IAB-DU and the IP address of the donor-CU-UP as input parameters.

Based on the foregoing technical solution, the IAB-DU derives the first key based on the user plane key, no additional signaling transmission is needed, and management and implementation of the first key are simplified.

With reference to the sixth aspect, in some implementations of the sixth aspect, the second information includes the user plane key. That the IAB-DU determines a first key based on the second information includes: The IAB-DU determines a fourth key based on the user plane key. The IAB-DU derives the first key based on the fourth key, an IP address of the IAB-DU, and the IP address of the donor-CU-UP.

For example, the IAB-DU derives the first key by using the fourth key as an input key and by using the IP address of the IAB-DU and the IP address of the donor-CU-UP as input parameters.

With reference to the sixth aspect, in some implementations of the sixth aspect, before the IAB-DU sends the third request message to the IAB-MT, the method further includes: The IAB-DU receives a user plane data request message from a terminal device, where the user plane secure transmission channel is for transmission of user plane data of the terminal device.

Based on the foregoing technical solution, the IAB-DU may request the second information from the IAB-MT on demand based on the user plane data request message.

With reference to the sixth aspect, in some implementations of the sixth aspect, before the IAB-DU sends the third request message to the IAB-MT, the method further includes: The IAB-DU receives an authentication request message from the donor-CU-UP, where the authentication request message is for establishing the user plane secure transmission channel.

Based on the foregoing technical solution, the IAB-DU may request the second information from the IAB-MT on demand based on the authentication request message.

With reference to the sixth aspect, in some implementations of the sixth aspect, the method further includes: The IAB-DU stores a correspondence between the first key and the IP address of the donor-CU-UP.

For example, the IAB-DU stores the correspondence between the first key and the IP address of the donor-CU-UP in a context of the IAB-DU.

According to a seventh aspect, a key determining method is provided, where the method includes: An IAB-MT receives a third request message from an IAB-DU, where the third request message requests second information, the second information is for determining a first key, the first key is different from a root key, and the root key is a key generated in a procedure in which the IAB-MT registers with a network. The IAB-MT sends a third response message to the IAB-DU, where the third response message includes the second information.

For example, the first key is $K_{IAB}$, and the root key is $K_{gNB}$.

Based on the foregoing technical solution, the IAB-MT sends the second information to the IAB-DU based on the third request message, so that the IAB-DU can determine the first key based on the second information, to help the IAB-DU establish a user plane secure transmission channel between the IAB-DU and a donor-CU-UP based on the first key.

With reference to the seventh aspect, in some implementations of the seventh aspect, the second information includes at least one of the following: an intermediate key, the root key and a second parameter, or a user plane key used between a donor node and an IAB node, where the intermediate key and the user plane key are for determining the first key, the second parameter is for determining the intermediate key, and the second parameter includes one or more of the following: a physical cell identifier, an absolute radio frequency channel number-downlink, a secondary node count, a constant, or a freshness parameter.

The donor node includes a donor-CU-CP and the donor-CU-UP, and the IAB node includes the IAB-DU.

With reference to the seventh aspect, in some implementations of the seventh aspect, the intermediate key includes any one of the following: a random number, or a key that is determined based on the root key and the second parameter. The method further includes: The IAB-MT receives a fourth message from the donor-CU-CP, where the fourth message includes the intermediate key or the second parameter.

For example, when the second parameter for deriving the intermediate key includes a parameter unknown to the IAB-MT, the donor-CU-CP sends the fourth message to the IAB-MT. Optionally, the fourth message includes the parameter that is in the second parameter for deriving the intermediate key and that is unknown to the IAB-MT.

For another example, if the intermediate key is the random number, the donor-CU-CP sends the fourth message to the IAB-MT, where the fourth message includes the intermediate key.

For example, the fourth message is a radio resource control (RRC) reconfiguration message sent by the donor-CU-CP to the IAB-MT in a procedure in which the IAB-MT accesses the network via a donor-DU. It should be understood that the donor-DU and the donor-CU-CP belong to a same donor node.

According to an eighth aspect, a key determining method is provided, where the method includes: An IAB-MT receives a first request message from an IAB-DU, where the first request message requests a first key, the first key is different from a root key, the root key is a key generated by the IAB-MT in a procedure of registering with a network, and the first request message includes an IP address of a donor-CU-UP. The IAB-MT derives the first key based on an intermediate key, an IP address of the IAB-DU, and the IP address of the donor-CU-UP. The IAB-MT sends a first response message to the IAB-DU, where the first response message includes the first key.

For example, the IAB-MT derives the first key by using the intermediate key as an input key and by using the IP address of the IAB-DU and the IP address of the donor-CU-UP as input parameters.

For example, the first key is $K_{IAB}$, and the root key is $K_{gNB}$.

Based on the foregoing technical solution, the IAB-MT derives the first key based on the IP address that is of the donor-CU-UP and that is included in the first request message, and sends the first key to the IAB-DU, so that the IAB-DU can establish a user plane secure transmission channel between the IAB-DU and the donor-CU-UP based on the first key.

In addition, the IAB-MT derives the first key based on the intermediate key, so that input keys for deriving a user plane key, signaling plane key, and the first key can be kept independent of each other, and data transmission security is ensured.

With reference to the eighth aspect, in some implementations of the eighth aspect, the intermediate key includes any one of the following: a random number, or a key that is determined based on the root key and a second parameter, where the second parameter includes one or more of the following: a physical cell identifier, an absolute radio frequency channel number-downlink, a secondary node count, a constant, or a freshness parameter.

The donor node includes a donor-CU-CP and the donor-CU-UP.

With reference to the eighth aspect, in some implementations of the eighth aspect, the intermediate key includes the key determined based on the root key and the second parameter. The method further includes: The IAB-MT receives a fourth message from the donor-CU-CP, where the fourth message includes the intermediate key or the second parameter.

For example, when the second parameter for deriving the intermediate key includes a parameter unknown to the IAB-MT, the donor-CU-CP sends the fourth message to the IAB-MT. Optionally, the fourth message includes the intermediate key or the parameter that is in the second parameter for deriving the intermediate key and that is unknown to the IAB-MT.

For example, the fourth message is an RRC reconfiguration message sent by the donor-CU-CP to the IAB-MT in a procedure in which the IAB-MT accesses the network via a donor-DU. It should be understood that the donor-DU and the donor-CU-CP belong to a same donor node.

With reference to the eighth aspect, in some implementations of the eighth aspect, the intermediate key includes the random number. The method further includes: The IAB-MT receives a fourth message from the donor-CU-CP, where the fourth message includes the intermediate key.

According to a ninth aspect, a key determining method is provided, where the method includes: An IAB-MT receives a first request message from an IAB-DU, where the first request message requests a first key, the first key is different from a root key, the root key is a key generated by the IAB-MT in a procedure of registering with a network, and the first request message includes an IP address of a donor-CU-UP. The IAB-MT derives the first key based on a user plane key, an IP address of the IAB-DU, and an IP address of the donor-CU-UP, where the user plane key is a user plane key used between a donor node and an IAB node. The IAB-MT sends a first response message to the IAB-DU, where the first response message includes the first key.

For example, the JAB-MT derives the first key by using the user plane key as an input key and by using the IP address of the IAB-DU and the IP address of the donor-CU-UP as input parameters.

For example, the first key is $K_{IAB}$, and the root key is $K_{gNB}$.

Based on the foregoing technical solution, the IAB-MT derives the first key based on the IP address that is of the donor-CU-UP and that is included in the first request message, and sends the first key to the IAB-DU, so that the IAB-DU can establish a user plane secure transmission channel between the IAB-DU and the donor-CU-UP based on the first key.

In addition, the IAB-MT derives the first key based on the user plane key, no additional signaling transmission is needed, and management and implementation of the first key are simplified.

According to a tenth aspect, a key determining method is provided, where the method includes: An IAB-MT receives a first request message from an IAB-DU, where the first request message requests a first key, the first key is different from a root key, the root key is a key generated by the IAB-MT in a procedure of registering with a network, and the first request message includes an IP address of a donor-CU-UP. The IAB-MT determines a fourth key based on a user plane key, where the user plane key is a user plane key used between a donor node and an IAB node. The IAB-MT derives the first key based on the fourth key, an IP address of the IAB-DU, and the IP address of the donor-CU-UP. The IAB-MT sends a first response message to the IAB-DU, where the first response message includes the first key.

For example, the IAB-MT derives the first key by using the fourth key as an input key and by using the IP address of the IAB-DU and the IP address of the donor-CU-UP as input parameters.

For example, the first key is $K_{IAB}$, and the root key is $K_{gNB}$.

Based on the foregoing technical solution, the IAB-MT derives the first key based on the IP address that is of the donor-CU-UP and that is included in the first request message, and sends the first key to the IAB-DU, so that the IAB-DU can establish a user plane secure transmission channel between the IAB-DU and the donor-CU-UP based on the first key.

In addition, the IAB-MT derives the first key based on the fourth key derived from the user plane key, no additional signaling transmission is needed, and management and implementation of the first key are simplified.

According to an eleventh aspect, a key determining method is provided, where the method includes: A donor-CU-CP determines first information, where the first information is for determining a first key, the first key is different from a root key, and the root key is a key obtained by the donor-CU-CP from a network in a procedure in which an IAB node registers with the network. The donor-CU-CP sends the first information to a donor-CU-UP.

For example, the first key is $K_{IAB}$, and the root key is $K_{gNB}$.

Based on the foregoing technical solution, the donor-CU-CP sends the first information to the donor-CU-UP, so that the donor-CU-UP determines the first key based on the received first information, to help the donor-CU-UP establish a user plane secure transmission channel between the donor-CU-UP and an IAB-DU based on the first key, and help avoid a problem of an authentication error generated when the donor-CU-UP and the IAB-DU establish the user plane secure transmission channel.

For example, the first information is carried in a bearer context modification request message. For example, in a procedure in which an IAB-MT accesses the network via a donor-DU, the donor-CU-CP sends the bearer context modification request message to the donor-CU-UP, where the bearer context modification request message includes the first information. It should be understood that the donor-DU, the donor-CU-UP, and the donor-CU-CP belong to a same donor node, and the IAB-DU and the IAB-MT belong to a same IAB node.

With reference to the eleventh aspect, in some implementations of the eleventh aspect, the first information includes at least one of the following: an intermediate key, or a user plane key that is used between a donor node and the IAB node, where the intermediate key and the user plane key are for determining the first key.

With reference to the eleventh aspect, in some implementations of the eleventh aspect, the first information includes the intermediate key, and the intermediate key includes a key determined based on the root key and a second parameter. That the donor-CU-CP determines the first information includes: The donor-CU-CP derives the intermediate key based on the root key and the second parameter, where the second parameter includes one or more of the following: a physical cell identifier, an absolute radio frequency channel number-downlink, a secondary node count, a constant, or a freshness parameter.

For example, the donor-CU-CP derives the intermediate key by using the root key as an input key and by using the second parameter as an input parameter.

With reference to the eleventh aspect, in some implementations of the eleventh aspect, the method further includes: The donor-CU-CP sends a fourth message to the IAB-MT, where the fourth message includes the intermediate key or the second parameter.

For example, when the second parameter for deriving the intermediate key includes a parameter unknown to the IAB-MT, the donor-CU-CP sends the fourth message to the IAB-MT. Optionally, the fourth message includes the parameter that is in the second parameter for deriving the intermediate key and that is unknown to the IAB-MT.

For example, the fourth message is an RRC reconfiguration message sent by the donor-CU-CP to the IAB-MT in a procedure in which the IAB-MT accesses the network via the donor-DU. It should be understood that the donor-DU and the donor-CU-CP belong to a same donor node.

With reference to the eleventh aspect, in some implementations of the eleventh aspect, the first information includes the intermediate key, and the intermediate key includes a random number. That the donor-CU-CP determines the first information includes: The donor-CU-CP generates the random number.

With reference to the eleventh aspect, in some implementations of the eleventh aspect, the method further includes: The donor-CU-CP sends a fourth message to the IAB-MT, where the fourth message includes the intermediate key.

With reference to the eleventh aspect, in some implementations of the eleventh aspect, the first information includes the user plane key. That the donor-CU-CP determines the first information includes: The donor-CU-CP derives the user plane key based on the root key.

With reference to the eleventh aspect, in some implementations of the eleventh aspect, the method further includes: The donor-CU-CP receives second indication information, where the second indication information indicates that the IAB-DU belongs to the IAB node.

Based on the foregoing technical solution, the donor-CU-CP may determine the first information on demand based on the second indication information.

For example, the donor-CU-CP receives the second indication information from the IAB-MT, where the second indication information is an "IAB-indication" information element. In the procedure in which the IAB-MT accesses the network via the donor-DU, the IAB-MT sends the "IAB-indication" information element to the donor-CU-UP via the donor-DU.

For another example, the donor-CU-CP receives the second indication information from a core network element, where the second indication information is an "IAB-authorized" information element. In the procedure in which the IAB-MT accesses the network via the donor-DU, after authentication between the IAB-MT and a core network is completed, an initial context setup request message sent by an AMF to the donor-CU-CP includes the "IAB-authorized" information element.

With reference to the eleventh aspect, in some implementations of the eleventh aspect, the method further includes: The donor-CU-CP sends first indication information to the donor-CU-UP.

For example, the first indication information indicates that the IAB-DU belongs to the IAB node.

Based on the foregoing technical solution, the donor-CU-CP sends the first indication information to the donor-CU-UP, so that the donor-CU-UP can determine the first key based on the first information on demand.

According to a twelfth aspect, a communication apparatus is provided, where the communication apparatus includes a transceiver unit and a processing unit. The transceiver unit receives a first message from a donor-CU-CP, where the first message includes a first key, the first key is different from a root key, and the root key is a key obtained by the donor-CU-CP from a network in a procedure in which an IAB node registers with the network. The processing unit is configured to establish a user plane secure transmission channel between the donor-CU-UP and an IAB-DU based on the first key.

For example, in a procedure of establishing the user plane secure transmission channel by the communication apparatus and the IAB-DU, the first key is an authentication credential used by the communication apparatus and the IAB-DU.

For example, the first key is $K_{IAB}$, and the root key is $K_{gNB}$.

For example, the first message is a bearer context setup request message. For example, in a procedure in which a terminal device accesses the network via the IAB-DU, the donor-CU-CP sends the bearer context setup request message to the communication apparatus, where the bearer context setup request message includes the first key.

For another example, the first message is a bearer context modification request message. For example, in a procedure in which a terminal device accesses the network via the IAB-DU, the donor-CU-CP sends the bearer context modification request message to the communication apparatus, where the bearer context modification request message includes the first key.

With reference to the twelfth aspect, in some implementations of the twelfth aspect, the first message further includes a first IP address of the donor-CU-UP. The processing unit is further configured to determine to establish the user plane secure transmission channel by using the first IP address of the donor-CU-UP. The processing unit is further configured to determine the first key based on the first IP address.

Optionally, the first message further includes an IP address of the IAB-DU.

With reference to the twelfth aspect, in some implementations of the twelfth aspect, the first message includes a one-to-one correspondence between a plurality of IP addresses of the donor-CU-UP and a plurality of keys, the plurality of keys include the first key, and the first key corresponds to a first IP address. The processing unit is further configured to determine to establish the user plane secure transmission channel by using the first IP address of the donor-CU-UP. The processing unit is further configured to determine the first key based on the first IP address.

For example, the first message is the bearer context setup request message. For example, in a procedure in which an IAB-MT accesses the network via a donor-DU, the donor-CU-CP sends the bearer context setup request message to the communication apparatus, where the bearer context setup request message includes the plurality of keys and the plurality of IP addresses.

Optionally, the first message further includes the IP address of the IAB-DU, and the plurality of keys all correspond to the IP address of the IAB-DU. In other words, each of the plurality of keys corresponds to one IP address of the donor-CU-UP and the IP address of the IAB-DU.

With reference to the twelfth aspect, in some implementations of the twelfth aspect, the transceiver unit is further configured to receive first indication information from the donor-CU-CP. The transceiver unit is further configured to send the plurality of IP addresses of the donor-CU-UP to the donor-CU-CP based on the first indication information.

For example, the first indication information indicates that the IAB-DU belongs to the IAB node.

With reference to the twelfth aspect, in some implementations of the twelfth aspect, the processing unit is further configured to store a correspondence between the first key and an IP address of the IAB-DU.

With reference to the twelfth aspect, in some implementations of the twelfth aspect, the first message further includes the first indication information.

For example, the first indication information indicates that the IAB-DU belongs to the IAB node.

According to a thirteenth aspect, a communication apparatus is provided, where the communication apparatus includes a transceiver unit and a processing unit. The transceiver unit is configured to receive a second message from a donor-CU-CP, where the second message includes a first IP address of a donor-CU-UP; and send a first request message to an IAB-MT, where the first request message requests a first key, the first key is different from a root key, the root key is a key generated by the IAB-MT in a procedure of registering with a network, and the first request message includes the first IP address. The transceiver unit is further configured to receive a first response message from the IAB-MT, where the first response message includes the first key. The processing unit is configured to establish a user plane secure transmission channel between the IAB-DU and the donor-CU-UP based on the first key.

For example, in a procedure of establishing the user plane secure transmission channel by the donor-CU-UP and the communication apparatus, the first key is an authentication credential used by the donor-CU-UP and the communication apparatus.

For example, the first key is $K_{IAB}$, and the root key is $K_{gNB}$.

With reference to the thirteenth aspect, in some implementations of the thirteenth aspect, before sending the first request message to the IAB-MT, the transceiver unit is further configured to receive a user plane data request message from a terminal device, where the user plane secure transmission channel is for transmission of user plane data of the terminal device.

With reference to the thirteenth aspect, in some implementations of the thirteenth aspect, before sending the first request message to the IAB-MT, the transceiver unit is further configured to receive an authentication request message from the donor-CU-UP, where the authentication request message is for establishing the user plane secure transmission channel.

With reference to the thirteenth aspect, in some implementations of the thirteenth aspect, the processing unit is further configured to store a correspondence between the first key and the first IP address of the donor-CU-UP.

According to a fourteenth aspect, a communication apparatus is provided, where the communication apparatus includes a transceiver unit and a processing unit. The transceiver unit is configured to receive a second message from a donor-CU-CP, where the second message includes a first IP address of a donor-CU-UP. The transceiver unit is further configured to send a second request message to an IAB-MT, where the second request message requests a root key, the root key is for generating a first key, the first key is different from the root key, and the root key is a key generated by the IAB-MT in a procedure of registering with a network. The transceiver unit is further configured to receive a second response message from the IAB-MT, where the second response message includes the root key. The processing unit is configured to derive the first key based on the root key, an IP address of the IAB-DU, and the first IP address. The processing unit is further configured to establish a user plane secure transmission channel between the IAB-DU and the donor-CU-UP based on the first key.

For example, in a procedure of establishing the user plane secure transmission channel by the donor-CU-UP and the communication apparatus, the first key is an authentication credential used by the donor-CU-UP and the communication apparatus.

For example, the first key is $K_{IAB}$, and the root key is $K_{gNB}$.

With reference to the fourteenth aspect, in some implementations of the fourteenth aspect, before sending the second request message to the IAB-MT, the transceiver unit is further configured to receive a user plane data request message from a terminal device, where the user plane secure transmission channel is for transmission of user plane data of the terminal device.

With reference to the fourteenth aspect, in some implementations of the fourteenth aspect, before sending the second request message to the IAB-MT, the transceiver unit is further configured to receive an authentication request message from the donor-CU-UP, where the authentication request message is for establishing the user plane secure transmission channel.

With reference to the fourteenth aspect, in some implementations of the fourteenth aspect, the processing unit is further configured to store a correspondence between the first key and the first IP address of the donor-CU-UP.

According to a fifteenth aspect, a communication apparatus is provided, where the communication apparatus includes a transceiver unit and a processing unit. The processing unit is configured to derive a first key based on a root key, an IP address of an IAB-DU, and a first IP address of a donor-CU-UP, where the first key is different from the root key, and the root key is a key obtained by the donor-CU-CP from a network in a procedure in which an integrated access and backhaul node registers with the network. The transceiver unit is configured to send a first message to the donor-CU-UP, where the first message includes the first key.

For example, in a procedure of establishing a user plane secure transmission channel by the donor-CU-UP and an IAB-DU, the first key is an authentication credential used by the donor-CU-UP and the IAB-DU.

The first key is $K_{IAB}$, and the root key is $K_{gNB}$.

For example, the first message is a bearer context setup request message. For example, in a procedure in which a terminal device accesses the network via the IAB-DU, the transceiver unit sends the bearer context setup request message to the donor-CU-UP, where the bearer context setup request message includes the first key.

For another example, the first message is a bearer context modification request message. For example, in a procedure in which a terminal device accesses the network via the IAB-DU, the transceiver unit sends the bearer context modification request message to the donor-CU-UP, where the bearer context modification request message includes the first key.

Optionally, the first message further includes the first IP address of the donor-CU-UP.

Optionally, the first message further includes the IP address of the IAB-DU.

With reference to the fifteenth aspect, in some implementations of the fifteenth aspect, the transceiver unit is further configured to send first indication information to the donor-CU-UP. The transceiver unit is further configured to receive one or more IP addresses from the donor-CU-UP, where the one or more IP addresses include the first IP address.

For example, the first indication information indicates that the IAB-DU belongs to the IAB node.

With reference to the fifteenth aspect, in some implementations of the fifteenth aspect, when the one or more IP addresses further include a second IP address, the processing unit is further configured to derive a second key based on the root key, the IP address of the IAB-DU, and the second IP address, where the first message includes a correspondence between the first key and the first IP address and a correspondence between the second key and the second IP address.

For example, the first message is the bearer context setup request message. For example, in a procedure in which an IAB-MT accesses the network via a donor-DU, the donor-CU-CP sends the bearer context setup request message to the donor-CU-UP, where the bearer context setup request message includes a one-to-one correspondence between the plurality of keys and the plurality of IP addresses of the donor-CU-UP. It should be understood that the donor-DU, the donor-CU-UP, and the donor-CU-CP belong to a same donor node, and the IAB-DU and the IAB-MT belong to a same IAB node.

With reference to the fifteenth aspect, in some implementations of the fifteenth aspect, the processing unit is further configured to derive a third key based on the root key, the IP address of the IAB-DU, and an IP address of the communication apparatus. The processing unit is further configured to establish a control plane secure transmission channel between the donor-CU-CP and the IAB-DU based on the third key.

With reference to the fifteenth aspect, in some implementations of the fifteenth aspect, the processing unit is further configured to determine, based on a first identifier in a context of the IAB-DU, that the IAB-DU belongs to the IAB node.

With reference to the fifteenth aspect, in some implementations of the fifteenth aspect, the transceiver unit is further configured to send the first indication information to the donor-CU-UP, where the first indication information indicates that the IAB-DU belongs to the IAB node.

According to a sixteenth aspect, a communication apparatus is provided, where the communication apparatus includes a transceiver unit and a processing unit. The transceiver unit is configured to receive first information from a donor-CU-CP. The processing unit is configured to determine a first key based on the first information, where the first key is different from a root key, and the root key is a key obtained by the donor-CU-CP from a network in a procedure in which an IAB node registers with the network. The processing unit is further configured to establish a user plane secure transmission channel between the communication apparatus and the IAB node based on the first key.

For example, in a procedure of establishing a user plane secure transmission channel by the communication apparatus and an IAB-DU, the first key is an authentication credential used by the communication apparatus and the IAB-DU.

For example, the first key is $K_{IAB}$, and the root key is $K_{gNB}$.

For example, the first information is carried in a bearer context modification request message. For example, in a procedure in which an IAB-MT accesses the network via a donor-DU, the transceiver unit is configured to send the bearer context modification request message, where the bearer context modification message includes the first information.

With reference to the sixteenth aspect, in some implementations of the sixteenth aspect, the first information includes at least one of the following: an intermediate key and a user plane key that is used between the donor node and the IAB node, where the intermediate key and the user plane key are for determining the first key.

With reference to the sixteenth aspect, in some implementations of the sixteenth aspect, the first information includes the intermediate key, the intermediate key includes any one of the following: a random number and a key that is determined based on the root key and a second parameter, where the second parameter includes one or more of the following: a physical cell identifier, an absolute radio frequency channel number-downlink, a secondary node count, a constant, and a freshness parameter. The processing unit is specifically configured to derive the first key based on the intermediate key, an IP address of the IAB-DU, and an IP address of the communication apparatus.

With reference to the sixteenth aspect, in some implementations of the sixteenth aspect, the first information includes the user plane key. The processing unit is specifically configured to derive the first key based on the user plane key, an IP address of the IAB-DU, and an IP address of the communication apparatus.

With reference to the sixteenth aspect, in some implementations of the sixteenth aspect, the first information includes the user plane key. The processing unit is specifically configured to: determine a fourth key based on the user plane key; and derive the first key based on the fourth key, an IP address of the IAB-DU, and an IP address of the communication apparatus.

With reference to the sixteenth aspect, in some implementations of the sixteenth aspect, the processing unit is further configured to store a correspondence between the first key and the IP address of the IAB-DU.

With reference to the sixteenth aspect, in some implementations of the sixteenth aspect, the transceiver unit is further configured to receive first indication information.

For example, the first indication information indicates that the IAB-DU belongs to the IAB node.

According to a seventeenth aspect, a communication apparatus is provided, where the communication apparatus includes a transceiver unit and a processing unit. The transceiver unit is configured to receive a second message from a donor-CU-CP, where the second message includes an IP address of a donor-CU-UP. The transceiver unit is further configured to send a third request message to an IAB-MT, where the third request message requests second information. The transceiver unit is further configured to receive a third response message from the IAB-MT, where the third response message includes the second information. The processing unit is configured to determine a first key based on the second information, where the first key is different from a root key, and the root key is a key generated by the IAB-MT in a procedure of registering with a network. The processing unit is further configured to establish a user plane secure transmission channel between the communication apparatus and the donor-CU-UP based on the first key.

For example, in a procedure of establishing the user plane secure transmission channel by the donor-CU-UP and the communication apparatus, the first key is an authentication credential used by the donor-CU-UP and the communication apparatus.

For example, the first key is $K_{IAB}$, and the root key is $K_{gNB}$.

With reference to the seventeenth aspect, in some implementations of the seventeenth aspect, the second information includes at least one of the following: an intermediate key, the root key and a second parameter, and a user plane key used between a donor node and an IAB node, where the intermediate key and the user plane key are for determining the first key, the second parameter is for determining the intermediate key, and the second parameter includes one or more of the following: a physical cell identifier, an absolute radio frequency channel number-downlink, a secondary node count, a constant, and a freshness parameter.

With reference to the seventeenth aspect, in some implementations of the seventeenth aspect, the second information includes the intermediate key, and the intermediate key includes any one of the following: a random number and a key that is determined based on the root key and the second parameter. The processing unit is specifically configured to derive the first key based on the intermediate key, an IP address of the communication apparatus, and the IP address of the donor-CU-UP.

With reference to the seventeenth aspect, in some implementations of the seventeenth aspect, the second information includes the user plane key. The processing unit is specifically configured to derive the first key based on the user plane key, an IP address of the communication apparatus, and the IP address of the donor-CU-UP.

With reference to the seventeenth aspect, in some implementations of the seventeenth aspect, the second information includes the user plane key. The processing unit is specifically configured to: determine a fourth key based on the user plane key; and derive the first key based on the fourth key, an IP address of the communication apparatus, and the IP address of the donor-CU-UP.

With reference to the seventeenth aspect, in some implementations of the seventeenth aspect, before sending the third request message to the IAB-MT, the transceiver unit is further configured to receive a user plane data request message from a terminal device, where the user plane secure transmission channel is for transmission of user plane data of the terminal device.

With reference to the seventeenth aspect, in some implementations of the seventeenth aspect, before sending the third request message to the IAB-MT, the transceiver unit is further configured to receive an authentication request message from the donor-CU-UP, where the authentication request message is for establishing the user plane secure transmission channel.

With reference to the seventeenth aspect, in some implementations of the seventeenth aspect, the processing unit is further configured to store a correspondence between the first key and the IP address of the donor-CU-UP.

According to an eighteenth aspect, a communication apparatus is provided, where the communication apparatus includes a transceiver unit. The transceiver unit is configured to receive a third request message from an IAB-DU, where the third request message requests second information, the second information is for determining a first key, the first key is different from a root key, and the root key is a key generated in a procedure in which the communication apparatus registers with a network. The transceiver unit is further configured to send a third response message to the IAB-DU, where the third response message includes the second information.

For example, the first key is $K_{IAB}$, and the root key is $K_{gNB}$.

With reference to the eighteenth aspect, in some implementations of the eighteenth aspect, the second information includes at least one of the following: an intermediate key, the root key and a second parameter, and a user plane key used between a donor node and an IAB node, where the intermediate key and the user plane key are for determining the first key, the second parameter is for determining the intermediate key, and the second parameter includes one or more of the following, a physical cell identifier, an absolute radio frequency channel number-downlink, a secondary node count, a constant, and a freshness parameter.

With reference to the eighteenth aspect, in some implementations of the eighteenth aspect, the intermediate key includes any one of the following: a random number and a key that is determined based on the root key of the donor node and the second parameter. The transceiver unit is further configured to receive a fourth message from the donor-CU-CP, where the fourth message includes the intermediate key or the second parameter.

For example, when the second parameter for deriving the intermediate key includes a parameter unknown to the communication apparatus, the donor-CU-CP sends the fourth message. Optionally, the fourth message includes the parameter that is in the second parameter for deriving the intermediate key and that is unknown to the communication apparatus.

For another example, if the intermediate key is the random number, the donor-CU-CP sends the fourth message, where the fourth message includes the intermediate key.

For example, the fourth message is an RRC reconfiguration message sent by the donor-CU-CP in a procedure in which the communication apparatus accesses the network via a donor-DU. It should be understood that the donor-DU and the donor-CU-CP belong to a same donor node.

According to a nineteenth aspect, a communication apparatus is provided, where the communication apparatus includes a transceiver unit and a processing unit. The transceiver unit is configured to receive a first request message from an IAB-DU, where the first request message requests a first key, the first key is different from a root key, the root key is a key generated by the communication apparatus in a procedure of registering with a network, and the first request message includes an IP address of a donor-CU-UP. The processing unit is configured to derive the first key based on an intermediate key, an IP address of the IAB-DU, and the IP address of the donor-CU-UP. The transceiver unit is further configured to send a first response message to the IAB-DU, where the first response message includes the first key.

For example, the first key is $K_{IAB}$, and the root key is $K_{gNB}$.

With reference to the nineteenth aspect, in some implementations of the nineteenth aspect, the intermediate key includes any one of the following: a random number and a key that is determined based on the root key and a second parameter, where the second parameter includes one or more of the following: a physical cell identifier, an absolute radio frequency channel number-downlink, a secondary node count, a constant, and a freshness parameter.

With reference to the nineteenth aspect, in some implementations of the nineteenth aspect, the intermediate key includes the key determined based on the root key and the second parameter. The transceiver unit is further configured to receive a fourth message from the donor-CU-CP, where the fourth message includes the intermediate key or the second parameter.

For example, when the second parameter for deriving the intermediate key includes a parameter unknown to the communication apparatus, the donor-CU-CP sends the fourth message. Optionally, the fourth message includes the intermediate key or the parameter that is in the second parameter for deriving the intermediate key and that is unknown to the communication apparatus.

For example, the fourth message is an RRC reconfiguration message sent by the donor-CU-CP in a procedure in which the communication apparatus accesses the network via a donor-DU. It should be understood that the donor-DU and the donor-CU-CP belong to a same donor node.

With reference to the nineteenth aspect, in some implementations of the nineteenth aspect, the intermediate key includes the random number. The transceiver unit is further configured to receive a fourth message from the donor-CU-CP, where the fourth message includes the intermediate key.

According to a twentieth aspect, a communication apparatus is provided, where the communication apparatus includes a transceiver unit and a processing unit. The transceiver unit is configured to receive a first request message from an IAB-DU, where the first request message requests a first key, the first key is different from a root key, the root key is a key generated by the communication apparatus in a procedure of registering with a network, and the first request message includes an IP address of a donor-CU-UP. The processing unit is configured to derive the first key based on a user plane key, an IP address of the IAB-DU, and an IP address of the donor-CU-UP, where the user plane key is a user plane key used between a donor node and an IAB node. The transceiver unit is further configured to send a first response message to the IAB-DU, where the first response message includes the first key.

For example, the first key is $K_{IAB}$, and the root key is $K_{gNB}$.

According to a twenty-first aspect, a communication apparatus is provided, where the communication apparatus includes a transceiver unit and a processing unit. The transceiver unit is configured to receive a first request message from an IAB-DU, where the first request message requests a first key, the first key is different from a root key, the root key is a key generated by the communication apparatus in a procedure of registering with a network, and the first request message includes an IP address of a donor-CU-UP. The processing unit is configured to determine a fourth key based on a user plane key, where the user plane key is a user plane key used between a donor node and an IAB node. The processing unit is further configured to derive the first key based on the fourth key, an IP address of the IAB-DU, and the IP address of the donor-CU-UP. The transceiver unit is further configured to send a first response message to the IAB-DU, where the first response message includes the first key.

For example, the first key is $K_{IAB}$, and the root key is $K_{gNB}$.

According to a twenty-second aspect, a communication apparatus is provided, where the communication apparatus includes a transceiver unit and a processing unit. The processing unit is configured to determine first information, where the first information is for determining a first key, the first key is different from a root key, and the root key is a key obtained by the donor-CU-CP from a network in a procedure in which an IAB node registers with the network. The transceiver unit is configured to send the first information to a donor-CU-UP.

For example, the first key is $K_{IAB}$, and the root key is $K_{gNB}$.

For example, the first information is carried in a bearer context modification request message. For example, in a procedure in which an IAB-MT accesses the network via a donor-DU, the transceiver unit is configured to send the bearer context modification request message to the donor-CU-UP, where the bearer context modification message includes the first information.

With reference to the twenty-second aspect, in some implementations of the twenty-second aspect, the first information includes at least one of the following: an intermediate key and a user plane key that is used between a donor node and the IAB node, where the intermediate key and the user plane key are for determining the first key.

With reference to the twenty-second aspect, in some implementations of the twenty-second aspect, the first information includes the intermediate key, and the intermediate key includes a key determined based on the root key and a second parameter. The processing unit is specifically configured to derive the intermediate key based on the root key used as an input key and the second parameter, where the second parameter includes one or more of the following: a physical cell identifier, an absolute radio frequency channel number-downlink, a secondary node count, a constant, and a freshness parameter.

With reference to the twenty-second aspect, in some implementations of the twenty-second aspect, the transceiver unit is further configured to send a fourth message to the IAB-MT, where the fourth message includes the intermediate key or the second parameter.

For example, when the second parameter for deriving the intermediate key includes a parameter unknown to the IAB-MT, the transceiver unit is configured to send the fourth message to the IAB-MT. Optionally, the fourth message includes the parameter that is in the second parameter for deriving the intermediate key and that is unknown to the IAB-MT.

For example, the fourth message is an RRC reconfiguration message sent by the transceiver unit to the IAB-MT in a procedure in which the IAB-MT accesses the network via the donor-DU.

With reference to the twenty-second aspect, in some implementations of the twenty-second aspect, the first information includes the intermediate key, and the intermediate key includes a random number. The processing unit is specifically configured to generate the random number.

With reference to the twenty-second aspect, in some implementations of the twenty-second aspect, the transceiver unit is further configured to send a fourth message to the IAB-MT, where the fourth message includes the intermediate key.

With reference to the twenty-second aspect, in some implementations of the twenty-second aspect, the first information includes the user plane key. The processing unit is specifically configured to derive the user plane key based on the root key.

With reference to the twenty-second aspect, in some implementations of the twenty-second aspect, the transceiver unit is further configured to receive second indication information.

For example, the second indication information indicates that the IAB-DU belongs to the IAB node.

With reference to the twenty-second aspect, in some implementations of the twenty-second aspect, the transceiver unit is further configured to send first indication information to the donor-CU-UP.

For example, the first indication information indicates that the IAB-DU belongs to the IAB node.

According to a twenty-third aspect, this application provides a communication device, including a processor. The processor is coupled to a memory, and may be configured to execute instructions in the memory, to implement the method according to any one of the first aspect or the possible implementations of the first aspect, or implement the method according to any one of the fifth aspect or the possible implementations of the fifth aspect. The communication device further includes the memory. The communication device further includes a communication interface. The processor is coupled to the communication interface.

In an implementation, the communication device is a donor-CU-UP. When the communication device is the donor-CU-UP, the communication interface may be a transceiver or an input/output interface.

In another implementation, the communication device is a chip or a chip system configured in a donor-CU-UP. When the communication device is the chip or the chip system configured in the donor-CU-UP, the communication interface may be an input/output interface.

The transceiver may be a transceiver circuit. The input/output interface may be an input/output circuit.

According to a twenty-fourth aspect, this application provides a communication device, including a processor. The processor is coupled to a memory, and may be configured to execute instructions in the memory, to implement the method according to any one of the second aspect or the possible implementations of the second aspect, implement the method according to any one of the third aspect or the possible implementations of the third aspect, implement the method according to any one of the fifth aspect or the possible implementations of the fifth aspect, or implement the method according to any one of the sixth aspect or the possible implementations of the sixth aspect. The communication device further includes the memory. The communication device further includes a communication interface. The processor is coupled to the communication interface.

In an implementation, the communication device is an IAB-DU. When the communication device is the IAB-DU, the communication interface may be a transceiver or an input/output interface.

In another implementation, the communication device is a chip or a chip system configured in an IAB-DU. When the communication device is the chip or the chip system configured in the IAB-DU, the communication interface may be an input/output interface.

The transceiver may be a transceiver circuit. The input/output interface may be an input/output circuit.

According to a twenty-fifth aspect, this application provides a communication device, including a processor. The processor is coupled to a memory, and may be configured to execute instructions in the memory, to implement the method according to any one of the fourth aspect or the possible implementations of the fourth aspect, or implement the method according to any one of the eleventh aspect or the possible implementations of the eleventh aspect. The communication device further includes the memory. The communication device further includes a communication interface. The processor is coupled to the communication interface.

In an implementation, the communication device is a donor-CU-CP. When the communication device is the donor-CU-CP, the communication interface may be a transceiver or an input/output interface.

In another implementation, the communication device is a chip or a chip system configured in a donor-CU-CP. When the communication device is the chip or the chip system configured in the donor-CU-CP, the communication interface may be an input/output interface.

The transceiver may be a transceiver circuit. The input/output interface may be an input/output circuit.

According to a twenty-sixth aspect, this application provides a communication device, including a processor. The processor is coupled to a memory, and may be configured to execute instructions in the memory, to implement the method according to any one of the seventh aspect to the tenth aspect or the possible implementations of the seventh aspect to the tenth aspect. The communication device further includes the memory. The communication device further includes a communication interface. The processor is coupled to the communication interface.

In an implementation, the communication device is an IAB-MT. When the communication device is the IAB-MT, the communication interface may be a transceiver or an input/output interface.

In another implementation, the communication device is a chip or a chip system configured in an IAB-MT. When the communication device is the chip or the chip system configured in the IAB-MT, the communication interface may be an input/output interface.

The transceiver may be a transceiver circuit. The input/output interface may be an input/output circuit.

According to a twenty-seventh aspect, this application provides a processor, including an input circuit, an output circuit, and a processing circuit. The processing circuit is configured to receive a signal through the input circuit, and transmit a signal through the output circuit, so that the processor performs the methods in the foregoing aspects.

In a specific implementation procedure, the processor may be a chip, the input circuit may be an input pin, the output circuit may be an output pin, and the processing circuit may be a transistor, a gate circuit, a trigger, various logic circuits, and the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a twenty-eighth aspect, this application provides a processing apparatus, including a communication interface and a processor. The communication interface is coupled to the processor. The communication interface is configured to input and/or output information. The information includes at least one of instructions or data. The processor is configured to execute a computer program, so that the processing apparatus performs the methods in the foregoing aspects.

According to a twenty-ninth aspect, this application provides a processing apparatus, including a processor and a memory. The processor is configured to: read instructions stored in the memory, receive a signal by using a receiver, and transmit a signal by using a transmitter, so that the processing apparatus performs the methods in the foregoing aspects.

Optionally, there are one or more processors. If there is a memory, there may also be one or more memories.

Optionally, the memory and the processor may be integrated together, or the memory and the processor may be separately disposed.

In a specific implementation procedure, the memory may be a non-transitory memory such as a read-only memory (ROM). The memory and the processor may be integrated into a same chip, or may be separately disposed on different chips. A type of the memory and a manner in which the memory and the processor are disposed are not limited in this embodiment of this application.

It should be understood that in a related information exchange procedure, for example, sending indication information may be a procedure of outputting the indication information from the processor, and receiving the indication information may be a procedure of inputting the received indication information to the processor. Specifically, the information output by the processor may be output to the transmitter, and the input information received by the processor may be from the receiver. The transmitter and the receiver may be collectively referred to as a transceiver.

The apparatuses in the twenty-eighth aspect and the twenty-ninth aspect each may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, or may be located outside the processor and exist independently.

According to a thirtieth aspect, this application provides a computer program product. The computer program product includes a computer program (which may also be referred to as code or instructions). When the computer program is run, a computer is enabled to perform the methods in the foregoing aspects.

According to a thirty-first aspect, this application provides a computer-readable medium. The computer-readable medium stores a computer program (which may also be referred to as code or instructions). When the computer program is run on a computer, the computer is enabled to perform the methods in the foregoing aspects.

According to a thirty-second aspect, this application provides a communication system, including the foregoing donor-CU-UP, donor-CU-CP, IAB-MT, and IAB-DU.

DESCRIPTION OF EMBODIMENTS

Figure 1:
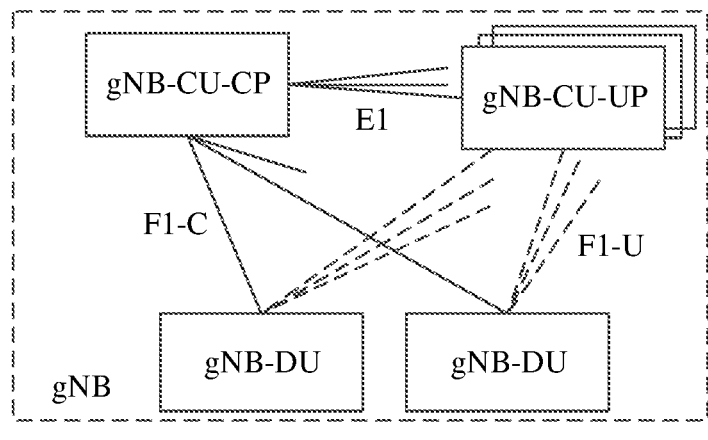
FIG. 1 is a schematic diagram of an architecture of separation between a next generation NodeB central unit control plane entity and a next generation NodeB central unit user plane entity.

The following describes technical solutions in this application with reference to accompanying drawings.

Embodiments of this application may be applied to various communication systems, for example, a wireless local area network (WLAN) system, a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, a satellite communication system, a 5th generation (5G) system, and a new communication system emerging in the future.

A terminal device in embodiments of this application may include various handheld devices, vehicle-mounted devices, wearable devices, or computing devices that have a wireless communication function, or other processing devices connected to a wireless modem. The terminal may be a mobile station (MS), a subscriber unit, user equipment (UE), a cellular phone, a smartphone, a wireless data card, a personal digital assistant (PDA) computer, a tablet computer, a wireless modem, a handset, a laptop computer, a machine type communication (MTC) terminal, or the like.

A network device in embodiments of this application may be a device configured to communicate with the terminal device. The network device may be a base transceiver station (BTS) in the global system for mobile communications (GSM) system or a code division multiple access (CDMA) system, a NodeB (NB) in the wideband code division multiple access (WCDMA) system, an evolved NodeB (eNB or eNodeB) in the LTE system, a new radio NodeB (NR NodeB, gNB), or a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program and that is in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) and a digital versatile disc (DVD)), a smart card, and a flash component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

In an NR technology, an access network device (for example, a gNB) may be constituted by one gNB central unit (CU) and one or more gNB distributed units (DUs). The gNB-CU and the gNB-DU are different logical nodes, and may be deployed on different physical devices or deployed on a same physical device.

If an architecture of separation between a control plane and a user plane is considered, the gNB-CU may be further divided into a central unit control plane (CU-CP) entity (which may also be referred to as a CU-CP node) and a central unit user plane (CU-UP) entity (which may also be referred to as a CU-UP node). The gNB-CU-CP is a control plane entity, and is configured to provide signaling control. The gNB-CU-UP is a user plane entity, and is configured to provide transmission of data of the terminal device. The gNB-CU-CP is connected to the gNB-CU-UP through an E1 interface, the gNB-CU-CP is connected to the gNB-DU through an F1-C interface, and the gNB-CU-UP is connected to the gNB-DU through an F1-U interface. A structure thereof is shown in FIG. 1.

In an architecture shown in FIG. 1, there are further the following characteristics:
  one gNB includes one gNB-CU-CP, a plurality of gNB-CU-UPs, and a plurality of gNB-DUS,
  one DU can be connected only to one gNB-CU-CP;
  one CU-UP can be connected only to one gNB-CU-CP;
  one DU can be connected to a plurality of gNB-CU-UPs under control of a same CU-CP; and
  one CU-UP can be connected to a plurality of gNB-DUs under control of a same CU-CP.

It should be understood that FIG. 1 is merely an example and should not impose any limitation on an architecture of the gNB. For example, in a CU-DU separation and CP-UP separation architecture, the gNB may include only one gNB-CU-UP, one gNB-CU-CP, and one gNB-DU, or may include more gNB-CU-UPs and gNB-DUs. This is not limited in this application.

Compared with a 4th generation mobile communication system, 5th generation mobile communication (5G) has stricter requirements on various network performance indicators in an all-round manner. For example, a capacity indicator is increased by 1000 times, wider coverage is needed, and ultra-high reliability and ultra-low latency are needed. Considering that high-frequency carrier frequency resources are abundant, use of high-frequency small cell networking becomes increasingly popular in a hotspot area to satisfy an ultra-high-capacity requirement of 5G. A high-frequency carrier has a poor propagation characteristic, is severely attenuated due to blocking, and has narrow coverage. Therefore, a large quantity of small cells need to be densely deployed. Accordingly, it is costly to provide an optical-fiber backhaul for the large quantity of small cells that are densely deployed, and construction is difficult. Therefore, an economical and convenient backhaul solution is needed. In addition, from a perspective of a wide-coverage requirement, it is difficult and costly to deploy an optical fiber to provide network coverage in some remote areas. Therefore, a flexible and convenient access and backhaul solution also needs to be designed.

Figure 2:
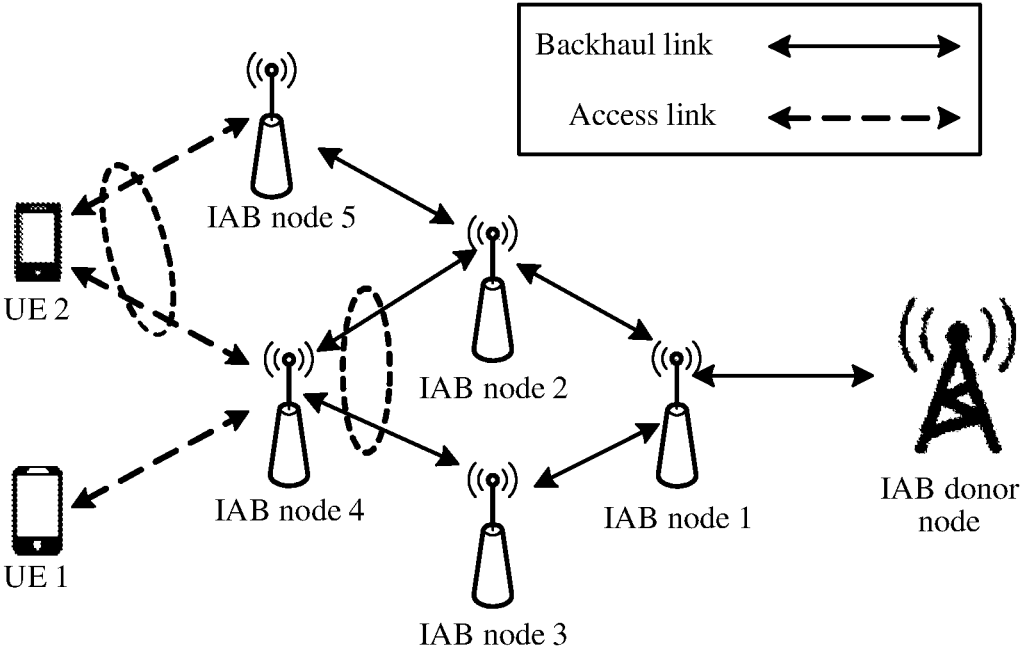
FIG. 2 is a diagram of an architecture of an IAB system used in a technical solution in this application.

An integrated access and backhaul (IAB) technology provides a thought to resolve the foregoing problems. A wireless transmission solution is used on both an access link and a backhaul link in the IAB technology to avoid optical-fiber deployment. FIG. 2 is a schematic diagram of a wireless relay scenario. In an IAB network, a relay node (RN) may be referred to as an IAB node, and may provide a radio access service for user equipment (UE). Service transmission of the UE is performed by an IAB donor node connected to the IAB node through a wireless backhaul link, and the donor node is also referred to as a donor base station (donor gNodeB, DgNB). The IAB node may play two roles: a mobile termination (MT) and a DU. When the IAB node faces a parent node of the IAB node, the JAB node may be considered as a terminal device, namely, a role of the MT, where the parent node may be the donor base station. When the IAB node faces a child node of the IAB node, the IAB node may be considered as a network device, namely, a role of the DU, where the child node may be another IAB node or common UE. The donor base station may be an access network element having a complete base station function, or may be an access network element in a form of separation between a central unit and a distributed unit. The donor base station is connected to a core network element serving the UE, for example, connected to a 5G core network, and provides a wireless backhaul function for the IAB node. For ease of description, a donor base station central unit is referred to as a donor CU for short or directly referred to as a CU, and a donor base station distributed unit is referred to as a donor-DU for short or directly referred to as a DU. The donor CU may alternatively be in a form of separation between a control plane (CP) and a user plane (UP). For example, the CU may be constituted by one CU-CP and one or more CU-UPs.

Figure 3:
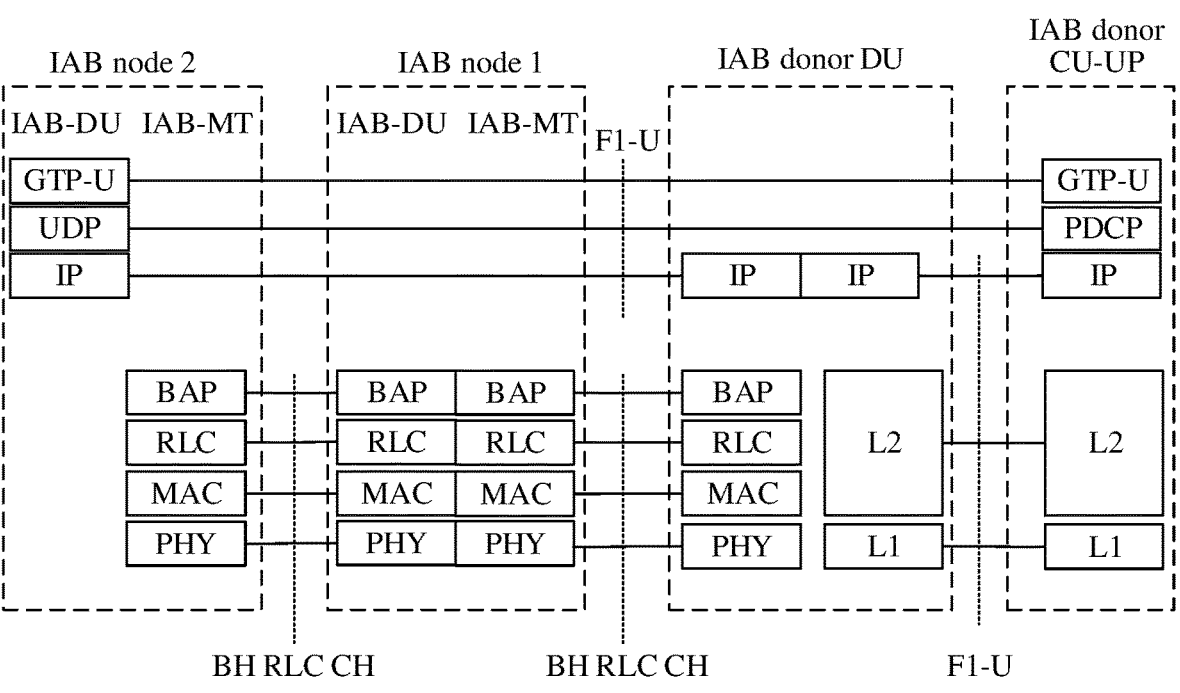
FIG. 3 shows an example of a user plane protocol stack architecture of a multi-hop IAB network.
Figure 4:
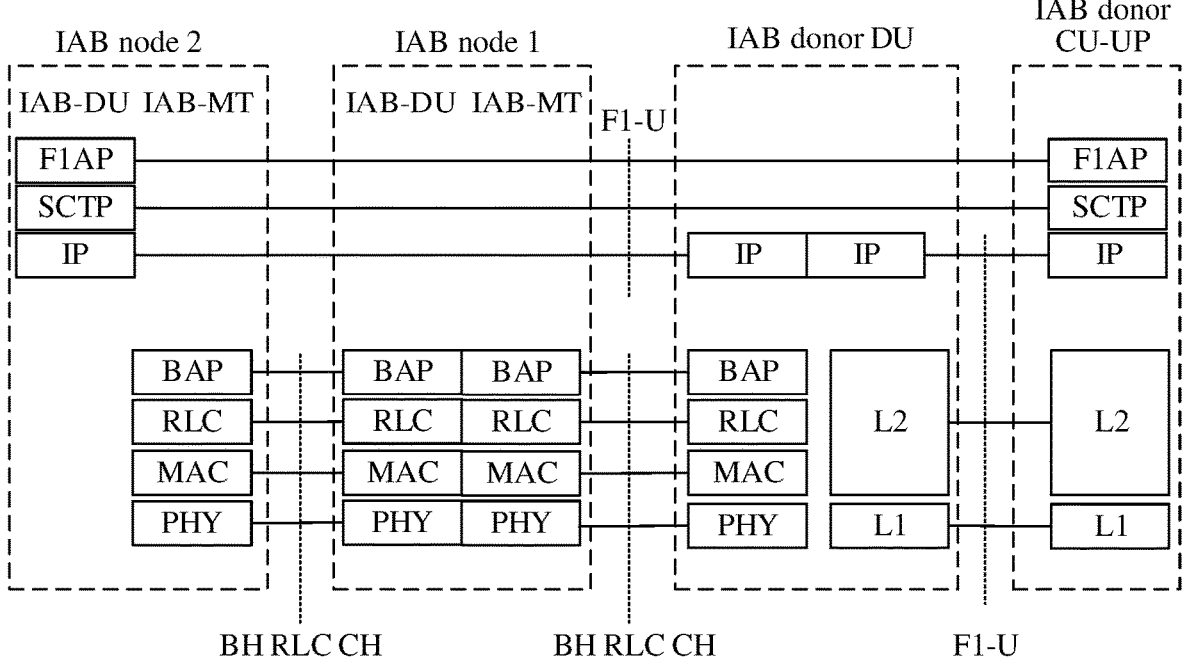
FIG. 4 shows an example of a control plane protocol stack architecture of a multi-hop IAB network.

As shown in FIG. 3 and FIG. 4, an F1 interface (which is also referred to as an F1* interface, where the F1 interface and the F1* interface may be collectively referred to as an F1 interface in this specification, but a name is not limited) needs to be established between an IAB node (an IAB-DU) and a donor node (an IAB-donor-CU). The interface supports a user plane protocol (F1-U/F1*-U) and a control plane protocol (F1-C/F1*-C). The user plane protocol includes one or more of the following protocol layers: a general packet radio service tunneling protocol user plane (GTP-U) layer, a user datagram protocol (UDP) layer, an internet protocol (IP) layer, an L2 (layer 2) layer, an L1 (layer 1) layer, a radio link control (RLC) laver, a medium access control (MAC) layer, a physical (PHY) layer, and a backhaul adaptation protocol (BAP) layer. The control plane protocol includes one or more of the following protocol layers: an F1 application protocol (F1AP) layer, a stream control transmission protocol (SCTP) layer, an IP layer, an L2 layer, an L1 layer, an RLC layer, a MAC layer, a PHY layer, and a BAP layer.

In FIG. 3 and FIG. 4, a wireless backhaul link between an IAB node 2 and an IAB node 1 and a wireless backhaul link between the LAB node 1 and an IAB donor DU may be referred to as a wireless backhaul radio link control channel (BH RLC CH).

Based on a control plane of the F1 interface, interface management, IAB-DU management, configuration related to a UE context, and the like may be performed between the IAB node and an IAB donor. Based on a user plane of the F1 interface, functions such as user plane data transmission and downlink transmission status feedback may be performed between the IAB node and the IAB donor.

To protect security of the F1 interface, an IP security (IPsec) secure connection may be established between the IAB node and the IAB donor.

In the case that an architecture of separation between a CU-UP and a CU-CP is used for the IAB donor, that is, in the case that the IAB donor is divided into a donor-CU-CP and a donor-CU-UP, how to establish an IPsec secure connection between the donor-CU-CP and the IAB node becomes an urgent problem to be resolved.

In view of this, embodiments of this application provide a method for establishing a secure transmission channel, to establish a user plane secure transmission channel between a donor-CU-UP and an IAB-DU.

It should be noted that, in the following embodiments, a first key at the donor-CU-UP is derived by the donor-CU-UP, or is derived and sent to the donor-CU-UP by a donor-CU-CP; and the first key at the IAB-DU is derived by the IAB-DU, or is derived and sent to the IAB-DU by an IAB-MT. Because the first key at the IAB-DU and the first key at the donor-CU-UP are a same key, both the key at the IAB-DU and the key at the donor-CU-UP are named the first key in this application. However, it should not be understood as that the key at the donor-CU-UP is derived by the IAB-DU/the IAB-MT, and it should not be understood as that the key at the IAB-DU is derived by the donor-CU-UP/ the donor-CU-CP. Certainly, alternatively, the key at the donor-CU-UP may be named the first key, and the key at the IAB-DU may be named a fifth key, where the first key and the fifth key are the same key. This is not limited in embodiments of this application.

Figure 5:
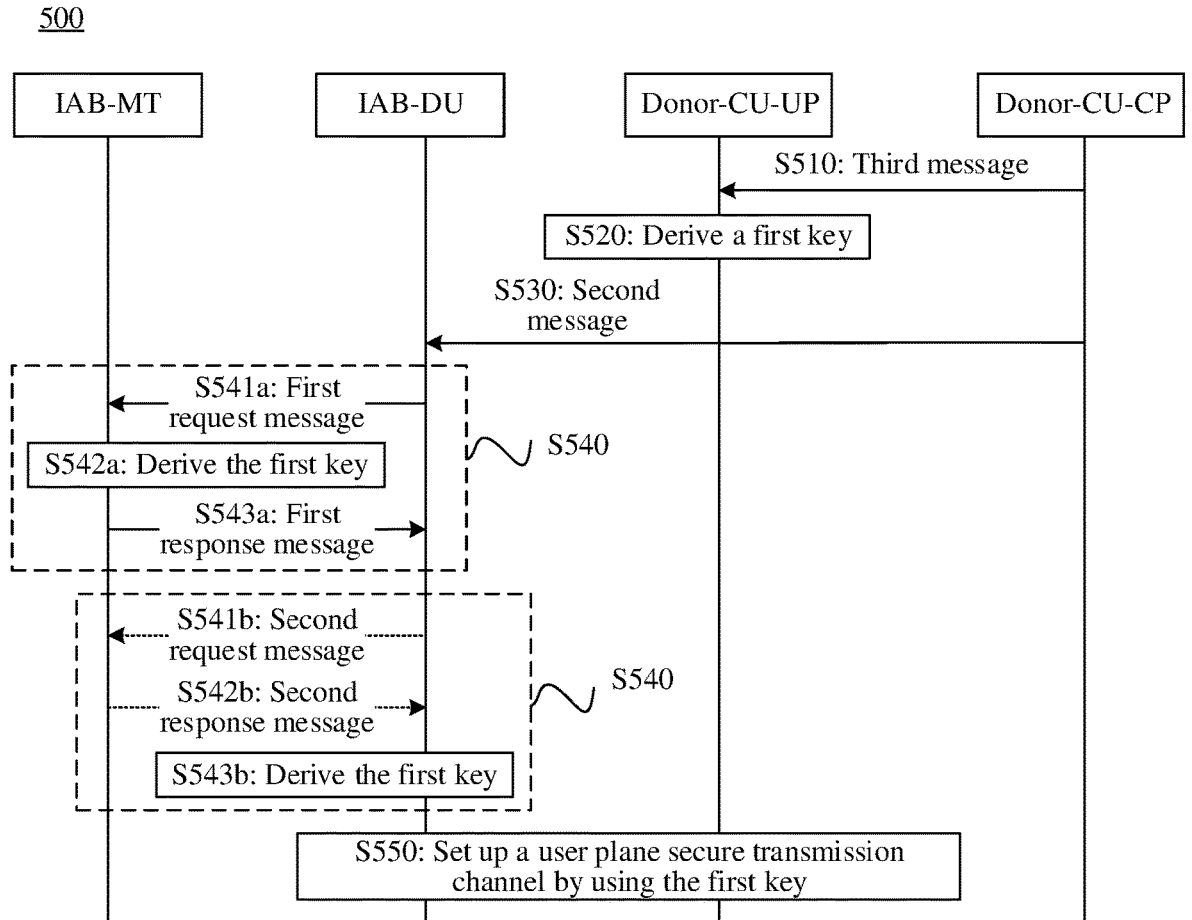
FIG. 5 to FIG. 11 each are a schematic flowchart of a method according to an embodiment of this application.

FIG. 5 shows a method for establishing a secure transmission channel according to an embodiment of this application. As shown in FIG. 5, the method 500 includes S510 to S550. The following describes the steps in detail.

S510: A donor-CU-CP sends a third message. Accordingly, in S510, a donor-CU-UP receives the third message.

The third message includes a root key (denoted as $K_{gNB}$ below) of a donor node. $K_{gNB}$ is obtained by the donor-CU-CP from a network in a procedure in which an IAB-MT of an IAB node registers with the network. For example, in a procedure in which the IAB-MT of the IAB node accesses the network via a donor-DU and the donor-CU-CP or via another IAB node and the donor-CU-CP, after a core network performs authentication on the IAB-MT, an access and mobility management function (AMF) network element sends an initial context setup request message to the donor-CU-CP, where the initial context setup request message includes $K_{gNB}$. After receiving the initial context setup request message, the donor-CU-CP may store, in a context of the IAB node, $K_{gNB}$ included in the initial context setup request message. It should be understood that the IAB-MT and an IAB-DU belong to a same IAB node, and the donor-DU, the donor-CU-UP, and the donor-CU-CP belong to a same IAB donor node.

$K_{gNB}$ is for deriving a first key. The first key is an authentication credential used when the donor-CU-UP and the IAB-DU establish a user plane secure transmission channel, and the user plane secure transmission channel is for transmission of user plane data of a terminal device. The user plane secure transmission channel established by the donor-CU-UP and the IAB-DU may be a secure transmission channel established by using an IPsec mechanism. It should be noted that the first key is different from $K_{gNB}$.

The third message is not limited in this embodiment of this application.

In an example, the third message is a bearer context setup request message. For example, the bearer context setup request message is sent by the donor-CU-CP to the donor-CU-UP when the IAB-MT accesses the network via the donor-DU and the donor-CU-CP or via the another TAB node and the donor-CU-CP. For another example, the bearer context setup request message is sent by the donor-CU-CP to the donor-CU-UP when the terminal device accesses the network via the IAB-DU. The IAB-MT and the IAB-DU belong to the same IAB node, and the donor-DU, the donor-CU-CP, and the donor-CU-UP belong to the same IAB donor node.

In another example, the third message is a bearer context modification request message. For example, the bearer context modification request message is sent by the donor-CU-CP to the donor-CU-UP when the IAB-MT accesses the network via the donor-DU and the donor-CU-CP or via the another IAB node and the donor-CU-CP. For another example, the bearer context modification request message is sent by the donor-CU-CP to the donor-CU-UP when the terminal device accesses the network via the IAB-DU.

Optionally, the third message further includes first indication information, and the first indication information indicates that the IAB-DU belongs to the IAB node.

For example, the first indication information may be an independent information element. For example, the first indication information is an "IAB-indicator" information element. For another example, the first indication information may be an IP address of the IAB-DU or $K_{gNB}$. That is, the IP address of the IAB-DU or $K_{gNB}$ may further indicate that the IAB-DU belongs to the IAB node.

S520: The donor-CU-UP derives the first key.

The donor-CU-UP derives the first key based on $K_{gNB}$, the IP address of the IAB-DU, and a first IP address of the donor-CU-UP.

For example, the donor-CU-UP derives the first key by using $K_{gNB}$ as an input key and by using the IP address of the IAB-DU and the first IP address of the donor-CU-UP as input parameters.

The first IP address of the donor-CU-UP is an IP address used by the donor-CU-UP to establish the user plane secure transmission channel. It should be understood that the donor-CU-UP may have a plurality of IP addresses. Before establishing the user plane secure transmission channel, the donor-CU-UP determines one first IP address in the plurality of IP addresses, where the first IP address is for establishing the user plane secure transmission channel. For example, in a procedure in which the terminal device accesses the network via the IAB-DU, after receiving the bearer context setup request message from the donor-CU-CP, the donor-CU-UP determines the first IP address that is of the donor-CU-UP and that is for establishing the user plane secure transmission channel.

The IP address of the IAB-DU is obtained by the donor-CU-UP from the donor-CU-CP. For example, in the procedure in which the terminal device accesses the network via the IAB-DU, the bearer context modification request message sent by the donor-CU-CP to the donor-CU-UP includes the IP address of the IAB-DU.

A condition for triggering the donor-CU-UP to derive the first key is not limited in this embodiment of this application.

In an example, the donor-CU-UP may derive the first key when obtaining the IP address of the IAB-DU and $K_{gNB}$.

In another example, the donor-CU-UP derives the first key when receiving the first indication information.

Optionally, after deriving the first key, the donor-CU-UP stores a correspondence between the first key and the IP address of the IAB-DU in a context of the donor-CU-UP.

S530: The donor-CU-CP sends a second message. Accordingly, in S530, the IAB-DU receives the second message.

The second message includes the first IP address of the donor-CU-UP. For example, the second message is a UE context setup request message. For example, the UE context setup request message is sent by the donor-CU-CP to the IAB-DU when the terminal device accesses the network via the IAB-DU.

S540: The IAB-DU determines the first key.

For a manner in which the IAB-DU determines the first key, refer to descriptions in a method 600 below.

S550: The donor-CU-UP and the IAB-DU establish the user plane secure transmission channel by using the first key.

For example, the donor-CU-UP and the IAB node establish the user plane secure transmission channel by using a pre-shared secret key (PSK) supported in an internet key exchange (IKE) v2 protocol. In the $1^{st}$ message exchange, the IAB node and the donor-CU-UP complete IKE security association (SA) parameter negotiation in a plaintext manner, including negotiation, encryption, and authentication algorithms, an exchange of temporary random numbers, and a Diffie-Hellman (DH) exchange. In the $2^{nd}$ message exchange, the IAB node and the donor-CU-UP separately generate an authentication parameter by using the first key, and send the authentication parameter to a peer end, to complete identity authentication.

It may be understood that, when the IAB-DU and the donor-CU-UP establish the user plane secure transmission channel by using an IKEv2 PSK protocol, the IAB-DU determines, based on a correspondence that is stored in a context of the IAB-DU and that is between the first key and the first IP address of the donor-CU-UP, to use the first key as the authentication credential used when the user plane secure transmission channel is established, and the donor-CU-UP determines, based on the correspondence that is stored in the context of the donor-CU-UP and that is between the first key and the IP address of the IAB-DU, to use the first key as the authentication credential used when the user plane secure transmission channel is established.

It should be further understood that a procedure, performed by the IAB-DU and the donor-CU-UP, of establishing the user plane secure transmission channel may be triggered by the IAB-DU, or may be triggered by the donor-CU-UP. For example, if the user plane secure transmission channel between the IAB-DU and the donor-CU-UP has not been established when the IAB-DU receives a user plane data request from the terminal device, the IAB-DU triggers the procedure of establishing the user plane secure transmission channel. For another example, if the user plane secure transmission channel between the IAB-DU and the donor-CU-UP has not been established when the donor-CU-UP receives downlink data of the terminal device, the donor-CU-UP triggers the procedure of establishing the user plane secure transmission channel.

In this embodiment of this application, the donor-CU-CP sends $K_{gNB}$ to the donor-CU-UP, so that the donor-CU-UP can derive the first key by using $K_{gNB}$ as the input key, and the IAB-DU can obtain the same first key. When there is a same first key at the donor-CU-UP and the IAB-DU, the donor-CU-UP and the IAB-DU may establish the user plane secure transmission channel based on the first key, to effectively avoid a problem of an authentication error generated when the donor node and the IAB-DU establish a secure transmission channel of an F1-U interface.

As described above, in a procedure in which the IAB-MT accesses the network via the donor-DU, the initial context setup request message received by the donor-CU-CP from the AMF includes $K_{gNB}$. After obtaining $K_{gNB}$, the donor-CU-CP may derive, based on $K_{gNB}$, a key related to a control plane. Therefore, based on the method 500, after the donor-CU-CP sends $K_{gNB}$ to the donor-CU-UP, the donor-CU-UP not only may derive the first key based on $K_{gNB}$, but also may derive, based on $K_{gNB}$, the key related to the control plane. Once the donor-CU-UP derives, based on $K_{gNB}$, the key related to the control plane, transmission security of the control plane is affected, and requirements for key isolation and least privilege are not satisfied. In addition, a deployment manner of donor-CU-UPs may be dispersed deployment. That is, one donor-CU-CP may manage a plurality of donor-CU-UPs. If the donor-CU-CP sends $K_{gNB}$ to the plurality of donor-CU-UPs, a risk of a key leakage is added.

Therefore, although the user plane secure transmission channel between the donor-CU-UP and the IAB-DU may be established according to the method 500, the method 500 has the risk of the key leakage.

Figure 6:
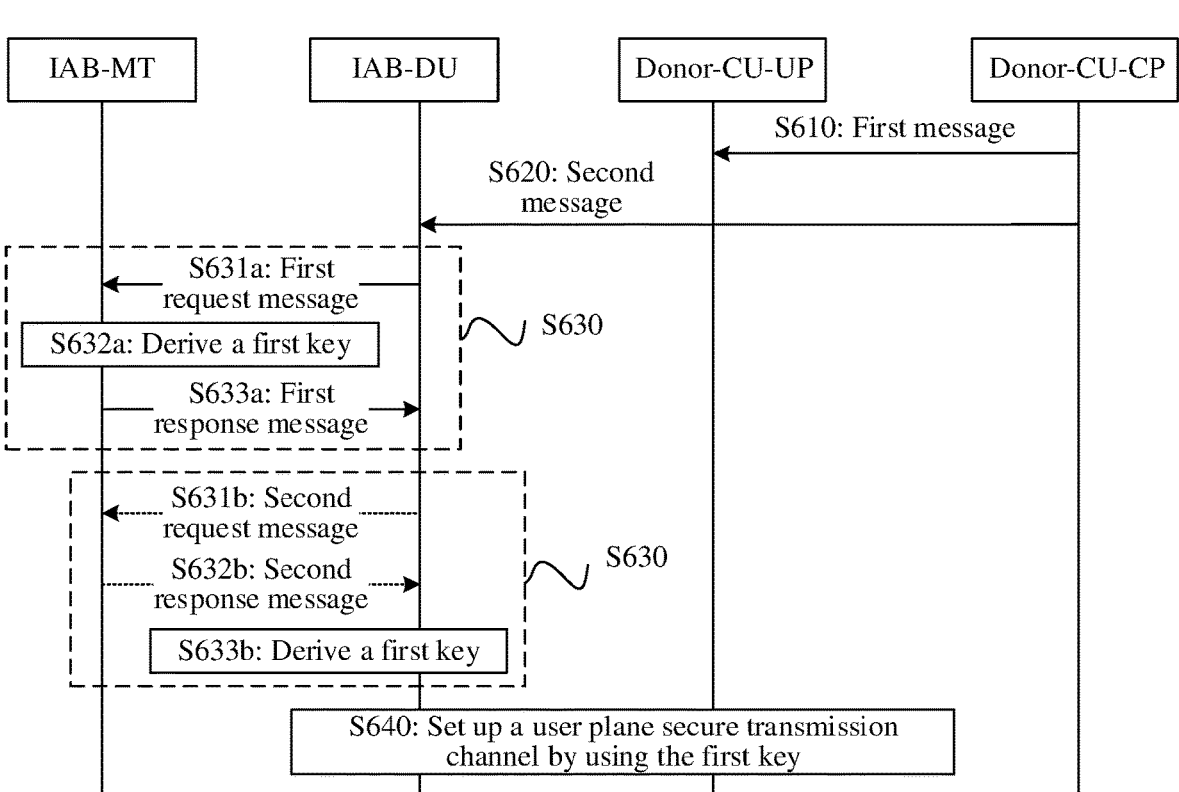

FIG. 6 shows a method for establishing a secure transmission channel according to an embodiment of this application. As shown in FIG. 6, the method 600 includes S610 to S640. The following describes the steps in detail.

S610: A donor-CU-CP sends a first message. Accordingly, in S610, a donor-CU-UP receives the first message.

In a possible implementation, the first message includes a first key, the first key is an authentication credential used when the donor-CU-UP and an IAB-DU establish a user plane secure transmission channel, and the user plane secure transmission channel is for transmission of user plane data of a terminal device. The user plane secure transmission channel established by the donor-CU-UP and the IAB-DU may be a user plane secure transmission channel established by using an IPsec mechanism.

It should be noted that the first key is different from a root key (denoted as $K_{gNB}$ below) of a donor node, and $K_{gNB}$ is a key obtained by the donor-CU-CP from a network in a procedure in which an IAB node registers with the network. For example, in a procedure in which an IAB-MT of the LAB node accesses the network via a donor-DU and the donor-CU-CP or via another IAB node and the donor-CU-CP, after a core network performs authentication on the IAB-MT, an AMF sends an initial context setup request message to the donor-CU-CP, where the initial context setup request message includes $K_{gNB}$. After receiving the initial context setup request message, the donor-CU-CP may store, in a context of the IAB node, $K_{gNB}$ included in the initial context setup request message. It should be understood that the IAB-MT and the IAB-DU belong to a same IAB node, and the donor-DU and the donor-CU-CP belong to a same IAB donor node.

Optionally, the first message further includes a first IP address of the donor-CU-UP. Accordingly, after receiving the first message and after determining to establish the user plane secure transmission channel between the donor-CU-UP and the IAB-DU based on the first IP address, the donor-CU-UP determines, based on the first IP address, to use the first key when establishing the user plane secure transmission channel.

Optionally, the first message further includes an IP address of the IAB-DU. Accordingly, after receiving the first message and after determining to establish the user plane secure transmission channel between the donor-CU-UP and the IAB-DU based on the first IP address, the donor-CU-UP determines, based on the first IP address and the IP address of the IAB-DU, to use the first key when establishing the user plane secure transmission channel.

When the first message includes the first key, the method 600 further includes S611a; The donor-CU-CP determines the first key.

The donor-CU-CP derives the first key based on $K_{gNB}$, the first IP address of the donor-CU-UP, and the IP address of the IAB-DU.

For example, the donor-CU-CP derives the first key by using $K_{gNB}$ as an input key and by using the first IP address of the donor-CU-UP and the IP address of the IAB-DU as input parameters. It should be understood that $K_{gNB}$ is a key shared by the IAB-MT and an IAB-donor.

$K_{gNB}$ is obtained by the donor-CU-CP from the locally stored context of the IAB node.

The first IP address of the donor-CU-UP is an IP address used by the donor-CU-UP to establish the user plane secure transmission channel. It should be understood that the donor-CU-UP may have a plurality of IP addresses. Before establishing the user plane secure transmission channel, the donor-CU-UP determines one first IP address in the plurality of IP addresses, where the first IP address is for establishing the user plane secure transmission channel. For example, in a procedure in which the terminal device accesses the network via the IAB-DU, the donor-CU-CP receives a bearer context setup response message from the donor-CU-UP, where the bearer context setup response message includes the first IP address of the donor-CU-UP.

The IP address of the IAB-DU may be allocated by the donor-CU-CP or allocated by an operation, administration, and maintenance (OAM) to the IAB-DU. When the OAM allocates the IP address to the IAB-DU, the donor-CU-CP may obtain the IP address of the IAB-DU from the OAM.

A condition for triggering the donor-CU-CP to determine the first key is not limited in this embodiment of this application.

In an example, the donor-CU-CP may determine the first key when obtaining the first IP address of the donor-CU-UP. In other words, once the donor-CU-CP receives the bearer context setup response message from the donor-CU-UP, the donor-CU-CP may determine the first key based on the first IP address that is of the donor-CU-UP and that is carried in the bearer context setup response message.

In another example, the donor-CU-CP determines the first key when determining that the IAB-DU belongs to the IAB node. For example, the donor-CU-CP determines, depending on whether a locally stored context of the IAB node includes a first identifier, whether the IAB-DU belongs to the IAB node, where the first identifier indicates that the IAB-DU belongs to the IAB node. If the context of the IAB node includes the first identifier, the donor-CU-CP determines that the IAB-DU belongs to the IAB node; or if the context of the IAB node does not include the first identifier, the donor-CU-CP determines that the IAB-DU does not belong to the LAB node. For example, the first identifier is the IP address of the IAB-DU.

In another possible implementation, the first message includes a one-to-one correspondence between a plurality of IP addresses of the donor-CU-UP and a plurality of keys, the plurality of keys include a first key, and the first key corresponds to a first IP address of the donor-CU-UP.

Optionally, the first message further includes an IP address of an IAB-DU, and the plurality of keys all correspond to the IP address of the IAB-DU. In other words, each of the plurality of keys corresponds to one IP address of the donor-CU-UP and the IP address of the IAB-DU.

When the first message includes the one-to-one correspondence between the plurality of IP addresses of the donor-CU-UP and the plurality of keys, the method 600 further includes S611b: The donor-CU-CP derives the plurality of keys based on $K_{gNB}$, the IP address of the IAB-DU, and the plurality of IP addresses of the donor-CU-UP.

For example, the plurality of IP addresses of the donor-CU-UP include the first IP address and a second IP address. In this case, the donor-CU-CP derives the first key based on $K_{gNB}$, the IP address of the IAB-DU, and the first IP address, and derives a second key based on $K_{gNB}$, the IP address of the IAB-DU, and the second IP address. Then, a correspondence between the first IP address and the first key and a correspondence between the second IP address and the second key are sent to the donor-CU-UP via the first message.

Optionally, before the donor-CU-CP determines the plurality of keys, the method further includes: The donor-CU-CP sends first indication information to the donor-CU-UP, and the donor-CU-CP receives, from the donor-CU-UP, the plurality of IP addresses of the donor-CU-UP. Accordingly, after receiving the first indication information, the donor-CU-UP sends the plurality of IP addresses of the donor-CU-UP to the donor-CU-CP based on the first indication information.

Specifically, the plurality of IP addresses of the donor-CU-UP are all IP addresses of the donor-CU-UP. In other words, after receiving the first indication information, the donor-CU-UP sends all the IP addresses of the donor-CU-UP to the donor-CU-CP based on the first indication information.

For example, the first indication information indicates that the IAB-DU belongs to an IAB node.

For example, if the donor-CU-UP has three IP addresses denoted as a CU-UP IP 1, a CU-UP IP 2, and a CU-UP IP 3, the donor-CU-UP sends the three IP addresses to the donor-CU-CP. Accordingly, after receiving the three IP addresses from the donor-CU-UP, the donor-CU-CP derives three keys based on $K_{gNB}$, the IP address of the IAB-DU, and the three IP addresses of the donor-CU-UP.

Specifically, the donor-CU-CP derives a key (denoted as $K_{IAB\_UP\ 1}$) by using $K_{gNB}$ as an input key and by using the IP address of the IAB-DU and the CU-UP IP 1 as input parameters: the donor-CU-CP derives a key (denoted as $K_{IAB\_UP\ 2}$) by using $K_{gNB}$ as an input key and by using the IP address of the IAB-DU and the CU-UP IP 2 as input parameters; and the donor-CU-CP derives a key ($K_{IAB\_UP\ 3}$) by using $K_{gNB}$ as an input key and by using the IP address of the IAB-DU and the CU-UP IP 3 as input parameters. Further, the donor-CU-CP sends, to the donor-CU-UP, the three derived keys and the IP addresses of the donor-CU-UP that respectively correspond to the three keys. Optionally, the donor-CU-UP sends, to the donor-CU-UP, the three derived keys and three groups of first parameters respectively corresponding to the three keys, where first parameters corresponding to each key are input parameters for deriving the key. For example, the three keys and the three groups of first parameters respectively corresponding to the three keys may be represented as {$K_{IAB\_UP\ 1}$, CU-UP IP 1, and IAB-DU IP}, {$K_{IAB\_UP\ 2}$, CU-UP IP 2, and IAB-DU IP}, and {$K_{IAB\_UP\ 3}$, CU-UP IP 3, and IAB-DU IP}.

When the first message includes the plurality of keys, the method 600 further includes S612: The donor-CU-UP determines to establish a user plane secure transmission channel between the donor-CU-UP and the IAB-DU based on the first IP address; and determines the first key based on the first IP address.

For example, the donor-CU-UP determines, as the first key, a key that corresponds to the first IP address and that is in the plurality of keys. Alternatively, the donor-CU-UP determines, as the first key, a key that corresponds to the first IP address and the IP address of the IAB-DU and that is in the plurality of keys.

For example, in a procedure in which a terminal device accesses a network via the IAB-DU, after receiving a bearer context setup request message from the donor-CU-CP, the donor-CU-UP determines that an IP address that is of the donor-CU-UP and that is for establishing the user plane secure transmission channel is the first IP address. Further, the donor-CU-UP receives a bearer context modification request message from the donor-CU-CP, where the bearer context modification request message includes the IP address that is of the IAB-DU and that is for establishing the user plane secure transmission channel. Further, the donor-CU-UP determines, as the first key, a key that is in the plurality of keys and that is corresponding to the first IP address of the donor-CU-UP and the IP address of the IAB-DU that are for establishing the user plane secure transmission channel. For example, if the IP address that is determined by the donor-CU-UP and that is for establishing the user plane secure transmission channel is the foregoing CU-UP IP 2, the donor-CU-UP determines, as the first key, $K_{IAB\_UP\ 2}$ corresponding to the CU-UP IP 2 and the IAB-DU IP.

Optionally, after obtaining the first key from the first message or determining the first key in the plurality of keys included in the first message, the donor-CU-UP stores a correspondence between the first key and the IP address of the IAB-DU.

For example, the donor-CU-UP stores the correspondence between the first key and the IP address of the IAB-DU in a context of the donor-CU-UP.

The IP address of the IAB-DU is obtained by the donor-CU-UP from the donor-CU-CP. For example, the donor-CU-CP sends the IP address of the IAB-DU to the donor-CU-UP via the first message. For example, in the procedure in which the terminal device accesses the network via the IAB-DU, the bearer context modification request message sent by the donor-CU-CP to the donor-CU-UP includes the first key and the IP address of the IAB-DU. For another example, the donor-CU-CP sends the IP address of the IAB-DU to the donor-CU-UP via another message different from the first message. For example, in the procedure in which the terminal device accesses the network via the IAB-DU, the donor-CU-CP sends the bearer context setup request message to the donor-CU-UP, where the bearer context setup request message includes the first key. Further, the donor-CU-CP sends the bearer context modification request message to the donor-CU-UP, where the bearer context modification request message includes the IP address of the IAB-DU.

The first message sent by the donor-CU-CP to the donor-CU-UP is not limited in this embodiment of this application.

In an example, if the first message includes the first key, the first message may be the bearer context modification request message. Specifically, the bearer context modification request message is sent by the donor-CU-CP to the donor-CU-UP in the procedure in which the terminal device accesses the network via the IAB-DU. For example, the first key may be carried in security information included in the bearer context modification request message. Alternatively, the first key may be carried in a newly defined information element in the bearer context modification request message.

In another example, if the first message includes the first key, the first message may be the bearer context setup request message. Specifically, the bearer context setup request message is sent by the donor-CU-CP to the donor-CU-UP in the procedure in which the terminal device accesses the network via the IAB-DU.

For example, the donor-CU-UP has only one IP address. When establishing different user plane secure transmission channels, the donor-CU-UP sets up the user plane secure transmission channels by using the IP address. It is assumed that the donor-CU-UP and one IAB-DU have establish one user plane secure transmission channel (denoted as a user plane secure transmission channel 1) before S710. In a procedure of establishing the user plane secure transmission channel 1, the donor-CU-CP may obtain the IP address of the donor-CU-UP. Then, in a procedure of establishing another user plane secure transmission channel (denoted as a user plane secure transmission channel 2), because the donor-CU-CP has obtained the IP address of the donor-CU-UP in the procedure of establishing the user plane secure transmission channel 1, before the donor-CU-CP sends the bearer context setup request message to the donor-CU-UP in the procedure in which the terminal device accesses the network via the IAB-DU, the donor-CU-CP may determine the first key based on the IP address of the donor-CU-UP, and send the first key to the donor-CU-UP via the bearer context setup request message.

In still another example, if the first message includes the plurality of keys and a plurality of groups of first parameters, the first message may be the bearer context modification request message. Specifically, the bearer context modification request message is sent by the donor-CU-CP to the donor-CU-UP in the procedure in which the IAB-MT accesses the network via the donor-DU and the donor-CU-CP or via the another IAB node and the donor-CU-CP.

For example, Table 1 shows some information elements included in the security information. Table 2 shows an IE/a group included in an "IAB Pre-Shared Key" information element.

The first key or the one-to-one correspondence between the plurality of keys and the plurality of IP addresses of the donor-CU-UP may be included in a "security information" information element.

TABLE 1

| Information element (IE)/Group name | Presence | Semantics description |
| --- | --- | --- |
| Security algorithm | Mandatory | |
| User plane security keys | Mandatory | |
| IAB Pre-Shared Key | Optional | For establishing an IPsec SA between an IAB node and an IAB donor |

TABLE 2

| IE/Group name | Presence | Semantics description |
| --- | --- | --- |
| $K_{IAB}$ | Mandatory | Refer to descriptions in 3rd generation partnership project (3GPP) technology specification (TS) 33.501. |

For example, Table 3 shows some information elements included in the bearer context setup request message. Table 4 shows an IE/a group included in an "IAB Pre-Shared Key" information element. Table 5 shows an IE/a group included in an "IAB credential" information element.

The first key, or the plurality of keys and the plurality of groups of first parameters may be included in the "IAB Pre-Shared Key" information element. Specifically, the first key, or the plurality of keys and the plurality of groups of first parameters may be included in the "IAB credential" information element in the "IAB Pre-Shared Key" information element.

TABLE 3

| Information element (IE)/Group name | Presence | Semantics description |
| --- | --- | --- |
| Message type | Mandatory | |
| gNB-CU-CP UE E1 application protocol (E1AP) identifier (ID) | Mandatory | |
| Security information | Mandatory | |
| IAB Pre-Shared Key | Optional | The information element is included when a serving DU is an IAB node |

TABLE 4

| IE/Group name | Presence | Semantics description |
| --- | --- | --- |
| IAB credential | Mandatory | |

TABLE S

| IE/Group name | Presence | Semantics description |
| --- | --- | --- |
| $K_{IAB}$ | Mandatory | Refer to descriptions in 3GPP TS 33.501. |

Optionally, the method 600 further includes S613: The donor-CU-CP derives a third key based on $K_{gNB}$, an IP address of the donor-CU-CP, and the IP address of the IAB-DU. The third key is an authentication credential used when the donor-CU-CP and the IAB-DU establish a control plane secure transmission channel. The control plane secure transmission channel established by the donor-CU-CP and the IAB-DU may be a secure transmission channel established by using the IPsec mechanism.

For example, the donor-CU-CP derives the third key by using $K_{gNB}$ as an input key and by using the IP address of the donor-CU-CP and the IP address of the IAB-DU as input parameters.

Optionally, the first message further includes the first indication information. Accordingly, the donor-CU-UP uses, based on the first indication information, the first key as the authentication credential when the donor-CU-UP and the IAB-DU establish the user plane secure transmission channel. Otherwise, a manner of establishing the user plane secure transmission channel by the donor-CU-UP and the IAB-DU does not depend on the first key as the authentication credential.

For example, the first indication information indicates that the IAB-DU belongs to the IAB node.

For example, the first indication information may be an independent information element. For example, the first indication information is an "IAB-indicator" information element. For another example, the first indication information may be the IP address of the IAB-DU or the first key. That is, the IP address of the IAB-DU or the first key may further indicate that the IAB-DU belongs to the IAB node.

S620: The donor-CU-CP sends a second message. Accordingly, in S620, the IAB-DU receives the second message.

The second message includes the first IP address of the donor-CU-UP. For example, the second message is a UE context setup request message. For example, the UE context setup request message is sent by the donor-CU-CP to the IAB-DU when the terminal device accesses the network via the IAB-DU.

S630: The IAB-DU determines the first key.

For example, S630 includes S631a to S633a.

S631a: The IAB-DU sends a first request message to the IAB-MT.

The first request message includes the first IP address of the donor-CU-UP, and the first request message requests the first key.

After receiving the first request message from the IAB-DU, the IAB-MT derives the first key based on $K_{gNB}$, the IP address of the IAB-DU, and the first IP address of the donor-CU-UP, and then sends the first key to the IAB-DU. It may be understood that the IP address of the IAB-DU is obtained from the OAM or the donor-CU-CP after the IAB-MT completes registration.

For example, the IAB-MT derives the first key by using $K_{gNB}$ as the input key and by using the IP address of the IAB-DU and the first IP address of the donor-CU-UP as input parameters.

S632a: The IAB-MT sends a first response message to the IAB-DU.

The first response message includes the first key.

Accordingly, after receiving the first key, the IAB-DU stores a correspondence between the first key and the first IP address of the donor-CU-UP. For example, the IAB-DU stores the correspondence between the first key and the first IP address of the donor-CU-UP in the context of the IAB-DU.

The IAB-MT stores $K_{gNB}$, and the IAB-DU obtains the first IP address of the donor-CU-UP. Therefore, in the foregoing manner, the IAB-MT interacts with the IAB-DU, to resolve a problem of obtaining the first key by the IAB-DU. In addition, the first key is different from $K_{gNB}$. Requirements for key isolation and least privilege are satisfied, and a key leakage is avoided.

For another example, S630 includes S631b to S633b.

S631b: The IAB-DU sends a second request message to the IAB-MT.

The second request message requests $K_{gNB}$.

S632b: The IAB-MT sends a second response message to the IAB-DU.

The second response message includes $K_{gNB}$.

It should be understood that S631b and S632b are optional steps. That is, if the IAB-DU locally stores $K_{gNB}$, S630 includes only S633b. $K_{gNB}$ locally stored by the IAB-DU is obtained from the IAB-MT after the IAB-DU is started. For example, after the IAB-DU is started, the IAB-MT sends $K_{gNB}$ to the IAB-DU when sending the IP address of the IAB-DU to the IAB-DU.

S633b: The IAB-DU derives the first key.

The IAB-DU derives the first key based on $K_{gNB}$, the IP address of the IAB-DU, and the first IP address of the donor-CU-UP.

For example, the IAB-DU derives the first key by using $K_{gNB}$ as the input key and by using the IP address of the IAB-DU and the first IP address of the donor-CU-UP as input parameters. It may be understood that the IP address of the IAB-DU is obtained from the IAB-MT after the IAB-DU is started.

The IAB-MT stores $K_{gNB}$, and the IAB-DU obtains the first IP address of the donor-CU-UP. Therefore, in the foregoing manner, the IAB-MT interacts with the IAB-DU, to resolve a problem of obtaining the first key by the IAB-DU. In addition, after obtaining $K_{gNB}$, the IAB-DU does not need to repeatedly request $K_{gNB}$ when the first IP address of the donor-CU-UP changes, so that the first key is locally calculated on demand.

Further, after deriving the first key, the IAB-DU stores a correspondence between the first key and the first IP address of the donor-CU-UP. For example, the IAB-DU stores the correspondence between the first key and the first IP address of the donor-CU-UP in the context of the IAB-DU.

It should be understood that an occasion for obtaining the first key by the IAB-DU is not limited in this embodiment of this application.

In an example, the IAB-DU obtains the first key when obtaining the first IP address of the donor-CU-UP. For example, if S630 includes S631a to S633a, the IAB-DU sends the first request message to the IAB-MT when obtaining the first IP address of the donor-CU-UP. For another example, if S630 includes S631b to S633b, the IAB-DU sends the second request message to the IAB-MT or derives the first key when obtaining the first IP address of the donor-CU-UP.

In another example, the IAB-DU obtains the first key before initiating a user plane secure transmission channel setup procedure to the donor-CU-UP. For example, if S630 includes S631a to S633a, the IAB-DU sends the first request message to the IAB-MT before initiating the user plane secure transmission channel setup procedure to the donor-CU-UP. For another example, if S630 includes S631b to S633b, the IAB-DU sends the second request message to the IAB-MT or derives the first key before initiating the user plane secure transmission channel setup procedure to the donor-CU-UP.

In still another example, the IAB-DU obtains the first key after receiving an authentication request message from the donor-CU-UP, where the authentication request message is for establishing the user plane secure transmission channel. For example, if S630 includes S631a to S633a, the IAB-DU sends the first request message to the IAB-MT after receiving the authentication request message from the donor-CU-UP. For another example, if S630 includes S631b to S633b, the IAB-DU sends the second request message to the IAB-MT or derives the first key after receiving the authentication request message from the donor-CU-UP.

In still another example, the IAB-DU obtains the first key after receiving a user plane data request message from the terminal device. For example, if S630 includes S631a to S633a, the IAB-DU sends the first request message to the IAB-MT after receiving the user plane data request message from the terminal device. For another example, if S630 includes S631b to S633b, the IAB-DU sends the second request message to the IAB-MT or derives the first key after receiving the user plane data request message from the terminal device.

S640: The donor-CU-UP and the IAB-DU establish the user plane secure transmission channel by using the first key.

For example, the donor-CU-UP and the IAB node establish the user plane secure transmission channel by using a PSK supported in an IKEv2 PSK protocol. In the $1^{st}$ message exchange, the IAB node and the donor-CU-UP complete IKE SA parameter negotiation in a plaintext manner, including negotiation, encryption, and authentication algorithms, an exchange of temporary random numbers, and a DH exchange. In the $2^{nd}$ message exchange, the IAB node and the donor-CU-UP separately generate an authentication parameter by using the first key, and send the authentication parameter to a peer end, to complete identity authentication.

It may be understood that, when the IAB-DU and the donor-CU-UP establish the user plane secure transmission channel by using an IKEv2 PSK protocol, the IAB-DU determines, based on the correspondence that is stored in the context of the IAB-DU and that is between the first key and the first IP address of the donor-CU-UP, to use the first key as the authentication credential used when the user plane secure transmission channel is established, and the donor-CU-UP determines, based on the correspondence that is stored in the context of the donor-CU-UP and that is between the first key and the IP address of the IAB-DU, to use the first key as the authentication credential used when the user plane secure transmission channel is established.

It should be further understood that an IKEv2 PSK procedure performed by the IAB-DU and the donor-CU-UP may be triggered by the IAB-DU, or may be triggered by the donor-CU-UP. For example, if the user plane secure transmission channel between the IAB-DU and the donor-CU-UP has not been established when the IAB-DU receives a user plane data request from the terminal device, the IAB-DU triggers the IKEv2 PSK procedure. For another example, if the user plane secure transmission channel between the IAB-DU and the donor-CU-UP has not been established when the donor-CU-UP receives downlink data of the terminal device, the donor-CU-UP triggers the IKEv2 PSK procedure.

In this embodiment of this application, the donor-CU-CP derives the first key based on $K_{gNB}$, the first IP address of the donor-CU-UP, and the IP address of the IAB-DU, and sends the first key to the donor-CU-UP. In addition, the IAB node determines the first key in a same manner, so that there is a same first key at the donor-CU-UP and the IAB node, to effectively avoid a problem of an authentication error generated when the donor node and the IAB-DU establish a secure transmission channel of an F1-U interface. In addition, because the first key is different from $K_{gNB}$, the requirements for the key isolation and the least privilege are satisfied, and the key leakage is avoided.

Optionally, after the IAB-DU and the donor-CU-UP establish the user plane secure transmission channel, re-authentication between the IAB-MT and the core network may be performed.

It may be understood that the AMF sends an initial context setup request message to the donor-CU-CP after the re-authentication between the IAB-MT and the core network is performed, where the initial context setup request message includes new $K_{gNB}$. Accordingly, the IAB-MT also generates new $K_{gNB}$.

Further, the donor-CU-CP may derive a new second key by using new $K_{gNB}$ as an input parameter and by using the IP address of the IAB-DU and the IP address of the donor-CU-CP as input parameters.

Further, the donor-CU-CP may further send new $K_{gNB}$ to the donor-CU-UP. For example, the donor-CU-UP sends a new first key to the donor-CU-UP via the bearer context modification request message.

Accordingly, after receiving new $K_{gNB}$, the donor-CU-UP may generate the new first key based on new $K_{gNB}$, and update, based on the new first key, the user plane secure transmission channel establish in S640. The donor-CU-UP may alternatively establish another user plane secure transmission channel based on new $K_{gNB}$. The new first key is different from new $K_{gNB}$.

Figure 7:
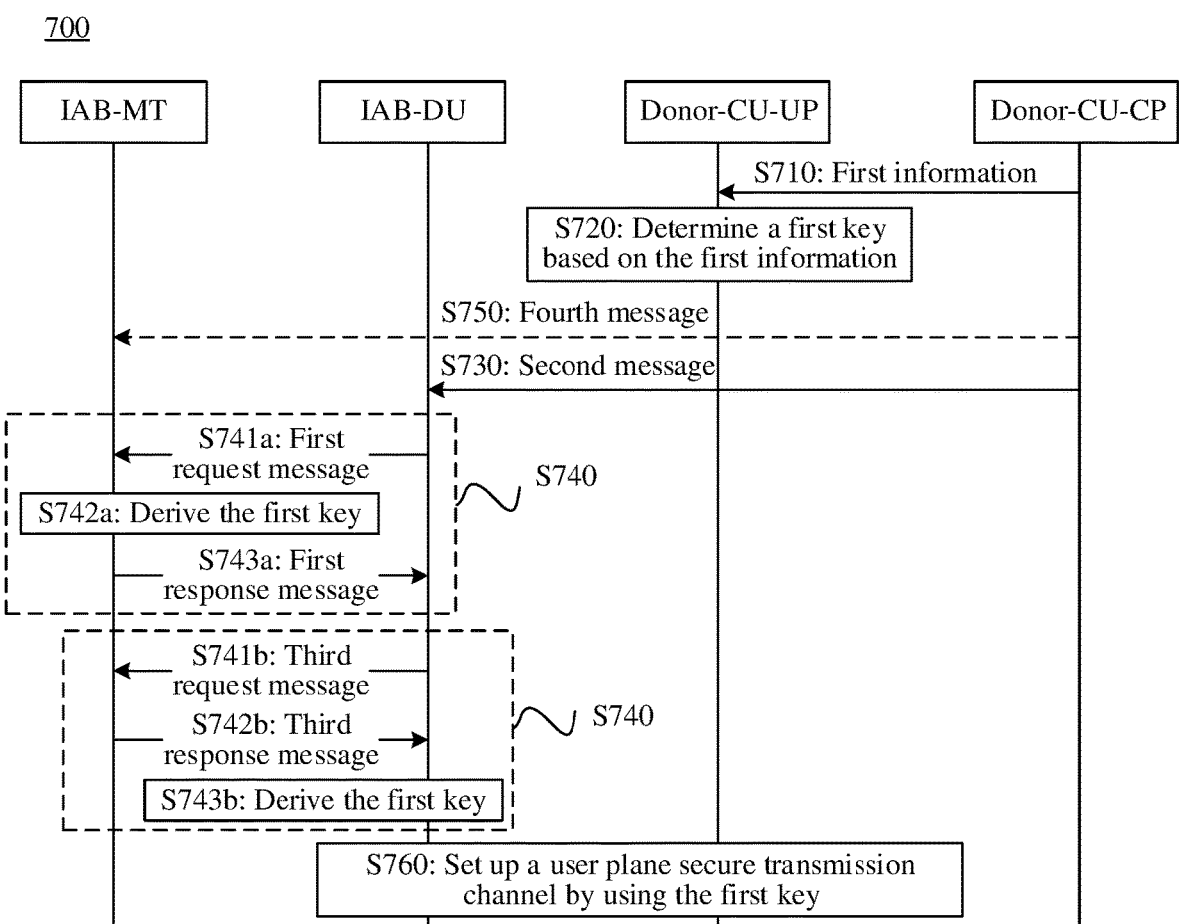

FIG. 7 shows a method for establishing a secure transmission channel according to another embodiment of this application. As shown in FIG. 7, the method 700 includes S710 to S760. The following describes the steps in detail.

S710: A donor-CU-CP sends first information. Accordingly, in S710, a donor-CU-UP receives the first information.

The first information is for determining a first key, the first key is an authentication credential used by the donor-CU-UP and an IAB-DU to establish a user plane secure transmission channel, and the user plane secure transmission channel is for transmission of user plane data of a terminal device. The user plane secure transmission channel established by the donor-CU-UP and the IAB-DU may be a secure transmission channel established by using an IPsec mechanism.

It should be noted that the first key is different from a root key (denoted as $K_{gNB}$ below) of a donor node, and $K_{gNB}$ is a key obtained by the donor-CU-CP from a network in a procedure in which an IAB node registers with the network. For example, in a procedure in which an IAB-MT of the IAB node accesses the network via a donor-DU and the donor-CU-CP or via another IAB node and the donor-CU-CP, after a core network performs authentication on the IAB-MT, an AMF sends an initial context setup request message to the donor-CU-CP, where the initial context setup request message includes $K_{gNB}$. After receiving the initial context setup request message, the donor-CU-CP may store, in a context of the IAB node, $K_{gNB}$ included in the initial context setup request message. It should be understood that the IAB-MT and the IAB-DU belong to a same IAB node, and the donor-DU and the donor-CU-CP belong to a same IAB donor node.

For example, the first information includes at least one of the following: an intermediate key and a user plane key.

The intermediate key is an intermediate key for generating the first key. For example, the intermediate key is derived based on $K_{gNB}$ and a second parameter. For another example, the intermediate key is a random number.

The user plane key is a user plane key used between the IAB node and the IAB donor node. The second parameter includes one or more of the following: a physical cell identifier (PCI), an absolute radio frequency channel number-downlink (ARFCN-DL), a secondary node count, a constant, and a freshness parameter.

In a possible implementation, the first information includes the intermediate key.

Accordingly, that the donor-CU-CP sends the first information to the donor-CU-UP includes: The donor-CU-CP generates the intermediate key, and the donor-CU-CP sends the intermediate key to the donor-CU-UP.

In an example, that the donor-CU-CP generates the intermediate key includes: The donor-CU-CP derives the intermediate key based on $K_{gNB}$ and the second parameter.

Optionally, in this example, the method 700 further includes S750: The donor-CU-CP sends a fourth message to the IAB-MT, where the fourth message includes the intermediate key or the second parameter.

Specifically, the fourth message includes the intermediate key or a parameter that is in the second parameter for generating the intermediate key and that is unknown to the IAB-MT. In other words, if the second parameter used by the donor-CU-CP to generate the intermediate key includes the parameter unknown to the IAB-MT, the donor-CU-CP sends, to the IAB-MT, the intermediate key or the parameter that is in the second parameter for generating the intermediate key and that is unknown to the IAB-MT.

It should be noted that the PCI, the ARFCN-DL, and the secondary node counter that are included in the second parameter are parameters known to the IAB-MT.

For example, the fourth message is an RRC reconfiguration message sent by the donor-CU-CP to the IAB-MT in the procedure in which the IAB-MT accesses the network via the donor-DU and the donor-CU-CP or via the another IAB node and the donor-CU-CP. It should be understood that the donor-DU and the donor-CU-CP belong to the same IAB donor node.

In another example, that the donor-CU-CP generates the intermediate key includes: The donor-CU-CP generates the random number, and uses the random number as the intermediate key.

In this example, the method 700 further includes S750: The donor-CU-CP sends a fourth message to the IAB-MT, where the fourth message includes the intermediate key.

In another possible implementation, the first information includes the user plane key.

Accordingly, that the donor-CU-CP sends the first information to the donor-CU-UP includes: The donor-CU-CP generates the user plane key, and the donor-CU-CP sends the user plane key to the donor-CU-UP.

That the donor-CU-CP generates the user plane key includes: The donor-CU-CP derives the user plane key based on $K_{gNB}$.

For example, in the procedure in which the IAB-MT accesses the network via the donor-DU and the donor-CU-CP or via the another IAB node and the donor-CU-CP, after authentication between the IAB-MT and the core network is completed, the initial context setup request message sent by the AMF to the donor-CU-CP includes $K_{gNB}$. Further, the donor-CU-CP derives the user plane key based on $K_{gNB}$, and sends the user plane key to the donor-CU-UP. The user plane key includes a user plane integrity protection key (denoted as Kupenc) and/or a user plane encryption protection key (denoted as Kupint).

A condition for triggering the donor-CU-CP to generate the first information is not limited in this embodiment of this application.

In a possible implementation, the donor-CU-CP generates the first information when receiving the second indication information. The second indication information indicates that the IAB-DU belongs to the IAB node.

For example, the donor-CU-CP receives the second indication information from the IAB-MT, where the second indication information is an "IAB-indication" information element. In the procedure in which the IAB-MT accesses the network via the donor-DU and the donor-CU-CP or via the another IAB node and the donor-CU-CP, the IAB-MT sends the "IAB-indication" information element to the donor-CU-UP via the donor-DU or the another IAB node.

For another example, the donor-CU-CP receives the second indication information from a core network element, where the second indication information is an "IAB-authorized" information element. In the procedure in which the IAB-MT accesses the network via the donor-DU and the donor-CU-CP or via the another IAB node and the donor-CU-CP, after the authentication between the IAB-MT and the core network is completed, the initial context setup request message sent by the AMF to the donor-CU-CP includes the "IAB-authorized" information element.

A manner in which the donor-CU-CP sends the first information to the donor-CU-UP is not limited in this embodiment of this application.

For example, in a procedure in which the IAB-MT accesses the network via the donor-DU, the donor-CU-CP sends the first information to the donor-CU-UP via a bearer context setup request message.

Optionally, the method further includes: The donor-CU-CP sends first indication information to the donor-CU-UP, where the first indication information indicates that the IAB-DU belongs to the IAB node. The first indication information and the second indication information may be the same, or may be different. This is not limited in this embodiment of this application. For example, the first indication information is an "IAB-indicator". For another example, the first indication information is the first information. That is, the first information further indicates that the IAB-DU belongs to the IAB node.

S720: The donor-CU-UP determines the first key based on the first information.

After receiving the first information from the donor-CU-CP, the donor-CU-UP determines the first key based on the first information. Specifically, in a procedure in which the terminal device accesses the network via the donor-DU, the donor-CU-UP determines the first key based on the first information.

As described above, the first information may include different parameters. It should be understood that the donor-CU-UP also determines the first key based on the first information in different manners when the first information includes the different parameters.

In a possible implementation, the first information includes the intermediate key.

Accordingly, after receiving the first information, the donor-CU-UP derives the first key based on the intermediate key, an IP address of the IAB-DU, and a first IP address of the donor-CU-UP.

For example, the donor-CU-UP derives the first key by using the intermediate key as an input key and by using the IP address of the IAB-DU and the first IP address of the donor-CU-UP as input parameters.

In another possible implementation, the first information includes the user plane key.

Accordingly, after receiving the first information, the donor-CU-UP derives the first key based on the user plane key, an IP address of the IAB-DU, and a first IP address of the donor-CU-UP.

For example, the donor-CU-UP derives the first key by using the user plane key as an input key and by using the IP address of the IAB-DU and the first IP address of the donor-CU-UP as input parameters.

Alternatively, the donor-CU-UP first derives a fourth key based on the user plane key, and then derives the first key based on the fourth key, an IP address of the IAB-DU, and a first IP address of the donor-CU-UP.

For example, the donor-CU-UP derives the first key by using the fourth key as an input key and by using the IP address of the IAB-DU and the first IP address of the donor-CU-UP as input parameters.

The first IP address that is of the donor-CU-UP and that is used by the donor-CU-UP to derive the first key is an IP address for establishing the user plane secure transmission channel. It should be understood that the donor-CU-UP may have a plurality of IP addresses. Before establishing the user plane secure transmission channel, the donor-CU-UP determines one first IP address in the plurality of IP addresses, where the first IP address is for establishing the user plane secure transmission channel. For example, in a procedure in which the terminal device accesses the network via the IAB-DU, after receiving the bearer context setup request message from the donor-CU-CP, the donor-CU-UP determines the first IP address that is of the donor-CU-UP and that is for establishing the user plane secure transmission channel.

The IP address of the IAB-DU is obtained by the donor-CU-UP from the donor-CU-CP. For example, in the procedure in which the terminal device accesses the network via the IAB-DU, a bearer context modification request message sent by the donor-CU-CP to the donor-CU-UP includes the IP address of the IAB-DU.

A condition for triggering the donor-CU-UP to determine the first key based on the first information is not limited in this embodiment of this application.

In an example, the donor-CU-UP may derive the first key when obtaining the IP address of the IAB-DU and the first information.

In another example, the donor-CU-UP derives the first key when receiving the first indication information.

Optionally, after determining the first key, the donor-CU-UP stores a correspondence between the first key and the IP address of the IAB-DU. For example, the correspondence between the first key and the IP address of the IAB-DU is stored in a context of the donor-CU-UP.

S730: The donor-CU-CP sends a second message. Accordingly, in S730, the IAB-DU receives the second message.

The second message includes the first IP address of the donor-CU-UP. For example, the second message is a UE context setup request message. For example, the UE context setup request message is sent by the donor-CU-CP to the IAB-DU when the terminal device accesses the network via the IAB-DU.

S740: The IAB-DU obtains the first key.

For example, S740 includes S741$a$ to S743$a$.

S741$a$: The IAB-DU sends a first request message to the IAB-MT.

The first request message includes the first IP address of the donor-CU-UP, and the first request message requests the first key.

After receiving the first request message from the IAB-DU, the IAB-MT derives the first key based on the intermediate key, the IP address of the IAB-DU, and the first IP address of the donor-CU-UP.

For example, the IAB-MT derives the first key by using the intermediate key as the input key and by using the IP address of the IAB-DU and the first IP address of the donor-CU-UP as the input parameters.

Alternatively, the IAB-MT derives the first key based on the user plane key, the IP address of the IAB-DU, and the first IP address of the donor-CU-UP.

For example, the IAB-MT derives the first key by using the user plane key as the input key and by using the IP address of the IAB-DU and the first IP address of the donor-CU-UP as the input parameters.

Alternatively, the IAB-MT first derives the fourth key based on the user plane key, and then derives the first key based on the fourth key, the IP address of the IAB-DU, and the first IP address of the donor-CU-UP.

For example, the IAB-MT derives the first key by using the fourth key as the input key and by using the IP address of the IAB-DU and the first IP address of the donor-CU-UP as the input parameters.

It may be understood that the IP address of the IAB-DU is obtained from an OAM or the donor-CU-CP after the IAB-MT completes registration.

S742$a$: The IAB-MT sends a first response message to the IAB-DU.

The first response message includes the first key.

Accordingly, after receiving the first key, the IAB-DU stores a correspondence between the first key and the first IP address of the donor-CU-UP. For example, the IAB-DU stores the correspondence between the first key and the first IP address of the donor-CU-UP in a context of the IAB-DU.

For another example, S740 includes S741$b$ to S743$b$.

S741$b$: The IAB-DU sends a third request message to the IAB-MT.

The third request message requests second information, and the second information includes any one of the following: the intermediate key, $K_{gNB}$ and the second parameter, and the user plane key.

S742$b$: The IAB-MT sends a third response message to the IAB-DU.

The third response message includes the second information.

S743$b$: The IAB-DU derives the first key.

If the second information includes the intermediate key, the IAB-DU derives the first key based on the intermediate key, the IP address of the IAB-DU, and the first IP address of the donor-CU-UP.

For example, the IAB-DU derives the first key by using the intermediate key as the input key and by using the IP address of the IAB-DU and the first IP address of the donor-CU-UP as the input parameters.

If the second information includes $K_{gNB}$ and the second parameter, the IAB-DU first derives the intermediate key based on $K_{gNB}$ and the second parameter, and then derives the first key based on the intermediate key as the input key, the IP address of the IAB-DU, and the first IP address of the donor-CU-UP.

If the second information includes the user plane key, the IAB-DU derives the first key based on the user plane key, the IP address of the IAB-DU, and the first IP address of the donor-CU-UP; or the IAB-DU first derives the fourth key based on the user plane key, and then derives the first key based on the fourth key, the IP address of the IAB-DU, and the first IP address of the donor-CU-UP.

For example, the IAB-DU derives the first key by using the user plane key as the input key and by using the IP address of the IAB-DU and the first IP address of the donor-CU-UP as the input parameters; or derives the first key by using the fourth key as the input key and by using the IP address of the IAB-DU and the first IP address of the donor-CU-UP as the input parameters.

It may be understood that the IP address of the IAB-DU is obtained from the IAB-MT after the IAB-DU is started.

Further, after deriving the first key, the IAB-DU stores a correspondence between the first key and the first IP address of the donor-CU-UP. For example, the IAB-DU stores the correspondence between the first key and the first IP address of the donor-CU-UP in a context of the IAB-DU.

It should be understood that an occasion for obtaining the first key by the IAB-DU is not limited in this embodiment of this application.

In an example, the IAB-DU obtains the first key when obtaining the first IP address of the donor-CU-UP.

In another example, the IAB-DU obtains the first key before initiating a user plane secure transmission channel setup procedure to the donor-CU-UP.

In still another example, the IAB-DU obtains the first key after receiving an authentication request message from the donor-CU-UP.

In still another example, the IAB-DU obtains the first key after receiving a user plane data request message from the terminal device.

S760: The donor-CU-UP and the IAB node establish the user plane secure transmission channel by using the first key.

Specifically, S760 is the same as S640 in the foregoing method 600. For brevity, details are not described herein again.

In this embodiment of this application, the donor-CU-CP sends, to the donor-CU-UP, the first information for generating the first key, so that the donor-CU-UP can generate the first key based on the first information. In addition, the IAB node also determines the first key in a same manner. When there is a same first key at the donor-CU-UP and the IAB-DU, the donor-CU-UP and the IAB-DU may establish the user plane secure transmission channel based on the first key, to effectively avoid a problem of an authentication error generated when the donor node and the IAB-DU establish the user plane secure transmission channel. In addition, because the first key is different from $K_{gNB}$, requirements for key isolation and least privilege are satisfied, and a key leakage is avoided.

In addition, when the donor-CU-UP and the IAB-DU use the intermediate key as the input key for deriving the first key, input keys for deriving the user plane key, signaling plane key, and the first key can be kept independent of each other, and data transmission security is ensured.

Alternatively, when the donor-CU-UP and the IAB-DU use the user plane key as the input key for deriving the first key, no additional signaling transmission is needed, and management and implementation of the first key are simplified.

Alternatively, when the donor-CU-UP and the IAB-DU use, as the input key for deriving the first key, the fourth key derived based on the user plane key, no additional signaling transmission is needed, and management and implementation of the first key are simplified.

The following uses FIG. 8 to FIG. 11 as examples to describe the method for establishing a secure transmission channel according to embodiments of this application. It should be noted that, in the following embodiments, a first key is denoted as $K_{IAB-CP}$, and an intermediate key is denoted as Km.

Figure 8:
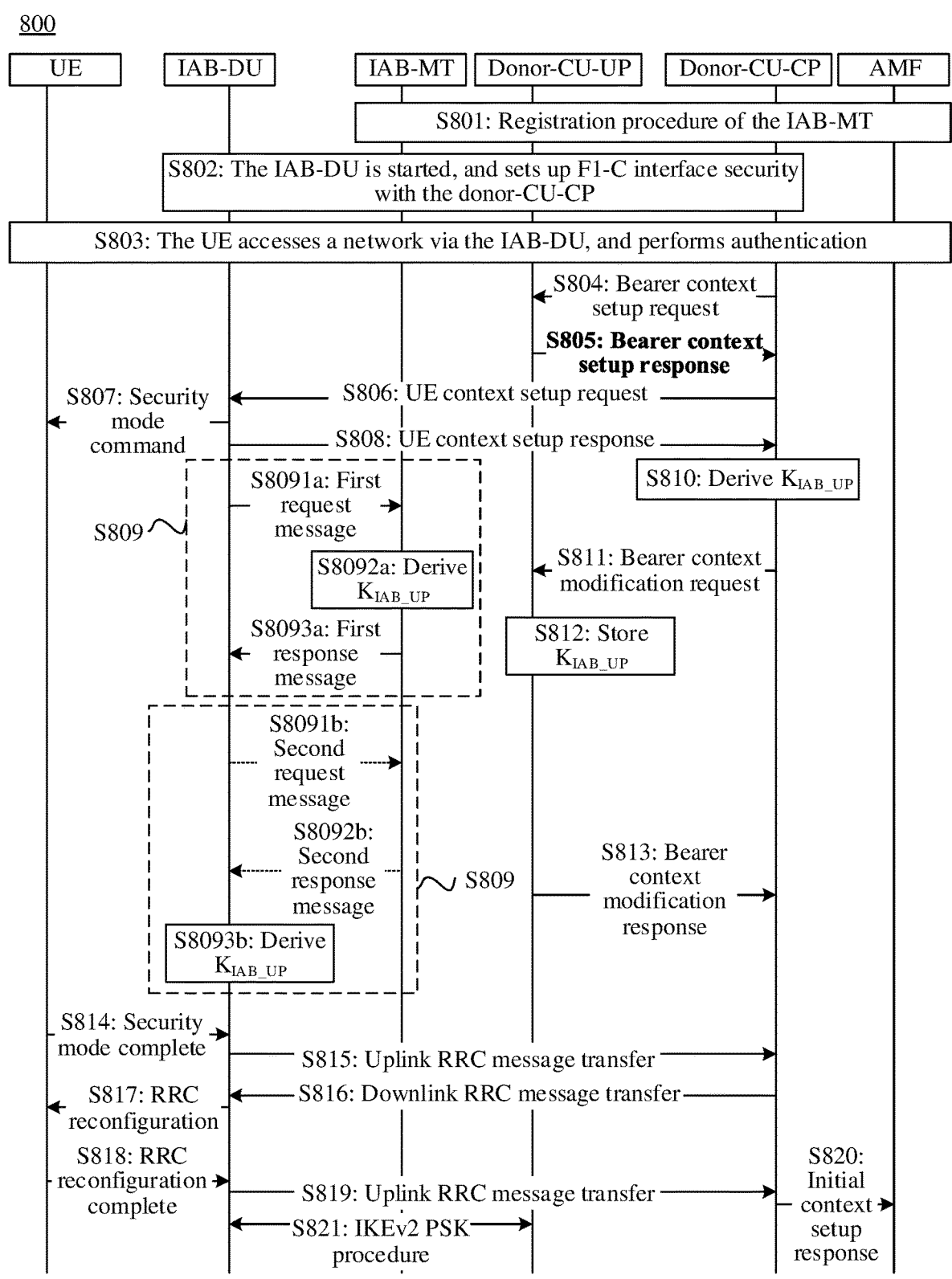

FIG. 8 is a schematic flowchart of a method for establishing a secure transmission channel according to an embodiment of this application. As shown in FIG. 8, the method 800 includes S801 to S821. The following describes the steps in detail.

S801: Perform a registration procedure of an IAB-MT.

For example, the registration procedure of the IAB-MT includes the following steps.

Step 1: The IAB-MT sends an RRC setup request message to a donor-DU.

Step 2: The donor-DU sends an initial uplink (UL) RRC message transfer (initial UL RRC message transfer) to a donor-CU-CP.

Step 3: The donor-CU-CP sends a downlink (DL) message transfer to the donor-DU.

Step 4: The donor-DU sends an RRC setup message to the IAB-MT.

In steps 1 to 4, an IAB node (an IAB-MT part in the IAB node) has some or all functions of UE. After the IAB node is powered on, the IAB-MT selects a donor that supports an IAB service, to access the donor, and sets up an air interface resource.

Step 5: The IAB-MT sends an RRC setup complete message to the donor-DU.

The RRC setup complete message carries an IAB-indication, and the IAB-indication indicates that the current UE is the IAB node.

Step 6: The donor-DU sends RRC message transfer to the donor-CU-CP.

The RRC message transfer carries an "IAB-indication" information element. The donor-CU-CP selects, based on the "IAB-indication" information element, an AMF network element that supports the IAB service.

Step 7: The donor-CU-CP sends an initial UE message to the AMF.

The initial UE message carries the "IAB-indication" information element.

Step 8: The AMF sends an initial context setup request message to the donor-CU-CP.

The initial context setup request message carries an "IAB-authorized" indication, and further carries a first root key (denoted as $K_{gNB}^{1}$) of a donor node. After receiving the initial context setup request message, the donor-CU-CP stores, in a context of the IAB node, $K_{gNB}^{1}$ carried in the initial context setup request message.

In steps 7 and 8, an authentication procedure is performed between a core network and the IAB-MT. After authentication succeeds, the core network checks subscription data to determine whether the IAB-MT belongs to the IAB node. If the IAB-MT belongs to the IAB node, the "IAB-authorized" indication is sent to the donor-CU-CP, where the indication indicates that the core network has authorized the IAB-MT to be the IAB node. Accordingly, after the authentication between the core network and the IAB-MT is completed, the IAB-MT generates $K_{gNB}^{1}$.

Step 9: The donor-CU-CP sends a bearer context setup request message to a donor-CU-UP.

The bearer context setup request message carries a user plane key #1.

After receiving the initial context setup request message from the AMF, the donor-CU-CP selects a user plane algorithm, and derives the user plane key #1 based on $K_{gNB}^{1}$, where the user plane key #1 is for establishing a bearer context. The user plane key #1 includes a user plane integrity protection key (denoted as Kupenc) and/or a user plane encryption protection key (denoted as Kupint).

It should be noted that the user plane key #1 is a key derived from $K_{gNB}^{1}$ and this procedure is irreversible. Therefore, the donor-CU-UP cannot obtain $K_{gNB}^{1}$ based on the user plane key #1 after receiving the user plane key #1. In other words, there is no $K_{gNB}^{1}$ at the donor-CU-UP.

Step 10: The donor-CU-UP sends a bearer context setup response message to the donor-CU-CP.

Step 11: The donor-CU-CP sends a UE context setup request message to the donor-DU.

Step 12: The donor-DU sends a security mode command to the IAB-MT.

Step 13: The donor-DU sends a UE context setup response message to the donor-CU-CP.

Step 14: The donor-CU-CP sends a bearer context modification request message to the donor-CU-UP.

Step 15: The donor-CU-UP sends a bearer context modification response message to the donor-CU-CP.

Step 16: The IAB-MT sends a security mode complete to the donor-DU.

Step 17: The donor-DU sends an uplink RRC message transfer to the donor-CU-CP.

In steps 11 to 17, the donor-CU-CP and the IAB-MT perform a security mode command procedure, and negotiate a used security algorithm and security key.

Step 18: The donor-CU-CP sends a downlink RRC message transfer to the donor-DU.

Step 19: The donor-DU sends an RRC reconfiguration message to the IAB-MT.

Step 20: The IAB-MT sends an RRC reconfiguration complete message to the donor-DU.

Step 21: The donor-DU sends an uplink RRC message transfer to the donor-CU-CP.

In steps 18 to 21, the donor-CU-CP and the IAB-MT perform an RRC reconfiguration procedure, and complete an initial context setup procedure.

Step 22: The donor-CU-CP sends an initial context setup response message to the AMF.

S802: An IAB-DU is started, and sets up F1-C interface security with the donor-CU-CP.

For example, after the IAB-MT completes registration, the IAB-MT obtains an IP address of the IAB-DU and an IP address of the donor-CU-CP.

In an example, after establishing a PDU session with an OAM through the core network, the IAB-MT obtains the IP address of the IAB-DU and the IP address of the donor-CU-CP from the OAM by using a user plane.

In another example, the IAB-MT obtains the IP address of the IAB-DU and the IP address of the donor-CU-CP from the donor-CU-CP. Specifically, after establishing an IP connection to an OAM, the donor-CU-CP obtains the IP address of the IAB-DU and the IP address of the donor-CU-CP from the OAM. Further, the donor-CU-CP sends an RRC message to the IAB-MT, where the RRC message includes the IP address of the IAB-DU and the IP address of the donor-CU-CP.

After obtaining the IP address of the IAB-DU and the IP address of the donor-CU-CP, the IAB-MT sends the IP address of the IAB-DU and the IP address of the donor-CU-CP to the IAB-DU for use.

Optionally, the IAB-MT further derives $K_{IAB}$-op by using $K_{gNB}^{1}$ as an input key and by using the IP address of the IAB-DU and the IP address of the donor-CU-CP as input parameters, and sends $K_{IAB-CP}$ to the IAB-DU.

Optionally, the IAB-MT sends $K_{gNB}^{1}$ to the IAB-DU. Accordingly, the IAB-DU derives $K_{IAB-CP}$ by using $K_{gNB}^{1}$ as an input key and by using the IP address of the IAB-DU and the IP address of the donor-CU-CP as input parameters.

Accordingly, the donor-CU-CP also derives $K_{IAB-CP}$ by using $K_{gNB}^{1}$ as the input key and by using the IP address of the IAB-DU and the IP address of the donor-CU-CP as the input parameters.

The IAB-DU and the donor-CU-CP establish an F1-C interface, and negotiate to establish a secure transmission channel of F1-C. An authentication credential used in a procedure in which the IAB-DU and the donor-CU-CP negotiate to establish the secure transmission channel of the F1-C interface is $K_{IAB-CP}$.

After the IAB-DU and the donor-CU-CP establish the secure transmission channel of the F1-C interface, the donor-CU-CP may configure a parameter for the IAB-DU through the F1-C interface. After the donor-CU-CP configures the parameter for the IAB-DU through the F1-C interface, the IAB-DU may provide a mobile network service for common UE.

After the donor-CU-CP and the IAB-DU establish the secure transmission channel of the F1-C interface, the donor-CU-CP marks the IAB-DU as the IAB node by using a first identifier, and stores the first identifier as the context of the IAB node. For example, the first identifier is the IP address of the IAB-DU.

S803: The UE accesses a network via the IAB-DU, and performs authentication.

For example, S803 includes the following steps.

Step 1. The UE sends an RRC setup request message to the IAB-DU.

Step 2: The IAB-DU sends an initial uplink RRC message transfer to the donor-CU-CP.

Step 3: An IAB-CU-CP sends a downlink message transfer to the donor-DU.

Step 4: The IAB-DU sends an RRC setup message to the UE.

In steps 1 to 4, after the UE is powered on the UE selects a base station to access the base station, and sets up an air interface resource. The base station selected by the UE is the IAB-DU.

Step 5: The UE sends an RRC setup complete message to the IAB-DU.

Step 6: The IAB-DU sends an RRC message transfer to the donor-CU-CP.

Step 7: The donor-CU-CP sends an initial UE message to the AMF.

Step 8: The AMF sends an initial context setup request message to the donor-CU-CP.

In steps 5 to 8, the UE initiates a registration procedure, sets up a connection to the core network via the IAB-DU, and completes an authentication procedure. After the authentication is completed, the AMF sends the initial context setup request message to the donor-CU-CP, where the initial context setup request message carries a second root key (denoted as $K_{gNB}^{-2}$) of the donor node.

S804: The donor-CU-CP sends a bearer context setup request message to the donor-CU-UP.

After the donor-CU-CP receives the initial context setup request message from the AMF, the donor-CU-CP is triggered to establish a bearer context. The donor-CU-CP sends the bearer context setup request message to the donor-CU-UP, where the bearer context setup request message carries a user plane key #2, and the user plane key #2 is for air interface user plane security protection between the donor-CU-UP and the UE.

S805: The donor-CU-UP sends a bearer context setup response message to the donor-CU-CP.

The bearer context setup response message carries a first IP address of the donor-CU-UP, and the first IP address is for establishing a secure transmission channel of an F1-U interface between the IAB-DU and the donor-CU-UP, to transfer user plane data.

S806: The donor-CU-CP sends a UE context setup request message to the IAB-DU.

The UE context setup request message includes the first IP address of the donor-CU-UP.

S807: The IAB-DU sends a security mode command to the UE.

S808: The IAB-DU sends a UE context setup response to the donor-CU-CP.

S809: The IAB-DU obtains $K_{IAB\_UP}$.

For example, S809 includes S8091a to S8093a.

S8091a: The IAB-DU sends a first request message to the IAB-MT.

The first request message includes the first IP address of the donor-CU-UP, and the first request message requests $K_{IAB\_UP}$.

S8092a: The IAB-MT derives $K_{IAB\_UP}$.

After receiving the first request message from the IAB-DU, the IAB-MT derives $K_{IAB\_UP}$ by using $K_{gNB}^{1}$ as an input key and by using the IP address of the IAB-DU and the first IP address of the donor-CU-UP as input parameters, and then sends $K_{IAB\_UP}$ to the IAB-DU. It may be understood that the IP address of the IAB-DU is obtained from the OAM or the donor-CU-CP after the IAB-MT completes registration.

S8093a: The IAB-MT sends a first response message to the IAB-DU.

The first response message includes $K_{IAB\_UP}$.

Accordingly, after receiving $K_{IAB\_UP}$, the IAB-DU stores $K_{IAB\_UP}$. For example, the IAB-DU stores a correspondence between $K_{IAB\_UP}$ and the first IP address of the donor-CU-UP in a context of the IAB-DU.

For another example, S809 includes S8091*b* to S8093*b*.

S8091*b*: The IAB-DU sends a second request message to the IAB-MT.

The second request message requests $K_{gNB}^{1}$.

S8092*b*: The IAB-MT sends a second response message to the IAB-DU.

The second response message includes $K_{gNB}^{1}$.

It should be understood that S8091*b* and S8092*b* are optional steps. That is, if the IAB-DU locally stores $K_{gNB}^{1}$, S809 includes only S8093*b*. $K_{gNB}^{1}$ locally stored by the IAB-DU is obtained from the IAB-MT before S809 is performed. For example, after the IAB-DU is started, the IAB-MT sends $K_{gNB}^{1}$ to the IAB-DU when sending the IP address of the IAB-DU to the IAB-DU.

S8093*b*: The IAB-DU derives $K_{IAB\_UP}$.

The IAB-DU derives $K_{IAB\_UP}$ by using $K_{gNB}^{1}$ as an input key and by using the IP address of the IAB-DU and the first IP address of the donor-CU-UP as input parameters. It may be understood that the IP address of the IAB-DU is obtained from the IAB-MT after the IAB-DU is started.

Further, after deriving $K_{IAB\_UP}$, the IAB-DU stores $K_{IAB\_UP}$. For example, the IAB-DU stores a correspondence between $K_{IAB\_UP}$ and the first IP address of the donor-CU-UP in a context of the IAB-DU.

It should be understood that an occasion for obtaining $K_{IAB}$ up by the IAB-DU is not limited in this embodiment of this application.

In an example, the IAB-DU obtains $K_{IAB\_UP}$ when obtaining the first IP address of the donor-CU-UP. For example, if S809 includes S8091*a* to S8093*a*, the IAB-DU sends the first request message to the IAB-MT when obtaining the first IP address of the donor-CU-UP. For another example, if S809 includes S8091*b* to S8093*b*, the IAB-DU sends the second request message to the IAB-MT or derives $K_{IAB\_UP}$ when obtaining the first IP address of the donor-CU-UP.

In another example, the IAB-DU obtains $K_{IAB}$ up before initiating an IPsec setup procedure to the donor-CU-UP. For example, if S809 includes S8091*a* to S8093*a*, the IAB-DU sends the first request message to the IAB-MT before initiating the IPsec setup procedure to the donor-CU-UP. For another example, if S809 includes S8091*b* to S8093*b*, the IAB-DU sends the second request message to the IAB-MT or derives $K_{IAB\_UP}$ before initiating the IPsec setup procedure to the donor-CU-UP.

In still another example, the IAB-DU obtains $K_{IAB\_UP}$ after receiving an IPsec authentication request from the donor-CU-UP. For example, if S809 includes S8091*a* to S8093*a*, the IAB-DU sends the first request message to the IAB-MT after receiving the IPsec authentication request from the donor-CU-UP. For another example, if S809 includes S8091*b* to S8093*b*, the IAB-DU sends the second request message to the IAB-MT or derives $K_{IAB\_UP}$ after receiving the IPsec authentication request from the donor-CU-UP.

In still another example, the IAB-DU obtains $K_{IAB\_UP}$ after receiving a user plane data request from the UE. For example, if S809 includes S8091*a* to S8093*a*, the IAB-DU sends the first request message to the IAB-MT after receiving the user plane data request from the UE. For another example, if S809 includes S8091*b* to S8093*b*, the IAB-DU sends the second request message to the IAB-MT or derives $K_{IAB\_UP}$ after receiving the user plane data request from the UE.

S810: The donor-CU-CP derives $K_{IAB\_UP}$.

The IAB-DU derives $K_{IAB\_UP}$ by using $K_{gNB}^{1}$ as the input key and by using the IP address of the IAB-DU and the first IP address of the donor-CU-UP as the input parameters.

For example, after receiving the bearer context setup response message from the donor-CU-UP, the donor-CU-CP derives $K_{IAB\_UP}$ based on the first IP address that is of the donor-CU-UP and that is included in the bearer context setup response message. In other words, S810 may be performed after S805. Specifically, S810 may be performed after S805 and before S811.

For another example, the donor-CU-UP derives $K_{IAB\_UP}$ after determining that the IAB-DU belongs to the IAB node. As described in S802, the donor-CU-CP may mark, by using the first identifier, that the IAB-DU belongs to the IAB node, and store the first identifier in the context of the IAB-DU. Based on this, before the donor-CU-CP derives $K_{IAB\_UP}$, the donor-CU-CP may query whether the context of the IAB node includes the first identifier. If the context of the IAB node includes the first identifier, the donor-CU-CP determines that the IAB-DU belongs to the IAB node; or if the context of the IAB node does not include the first identifier, the donor-CU-CP determines that the IAB-DU does not belong to the IAB node. Further, the donor-CU-CP derives KIB up after determining that the IAB-DU belongs to the IAB node.

S811: The donor-CU-CP sends a bearer context modification request message to the donor-CU-UP.

The bearer context modification request message includes the IP address of the IAB-DU and $K_{IAB\_UP}$.

For example, $K_{IAB\_UP}$ may be carried in a security information information element included in the bearer context modification request message. For another example, $K_{IAB\_UP}$ may be carried in a newly defined information element in the bearer context modification request message.

Optionally, the bearer context modification request message further includes first indication information, and the first indication information indicates that the IAB-DU belongs to the IAB node. For example, the first indication information may be an independent information element. For example, the first indication information is an "IAB-indicator" information element. For another example, the first indication information may be the IP address of the IAB-DU or $K_{IAB\_UP}$. That is, the IP address of the IAB-DU or $K_{IAB\_UP}$ may further indicate that the IAB-DU belongs to the IAB node.

It should be understood that, in this embodiment of this application, that the donor-CU-CP sends $K_{IAB\_UP}$ to the donor-CU-UP via the bearer context modification request message is merely used as an example for description, and should not constitute any limitation on this embodiment of this application. For example, the donor-CU-CP may alternatively send $K_{IAB\_UP}$ to the donor-CU-UP via a newly defined message. For another example, if the donor-CU-CP has predicted an IP address of the donor-CU-UP before the donor-CU-CP sends the bearer context setup request message to the donor-CU-UP, the donor-CU-UP may derive $K_{IAB\_UP}$ before sending the bearer context setup request message, and send $K_{IAB\_UP}$ to the donor-CU-UP via the bearer context setup request message.

S812: The donor-CU-UP stores $K_{IAB\_UP}$.

The donor-CU-UP stores a correspondence between the IP address of the IAB-DU and $K_{IAB\_UP}$ in a context of the donor-CU-UP.

For example, the donor-CU-UP stores $K_{IAB\_UP}$ when receiving $K_{IAB\_UP}$.

For another example, the donor-CU-UP stores $K_{IAB\_UP}$ when receiving the first indication information and $K_{IAB\_UP}$.

S813: The donor-CU-UP sends a bearer context modification response message to the donor-CU-CP.

S814: The UE sends a security mode complete to the IAB-DU.

S815: The IAB-DU sends an uplink RRC message transfer to the donor-CU-CP.

S816: The donor-CU-CP sends a downlink RRC message transfer to the IAB-DU.

S817: The IAB-DU sends an RRC reconfiguration message to the UE.

S818: The UE sends an RRC reconfiguration complete message to the IAB-DU.

S819: The IAB-DU sends an uplink RRC message transfer to the donor-CU-CP.

S820: The donor-CU-CP sends an initial context setup response message to the AMF.

S821: The IAB-DU and the donor-CU-UP perform an IKEv2 PSK procedure.

Specifically, an F1-U interface bearer is established between the IAB-DU and the donor-CU-UP, and the IAB-DU and the donor-CU-UP negotiate and establish the secure transmission channel of the F1-U interface. For example, the IAB-DU and the donor-CU-UP establish an IPsec secure transmission channel by using an IKEv2 PSK protocol. In the $1^{st}$ message exchange, the IAB-DU and the donor-CU-UP complete IKE SA parameter negotiation in a plaintext manner, including negotiation, encryption, and authentication algorithms, an exchange of temporary random numbers, and a DH exchange. In the $2^{nd}$ message exchange, the IAB-DU and the donor-CU-UP separately generate an authentication parameter by using $K_{IAB\_UP}$, and send the authentication parameter to a peer end, to complete identity authentication.

It may be understood that, when the IAB-DU and the donor-CU-UP establish the IPsec secure transmission channel by using the IKEv2 PSK protocol, the IAB-DU determines, based on the correspondence that is stored in the context of the IAB-DU and that is between $K_{IAB\_UP}$ and the first IP address of the donor-CU-UP, to use $K_{IAB\_UP}$ as an authentication credential used when the IPsec secure transmission channel is established, and the donor-CU-UP determines, based on the correspondence that is stored in the context of the donor-CU-UP and that is between $K_{IAB\_UP}$ and the IP address of the IAB-DU, to use $K_{IAB\_UP}$ as the authentication credential used when the IPsec secure transmission channel is established.

It should be further understood that the IKEv2 PSK procedure performed by the IAB-DU and the donor-CU-UP may be triggered by the IAB-DU, or may be triggered by the donor-CU-UP. For example, if the F1-U interface bearer between the IAB-DU and the donor-CU-UP has not been established when the IAB-DU receives the user plane data request from the UE, the IAB-DU triggers the IKEv2 PSK procedure. For another example, if the F1-U interface bearer between the IAB-DU and the donor-CU-UP has not been established when the donor-CU-UP receives downlink data of the UE, the donor-CU-UP triggers the IKEv2 PSK procedure.

It should be further understood that whether S821 is performed before or after the UE completes registration is not limited in this embodiment of this application. For example, S821 may be performed after S812. That is, S821 may be performed after the IAB-DU and the donor-CU-UP obtain $K_{IAB\_UP}$. For another example, S821 may be performed after S820. For example, after the UE completes registration, S821 is performed when there is user plane data of the UE for transmission.

Figure 9:
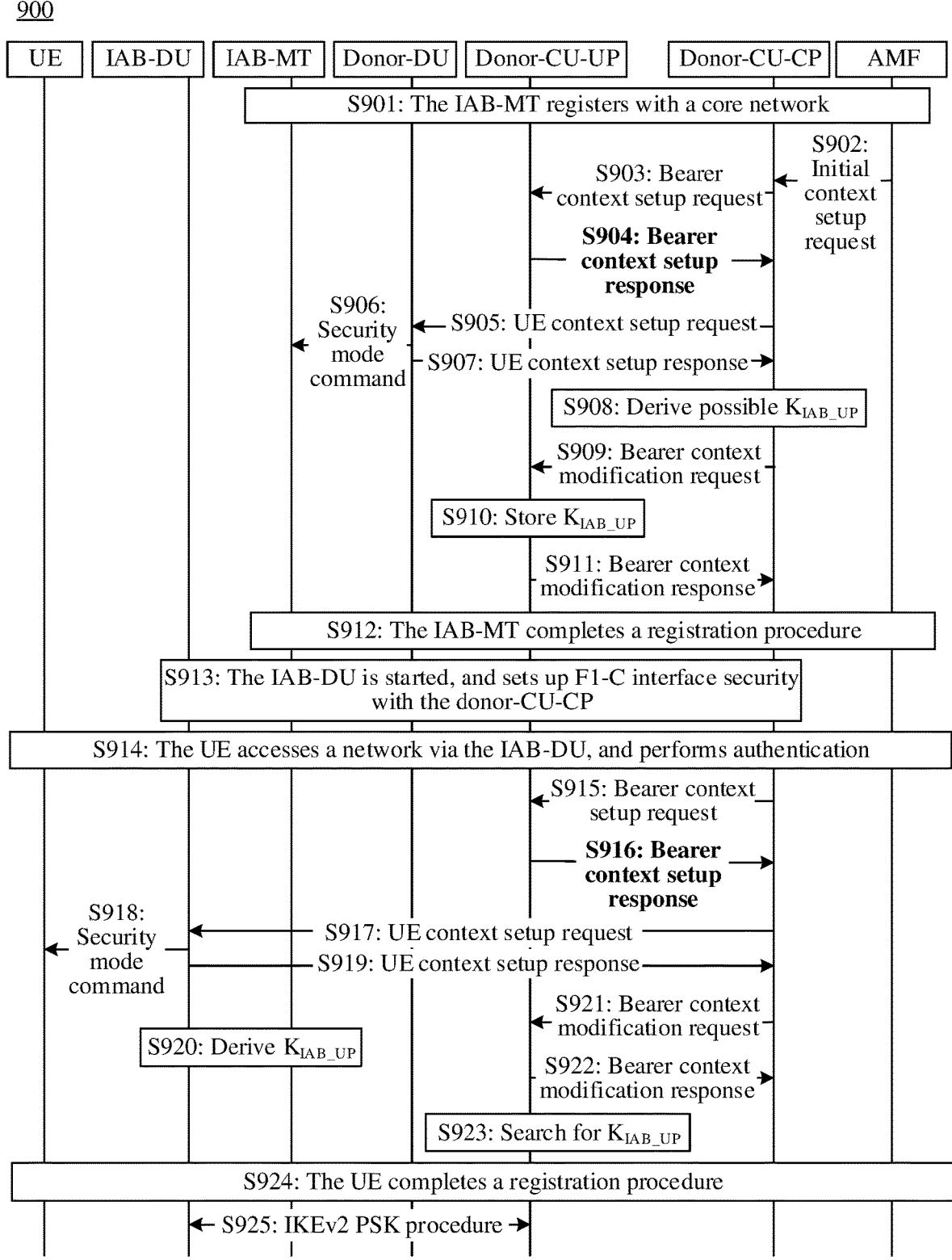

FIG. 9 is a schematic flowchart of a method for establishing a secure transmission channel according to an embodiment of this application. As shown in FIG. 9, the method 900 includes S901 to S925. The following describes the steps in detail.

S901: An IAB-MT registers with a core network.

Specifically, in S901, step 1 to step 7 included in S801 in the foregoing method 800 are performed.

S902: An AMF sends an initial context setup request message to a donor-CU-CP.

The initial context setup request message carries an "IAB-authorized" indication, and further carries a first root key (denoted as $K_{gNB}{}^1$) of a donor node. After receiving the initial context setup request message, the donor-CU-CP stores, in a context of an IAB node, $K_{gNB}{}^1$ carried in the initial context setup request message. The donor-CU-CP may further determine, based on "IAB-authorized", that the IAB-MT belongs to the IAB node.

The core network checks subscription data to determine whether the JAB-MT belongs to the IAB node. If the IAB-MT belongs to the IAB node, the "IAB-authorized" indication is sent to the donor-CU-CP, where the indication indicates that the core network has authorized the IAB-MT to be the IAB node. Accordingly, after authentication between the core network and the IAB-MT is completed, the IAB-MT generates $K_{gNB}{}^1$.

S903: The donor-CU-CP sends a bearer context setup request message to a donor-CU-UP.

The bearer context setup request message carries a user plane key #1.

After receiving the initial context setup request message from the AMF, the donor-CU-CP selects a user plane algorithm, and derives the user plane key #1 based on $K_{gNB}{}^1$, where the user plane key #1 is for establishing a bearer context. The user plane key #1 includes a user plane integrity protection key (denoted as Kupenc) and/or a user plane encryption protection key (denoted as Kupint).

It should be noted that the user plane key #1 is a key derived from $K_{gNB}{}^1$, and this procedure is irreversible. Therefore, the donor-CU-UP cannot obtain $K_{gNB}{}^1$ based on the user plane key #1 after receiving the user plane key #1. In other words, there is no $K_{gNB}{}^1$ at the donor-CU-UP.

The bearer context setup request message further includes first indication information, and the first indication information indicates that the IAB-MT belongs to the IAB node. For example, the indication information may be an independent information element. For example, the first indication information is an "IAB-indicator" information element.

Specifically, when determining that the IAB-MT belongs to the IAB node, the donor-CU-CP carries the first indication information in the bearer context setup request message. For example, if the initial context setup request message received by the donor-CU-CP from the AMF includes the "IAB-authorized" indication, the donor-CU-CP determines that the IAB-MT belongs to the IAB node. For another example, in S901, if an RRC message transfer received by the donor-CU-CP from a donor-DU includes an "IAB-indication", the donor-CU-CP determines that the IAB-MT belongs to the IAB node.

S904: The donor-CU-UP sends a bearer context setup response message to the donor-CU-CP.

The bearer context setup response message includes all possible IP addresses of the donor-CU-UP. Specifically, the donor-CU-UP reports all the possible IP addresses to the donor-CU-CP based on the first indication information included in the bearer context setup request message.

For example, if the donor-CU-UP has three IP addresses: a CU-UP IP 1, a CU-UP IP 2, and a CU-UP IP 3, the donor-CU-UP reports the three IP addresses to the donor-CU-CP.

S905: The donor-CU-CP sends a UE context setup request message to the donor-DU.

S906: The donor-DU sends a security mode command to the IAB-MT.

S907: The donor-DU sends a UE context setup response message to the donor-CU-CP.

S908: The donor-CU-CP derives possible $K_{IAB\_UP}$.

As described above, in S904, the donor-CU-UP reports all the possible IP addresses to the donor-CU-CP based on the indication information. Accordingly, in S908, the donor-CU-CP derives, based on a received first IP address of the donor-CU-UP. $K_{IAB\_UP}$ corresponding to each IP address of the donor-CU-UP.

For example, the donor-CU-CP derives, by using $K_{gNB}^{1}$ as an input key and by using an IP address of an IAB-DU and the CU-UP IP 1 as input parameters, $K_{IAB\_UP\ 1}$ corresponding to the CU-UP IP 1: the donor-CU-CP derives, by using $K_{gNB}^{1}$ as an input key and by using the IP address of the IAB-DU and the CU-UP IP 2 as input parameters, $K_{IAB\_UP\ 2}$ corresponding to the CU-UP IP 2; and the donor-CU-CP derives, by using $K_{gNB}^{1}$ as an input key and by using the IP address of the IAB-DU and the CU-UP IP 3 as input parameters, $K_{IAB\_UP}\ 3$ corresponding to the CU-UP IP 3.

It should be understood that S908 may be performed after S904, may be performed after S905, may be performed after S906, or may be performed after S907.

S909: The donor-CU-CP sends a bearer context modification request message to the donor-CU-UP.

The bearer context modification request message includes a plurality of keys $K_{IAB\_UP}$ derived by the donor-CU-CP and a plurality of groups of first parameters corresponding to the plurality of keys $K_{IAB\_UP}$, and one group of first parameters corresponding to each key $K_{IAB\_UP}$ includes input parameters for deriving $K_{IAB\_UP}$.

For example, the bearer context modification request message includes $\{K_{IAB\_UP\ 1}$, CU-UP 1, and IAB-DU IP$\}$, $\{K_{IAB\_UP\ 2}$, CU-UP 2, and IAB-DU IP$\}$, and $\{K_{IAB\_UP\ 3}$, CU-UP 3, and IAB-DU IP$\}$.

$\{K_{IAB\_UP\ 1}$, CU-UP 1, and IAB-DU IP$\}$ indicates a correspondence between both the IP address of the IAB-DU and the CU-UP IP 1 and $K_{IAB\_UP\ 1}$; $\{K_{IAB\_UP\ 2}$, CU-UP 2, and IAB-DU IP$\}$ indicates a correspondence between both the IP address of the IAB-DU and the CU-UP IP 2 and $K_{IAB\_UP\ 2}$; and $\{K_{IAB\_UP\ 3}$, CU-UP 3, and IAB-DU IP$\}$ indicates a correspondence between both the IP address of the IAB-DU and the CU-UP IP 3 and $K_{IAB\_UP\ 3}$.

S910: The donor-CU-UP stores $K_{IAB\_UP}$.

Specifically, the donor-CU-UP stores, in a context of the donor-CU-UP, a correspondence between the plurality of keys $K_{IAB\_UP}$ and the plurality of groups of first parameters that are included in the bearer context modification request message.

S911: The donor-CU-UP sends a bearer context modification response message to the donor-CU-CP.

S912: The IAB-MT completes a registration procedure.

Specifically, in S912, step 16 to step 22 included in S801 in the foregoing method 800 are performed.

S913: The IAB-DU is started, and sets up F1-C interface security with the donor-CU-CP.

Specifically, S913 is the same as S802 in the foregoing method 800. For brevity, details are not described herein again.

S914: UE accesses a network via the IAB-DU, and performs authentication.

Specifically, S914 is the same as S803 in the foregoing method 800. For brevity, details are not described herein again.

S915: The donor-CU-CP sends a bearer context setup request message to the donor-CU-UP.

Specifically, S915 is the same as S804 in the foregoing method 800. For brevity, details are not described herein again.

S916: The donor-CU-UP sends a bearer context setup response message to the donor-CU-CP.

The bearer context setup response message carries the first IP address of the donor-CU-UP, and the first IP address is for establishing a secure transmission channel of an F1-U interface between the IAB-DU and the donor-CU-UP, to transfer user plane data. For example, the first IP address of the donor-CU-UP is the CU-UP IP 3 in S904.

S917: The donor-CU-CP sends a UE context setup request message to the IAB-DU.

The UE context setup request message includes the first IP address of the donor-CU-UP. For example, the first IP address of the donor-CU-UP is the CU-UP IP 3 in S904.

S918: The IAB-DU sends a security mode command to the UE.

S919: The IAB-DU sends a UE context setup response to the donor-CU-CP.

S920: The IAB-DU obtains $K_{IAB\_UP}$.

Specifically, for a manner in which the IAB-DU obtains $K_{IAB\_UP}$, refer to the descriptions in S809 in the foregoing method 800. As described in S917, the first IP address that is of the donor-CU-UP and that is received by the IAB-DU is the CU-UP IP 3. In this case, in S920, $K_{IAB\_UP}$ obtained by the IAB-DU is derived by using $K_{gNB}^{1}$ as the input key and by using the IP address of the IAB-DU and the CU-UP IP 3 as the input parameters. That is, $K_{IAB\_UP}$ Obtained by the IAB-DU is $K_{IAB\_UP\ 3}$ in S908.

S921: The donor-CU-CP sends a bearer context modification request message to the donor-CU-UP.

The bearer context modification request message includes the IP address of the IAB-DU.

S922: The donor-CU-UP sends a bearer context modification response message to the donor-CU-CP.

S923: The donor-CU-UP searches for $K_{IAB\_UP}$.

Specifically, the donor-CU-UP searches the locally stored context of the donor-CU-UP for corresponding $K_{IAB\_UP}$ based on the first IP address that is of the donor-CU-UP and that is determined in S916 and is for establishing the secure transmission channel of the F1-U interface between the IAB-DU and the donor-CU-UP and the IP address that is of the IAB-DU and that is received in S921. For example, if the first IP address that is determined by the donor-CU-UP in S916 and that is for establishing the secure transmission channel of the F1-U interface is the CU-UP IP 3, the donor-CU-UP determines, based on the stored correspondence between the plurality of keys $K_{IAB\_UP}$ and the plurality of groups of first parameters, that $K_{IAB\_UP\ 3}$ corresponds to the address of the IAB-DU and the CU-UP IP 3.

After determining $K_{IAB\_UP\ 3}$, the donor-CU-UP stores a correspondence between the IP address of the IAB-DU and $K_{IAB\_UP\ 3}$ in the context of the donor-CU-UP.

S924: The UE completes a registration procedure.

Specifically, in S924, S814 to S820 in the foregoing method 800 are performed.

S925: The IAB-DU and the donor-CU-UP perform an IKEv2 PSK procedure.

Specifically, S925 is the same as S821 in the foregoing method 800. For brevity, details are not described herein again.

Figure 10:
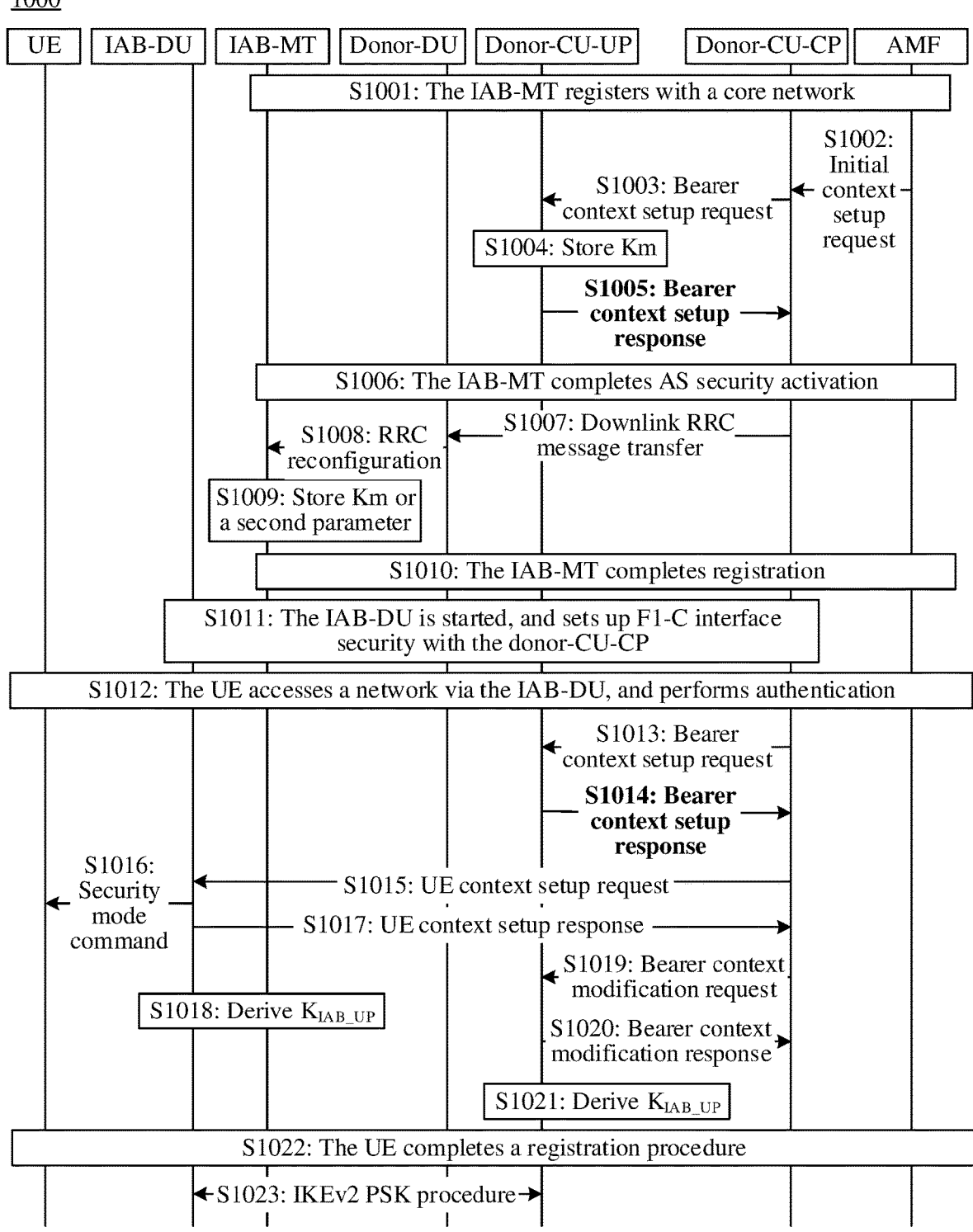

FIG. 10 is a schematic flowchart of a method for establishing a secure transmission channel according to an embodiment of this application. As shown in FIG. 10, the method 1000 includes S1001 to S1023. The following describes the steps in detail.

S1001: An IAB-MT registers with a core network.

Specifically, in S1001, step 1 to step 7 included in S801 in the foregoing method 800 are performed.

S1002: An AMF sends an initial context setup request message to a donor-CU-CP.

Specifically, S1002 is the same as S902 in the foregoing method 900. For brevity, details are not described herein again.

S1003: The donor-CU-CP sends a bearer context setup request message to a donor-CU-UP.

The bearer context setup request message carries a user plane key #1 and an intermediate key (denoted as Km).

After receiving the initial context setup request message from the AMF, the donor-CU-CP selects a user plane algorithm, and derives the user plane key #1 based on $K_{gNB}{}^1$, where the user plane key #1 is for establishing a bearer context. The user plane key #1 includes a user plane integrity protection key (denoted as Kupenc) and/or a user plane encryption protection key (denoted as Kupint).

It should be noted that the user plane key #1 is a key derived from $K_{gNB}{}^1$, and this procedure is irreversible. Therefore, the donor-CU-UP cannot obtain $K_{gNB}{}^1$ based on the user plane key #1 after receiving the user plane key #1. In other words, there is no $K_{gNB}{}^1$ at the donor-CU-UP.

Km is used as an input key for generating $K_{IAB\_UP}$, and is for generating $K_{IAB\_UP}$. For example, Km is derived based on $K_{gNB}{}^1$ and a second parameter. The second parameter includes one or more of the following: a PCI, an ARFCN-DL, a secondary node counter, a constant, and a freshness parameter. For another example, Km is a random number generated by the donor-CU-UP.

Optionally, when determining that the IAB-MT belongs to an IAB node, the donor-CU-CP generates Km, or sends Km to the donor-CU-UP. For example, if the initial context setup request message received by the donor-CU-CP from the AMF includes an "IAB-authorized" indication, the donor-CU-CP determines that the IAB-MT belongs to the IAB node. For another example, in S901, if an RRC message transfer received by the donor-CU-CP from a donor-DU includes an IAB-indication, the donor-CU-CP determines that the IAB-MT belongs to the IAB node.

Optionally, the bearer context setup request message further includes first indication information, and the first indication information indicates that the IAB-MT belongs to the IAB node. For example, the first indication information may be an independent information element. For example, the first indication information is an "IAB-indicator" information element. For another example, the first indication information is Km. That is, Km further indicates that the IAB-MT belongs to the IAB node.

Specifically, when determining that the IAB-MT belongs to the IAB node, the donor-CU-CP carries the first indication information in the bearer context setup request message.

S1004: The donor-CU-UP stores Km.

For example, the donor-CU-UP stores Km in a context of the donor-CU-UP.

Optionally, if the bearer context setup request message further includes the first indication information, in S1004, the donor-CU-UP further stores the first indication information.

S1005: The donor-CU-UP sends a bearer context setup response message to the donor-CU-CP.

S1006: The IAB-MT completes AS security activation.

Specifically, in S1006, step 11 to step 17 included in S801 in the foregoing method 800 are performed.

S1007: The donor-CU-CP sends a downlink RRC message transfer to the donor-DU.

The RRC message transfer includes an RRC reconfiguration message. Optionally, if in S1003, Km generated by the donor-CU-CP is the random number, the RRC reconfiguration message includes Km.

Alternatively, if in S1003, the second parameter used by the donor-CU-CP to generate Km includes a parameter unknown to the IAB-MT, the RRC reconfiguration message includes Km or the parameter that is unknown to the IAB-MT and that is in the second parameter for generating Km. For example, the second parameter used by the donor-CU-CP to generate Km includes a random number and the PCI, where the random number is the parameter unknown to the IAB-MT, and the PCI is a parameter known to the IAB-MT. In this case, the donor-CU-CP carries, in the RRC reconfiguration message, Km or the random number that is included in the second parameter.

S1008: The donor-DU sends the RRC reconfiguration message to the IAB-MT.

The donor-DU sends, to the IAB-MT, the RRC reconfiguration message included in the downlink RRC message transfer.

S1009: The IAB-MT stores Km or the parameter that is unknown to the IAB-MT and that is in the second parameter for generating Km.

If the RRC reconfiguration information received by the IAB-MT includes Km or the parameter that is unknown to the IAB-MT and that is in the second parameter for generating Km, the IAB-MT stores Km or the parameter that is unknown to the IAB-MT and that is in the second parameter for generating Km.

S1010: The IAB-MT completes registration.

Specifically, in S1010, step 20 to step 22 included in S801 in the foregoing method 800 are performed.

S1011: An IAB-DU is started, and sets up F1-C interface security with the donor-CU-CP.

Specifically, S913 is the same as S802 in the foregoing method 800. For brevity, details are not described herein again.

S1012: UE accesses a network via the IAB-DU, and performs authentication.

Specifically, S1012 is the same as S803 in the foregoing method 800. For brevity, details are not described herein again.

S1013: The donor-CU-CP sends a bearer context setup request message to the donor-CU-UP.

Specifically, S1013 is the same as S804 in the foregoing method 800. For brevity, details are not described herein again.

S1014: The donor-CU-UP sends a bearer context setup response message to the donor-CU-CP.

The bearer context setup response message carries a first IP address of the donor-CU-UP, and the first IP address is for establishing a secure transmission channel of an F1-U interface between the IAB-DU and the donor-CU-UP, to transfer user plane data.

S1015: The donor-CU-CP sends a UE context setup request message to the IAB-DU.

The UE context setup request message includes the first IP address of the donor-CU-UP.

S1016: The IAB-DU sends a security mode command to the UE.

S1017: The IAB-DU sends a UE context setup response message to the donor-CU-CP.

S1018: The IAB-DU obtains $K_{IAB\_UP}$.

For example, S1018 includes S10181a to S10183a.

S10181a: The IAB-DU sends a first request message to the IAB-MT.

The first request message includes the first IP address of the donor-CU-UP, and the first request message requests $K_{IAB\_UP}$.

S10182a: The IAB-MT derives $K_{IAB\_UP}$.

After receiving the first request message from the IAB-DU, the IAB-MT derives $K_{IAB\_UP}$ by using Km as an input key and by using an IP address of the IAB-DU and the first IP address of the donor-CU-UP as input parameters, and then sends $K_{IAB\_UP}$ to the IAB-DU. It may be understood that the IP address of the IAB-DU is obtained from an OAM or the donor-CU-CP after the IAB-MT completes registration.

S10183a: The IAB-MT sends a first response message to the IAB-DU.

The first response message includes $K_{IAB\_UP}$.

Accordingly, after receiving $K_{IAB\_UP}$, the IAB-DU stores $K_{IAB\_UP}$. For example, the IAB-DU stores a correspondence between $K_{IAB\_UP}$ and the first IP address of the donor-CU-UP in a context of the IAB-DU.

For another example, S1018 includes S10181b to S10183b.

S10181b: The IAB-DU sends a third request message to the IAB-MT.

The third request message requests Km, or requests $K_{gNB}^{1}$ and the second parameter.

S10182b: The IAB-MT sends a third response message to the IAB-DU.

The third response message includes Km, or includes $K_{gNB}^{1}$ and the second parameter.

S10183b: The IAB-DU derives $K_{IAB\_UP}$.

If the third response message includes Km, the IAB-DU derives $K_{IAB\_UP}$ by using Km as an input key and by using an IP address of the IAB-DU and the first IP address of the donor-CU-UP as input parameters. It may be understood that the IP address of the IAB-DU is obtained from the IAB-MT after the IAB-DU is started.

If the third response message includes $K_{gNB}^{1}$ and the second parameter, the IAB-DU first derives Km based on $K_{gNB}^{1}$ and the second parameter, and then derives $K_{IAB\_UP}$ by using Km as an input key and by using an IP address of the IAB-DU and the first IP address of the donor-CU-UP as input parameters.

Further, after deriving $K_{IAB\_UP}$, the IAB-DU stores $K_{IAB\_UP}$. For example, the IAB-DU stores a correspondence between $K_{IAB\_UP}$ and the first IP address of the donor-CU-UP in a context of the IAB-DU.

It should be understood that an occasion for obtaining $K_{IAB\_UP}$ by the IAB-DU is not limited in this embodiment of this application.

In an example, the IAB-DU obtains $K_{IAB\_UP}$ when obtaining the first IP address of the donor-CU-UP.

In another example, the IAB-DU obtains $K_{IAB\_UP}$ before initiating an IPsec setup procedure to the donor-CU-UP.

In still another example, the IAB-DU obtains $K_{IAB\_UP}$ after receiving an IPsec authentication request from the donor-CU-UP.

In still another example, the IAB-DU obtains $K_{IAB\_UP}$ after receiving a user plane data request from the UE.

S1019: The donor-CU-CP sends a bearer context modification request message to the donor-CU-UP.

The bearer context modification request message includes the IP address of the IAB-DU.

S1020: The donor-CU-UP sends a bearer context modification response message to the donor-CU-CP.

S1021: The donor-CU-UP derives $K_{IAB\_UP}$.

The donor-CU-UP derives $K_{IAB\_UP}$ by using Km as the input key and by using the IP address of the IAB-DU and the first IP address of the donor-CU-UP as the input parameters.

Km is obtained from the locally stored context of the donor-CU-UP. The first IP address of the donor-CU-UP is determined in S1014.

After deriving $K_{IAB\_UP}$, the donor-CU-UP stores a correspondence between the IP address of the IAB-DU and $K_{IAB\_UP}$ in the context of the donor-CU-UP.

S1022: The UE completes a registration procedure.

Specifically, in S1022, S814 to S820 in the foregoing method 800 are performed.

S1023: The IAB-DU and the donor-CU-UP perform an IKEv2 PSK procedure.

Specifically, S1023 is the same as S821 in the foregoing method 800. For brevity, details are not described herein again.

Figure 11:
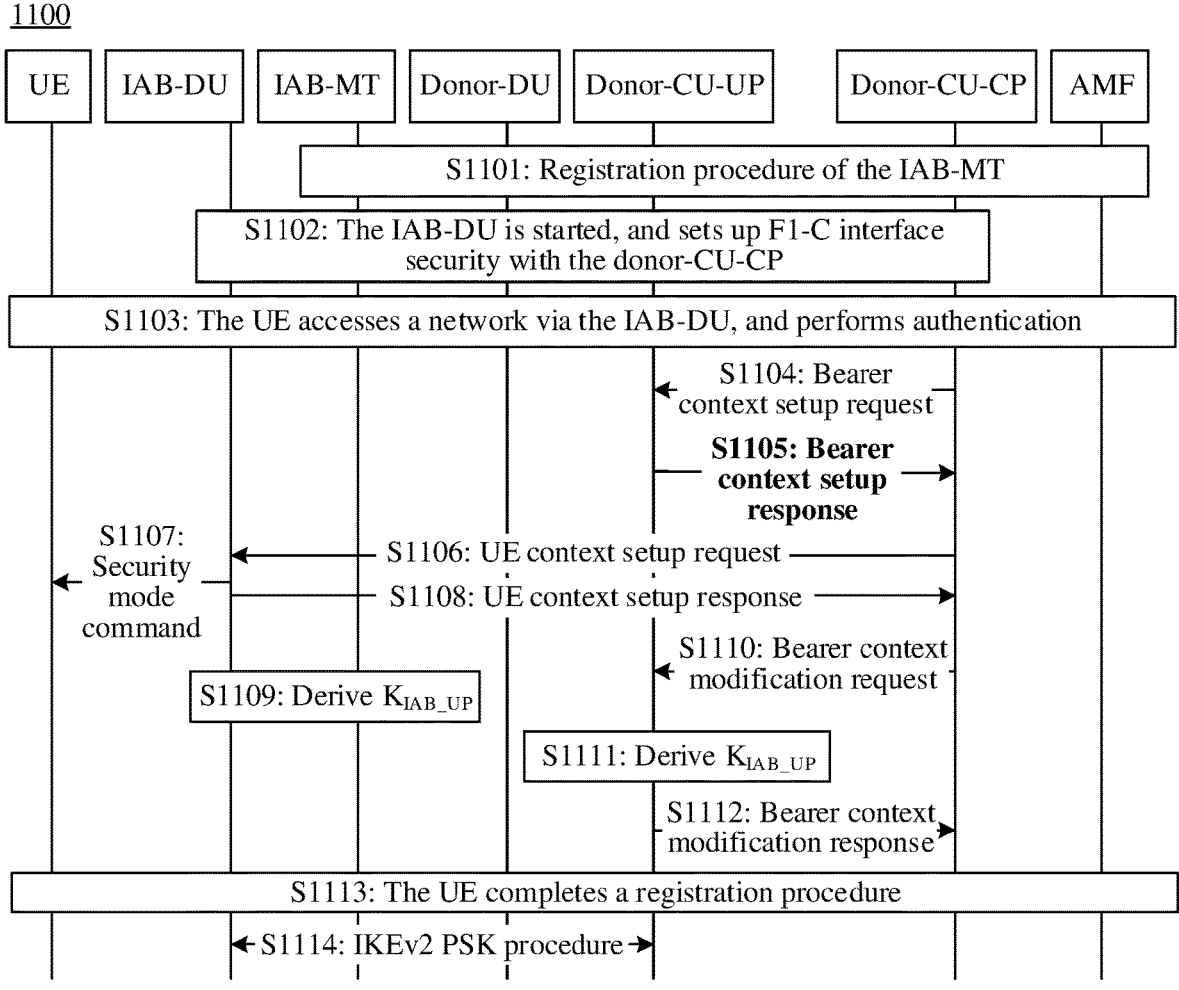

FIG. 11 is a schematic flowchart of a method for establishing a secure transmission channel according to an embodiment of this application. As shown in FIG. 11, the method 1100 includes S1101 to S1114. The following describes the steps in detail.

S1101: Perform a registration procedure of an IAB-MT.

Specifically, S1101 is the same as S801 in the method 800. For brevity, details are not described herein again.

It should be noted that, in S1001, after authentication between the IAB-MT and a core network is completed, an initial context setup request message sent by an AMF to a donor-CU-CP includes a first root key (denoted as $K_{gNB}^{1}$) of a donor node. Further, the donor-CU-CP derives a user plane key #1 based on $K_{gNB}^{1}$, and sends the user plane key #1 to a donor-CU-UP. The user plane key #1 is for establishing a bearer context. The user plane key #1 includes a user plane integrity protection key (denoted as Kupenc) and/or a user plane encryption protection key (denoted as Kupint).

Accordingly, after the authentication between the IAB-MT and the core network is completed, the IAB-MT generates $K_{gNB}^{1}$, and the IAB-MT may derive the user plane key #1 based on $K_{gNB}^{1}$.

S1102: An IAB-DU is started, and sets up F1-C interface security with the donor-CU-CP.

Specifically, S1102 is the same as S802 in the method 800. For brevity, details are not described herein again.

It should be noted that, after the donor-CU-CP and the IAB-DU establish a secure transmission channel of an F1-C interface, the donor-CU-CP marks the IAB-DU as an IAB node by using a first identifier, and stores the first identifier as a context of the IAB node. For example, the first identifier is an IP address of the IAB-DU.

S1103: UE accesses a network via the IAB-DU, and performs authentication.

Specifically, S1103 is the same as S803 in the method 800. For brevity, details are not described herein again.

S1104: The donor-CU-CP sends a bearer context setup request message to the donor-CU-UP.

S1105: The donor-CU-UP sends a bearer context setup response message to the donor-CU-CP.

The bearer context setup response message carries a first IP address of the donor-CU-UP, and the first IP address is for establishing a secure transmission channel of an F1-U interface between the IAB-DU and the donor-CU-UP, to transfer user plane data.

S1106: The donor-CU-CP sends a UE context setup request message to the IAB-DU.

The UE context setup request message includes the first IP address of the donor-CU-UP.

S1107: The IAB-DU sends a security mode command to the UE.

S1108: The IAB-DU sends a UE context setup response to the donor-CU-CP.

S1109: The IAB-DU obtains $K_{IAB\_UP}$.

For example, S1109 includes S11091$a$ to S11093$a$.

S11091$a$: The IAB-DU sends a first request message to the IAB-MT.

The first request message includes the first IP address of the donor-CU-UP, and the first request message requests $K_{IAB\_UP}$.

S11092$a$: The IAB-MT derives $K_{IAB\_UP}$.

After receiving the first request message from the IAB-DU, the IAB-MT derives $K_{IAB\_UP}$ by using the user plane key #1 as an input key and by using the IP address of the IAB-DU and the first IP address of the donor-CU-UP as input parameters, and then sends $K_{IAB\_UP}$ to the IAB-DU. It may be understood that the IP address of the IAB-DU is obtained from an OAM or the donor-CU-CP after the IAB-MT completes registration.

Alternatively, the IAB-MT derives $K_{IAB\_UP}$ by using a key derived from the user plane key #1 as an input key and by using the IP address of the IAB-DU and the first IP address of the donor-CU-UP as input parameters.

S11093$a$: The IAB-MT sends a first response message to the IAB-DU.

The first response message includes $K_{IAB\_UP}$.

Accordingly, after receiving $K_{IAB\_UP}$, the IAB-DU stores $K_{IAB\_UP}$. For example, the IAB-DU stores a correspondence between $K_{IAB\_UP}$ and the first IP address of the donor-CU-UP in a context of the IAB-DU.

For another example, S1109 includes S11091$b$ to S11093$b$.

S11091$b$: The IAB-DU sends a third request message to the IAB-MT.

The third request message requests the user plane key #1.

S11092$b$: The IAB-MT sends a third response message to the IAB-DU.

The third response message includes the user plane key #1.

It should be understood that S11091$b$ and S11092$b$ are optional steps. That is, if the IAB-DU locally stores $K_{gNB}{}^{1}$, S1109 includes only S11093$b$. That is, the IAB-DU may derive the user plane key #1 based on locally stored $K_{gNB}{}^{1}$. $K_{gNB}{}^{1}$ locally stored by the IAB-DU is obtained from the IAB-MT before S1109 is performed. For example, after the IAB-DU is started, the IAB-MT sends $K_{gNB}{}^{1}$ to the IAB-DU when sending the IP address of the IAB-DU to the IAB-DU.

S11093$b$: The IAB-DU derives $K_{IAB\_UP}$.

The IAB-DU derives $K_{IAB\_UP}$ by using the user plane key #1 as an input key and by using the IP address of the IAB-DU and the first IP address of the donor-CU-UP as input parameters. It may be understood that the IP address of the IAB-DU is obtained from the IAB-MT after the IAB-DU is started.

The IAB-DU derives $K_{IAB\_UP}$ by using a key derived from the user plane key #1 as an input key and by using the IP address of the IAB-DU and the first IP address of the donor-CU-UP as input parameters.

Further, after deriving $K_{IAB\_UP}$, the IAB-DU stores $K_{IAB\_UP}$. For example, the IAB-DU stores a correspondence between $K_{IAB\_UP}$ and the first IP address of the donor-CU-UP in a context of the IAB-DU.

It should be understood that an occasion for obtaining $K_{IAB\_UP}$ by the IAB-DU is not limited in this embodiment of this application.

In an example, the IAB-DU obtains $K_{IAB\_UP}$ when obtaining the first IP address of the donor-CU-UP.

In another example, the IAB-DU obtains KIB up before initiating an IPsec setup procedure to the donor-CU-UP.

In still another example, the IAB-DU obtains $K_{IAB\_UP}$ after receiving an IPsec authentication request from the donor-CU-UP.

In still another example, the IAB-DU obtains $K_{IAB\_UP}$ after receiving a user plane data request from the UE.

S1110: The donor-CU-CP sends a bearer context modification request message to the donor-CU-UP.

The bearer context modification request message includes the IP address of the IAB-DU.

Optionally, the bearer context modification request message further includes first indication information, and the first indication information indicates that the IAB-DU belongs to the IAB node. For example, the first indication information may be an independent information element. For example, the first indication information is an "IAB-indicator" information element. For another example, the first indication information may be the IP address of the IAB-DU. That is, the IP address of the IAB-DU may further indicate that the IAB-DU belongs to the LAB node.

Specifically, after determining that the IAB-DU belongs to the IAB node, the donor-CU-CP carries the first indication information in the bearer context modification request message. As described in S1102, the donor-CU-CP may mark, by using the first identifier, that the IAB-DU belongs to the IAB node, and store the first identifier in the context of the IAB-DU. Based on this, the donor-CU-CP may query whether the context of the IAB node includes the first identifier. If the context of the IAB node includes the first identifier, the donor-CU-CP determines that the IAB-DU belongs to the IAB node; or if the context of the IAB node does not include the first identifier, the donor-CU-CP determines that the IAB-DU does not belong to the IAB node.

S1111: The donor-CU-UP derives $K_{IAB\_UP}$.

The donor-CU-UP derives $K_{IAB\_UP}$ by using the user plane key as the input key and by using the IP address of the IAB-DU and the first IP address of the donor-CU-UP as the input parameters.

Alternatively, the donor-CU-UP derives $K_{IAB\_UP}$ by using the key derived from the user plane key as the input key and by using the IP address of the IAB-DU and the first IP address of the donor-CU-UP as the input parameters.

For example, after receiving the bearer context setup request message from the donor-CU-CP, the donor-CU-UP derives $K_{IAB\_UP}$ based on the first IP address that is of the donor-CU-UP and that is included in the bearer context setup response message.

For another example, if the bearer context setup request message includes the first indication information, the donor-CU-UP derives $K_{IAB\_UP}$ based on the first IP address that is of the donor-CU-UP and that is included in the bearer context setup response message. In other words, the donor-CU-UP derives $K_{IAB\_UP}$ after determining, based on the first indication information, that the IAB-DU belongs to the IAB node.

After deriving $K_{IAB\_UP}$, the donor-CU-UP stores a correspondence between the IP address of the IAB-DU and $K_{IAB\_UP}$ in a context of the donor-CU-UP.

S1112: The donor-CU-UP sends a bearer context modification response message to the donor-CU-CP.

S1113: The UE completes a registration procedure.

Specifically, in S1113, S814 to S820 in the foregoing method 800 are performed.

S1114: The IAB-DU and the donor-CU-UP perform an IKEv2 PSK procedure.

Specifically, S1114 is the same as S821 in the foregoing method 800. For brevity, details are not described herein again.

Figure 12:
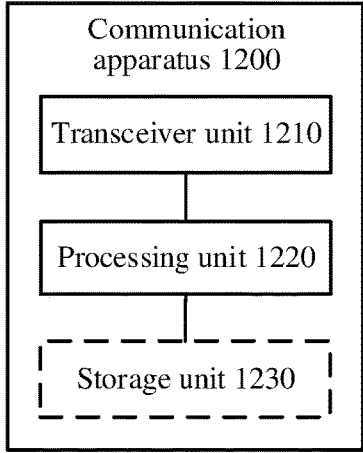
FIG. 12 is a schematic block diagram of a communication apparatus according to an embodiment of this application.
Figure 13:
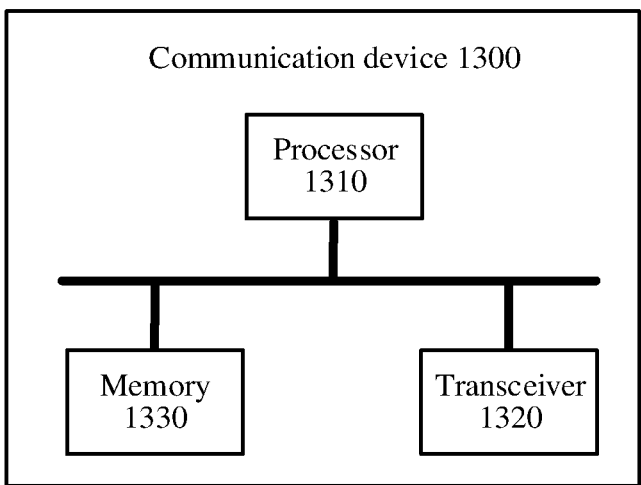
FIG. 13 is a schematic block diagram of a communication device according to an embodiment of this application.

With reference to FIG. 5 to FIG. 11, the foregoing describes in detail the methods provided in embodiments of this application. With reference to FIG. 12 and FIG. 13, the following describes in detail communication apparatuses provided in embodiments of this application. It should be understood that descriptions of the apparatus embodiments correspond to the descriptions of the method embodiments. Therefore, for content that is not described in detail, refer to the foregoing method embodiments. For brevity, details are not described herein again.

In embodiments of this application, a transmitting end device or a receiving end device division may be divided into functional modules based on the foregoing method examples. For example, each functional module may be obtained through division corresponding to each function, or two or more functions may be integrated in one processing module. The integrated module may be implemented in a form of hardware, or may be implemented in a form of a software functional module. It should be noted that, in embodiments of this application, division into the modules is an example, and is merely logical function division. Another division manner may be used during actual implementation. Descriptions are provided below by using an example in which each functional module is obtained through division corresponding to each function.

FIG. 12 is a schematic block diagram of a communication apparatus 1200 according to an embodiment of this application. As shown in the figure, the communication apparatus 1200 may include a transceiver unit 1210 and a processing unit 1220.

In a possible design, the communication apparatus 1200 may be the donor-CU-UP in the foregoing method embodiments, or may be a chip configured to implement a function of the donor-CU-UP in the foregoing method embodiments.

It should be understood that the communication apparatus 1200 may correspond to the session management network element in the method 500 to the method 1100 according to embodiments of this application. The communication apparatus 1200 may include units configured to perform the methods performed by the donor-CU-UP in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. In addition, the units in the communication apparatus 1200 and the foregoing other operations and/or functions are separately for implementing corresponding procedures in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. It should be understood that a specific process in which the units perform the foregoing corresponding steps has been described in detail in the foregoing method embodiments. For brevity, details are not described herein again.

In another possible design, the communication apparatus 1200 may be the donor-CU-CP in the foregoing method embodiments, or may be a chip configured to implement a function of the donor-CU-CP in the foregoing method embodiments.

It should be understood that the communication apparatus 1200 may correspond to the donor-CU-CP in the method 500 to the method 1100 according to embodiments of this application. The communication apparatus 1200 may include units configured to perform the methods performed by the donor-CU-CP in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. In addition, the units in the communication apparatus 1200 and the foregoing other operations and/or functions are separately for implementing corresponding procedures in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. It should be understood that a specific process in which the units perform the foregoing corresponding steps has been described in detail in the foregoing method embodiments. For brevity, details are not described herein again.

In another possible design, the communication apparatus 1200 may be the IAB-DU in the foregoing method embodiments, or may be a chip configured to implement a function of the IAB-DU in the foregoing method embodiments.

It should be understood that the communication apparatus 1200 may correspond to the IAB-DU in the method 500 to the method 1100 according to embodiments of this application. The communication apparatus 1200 may include units configured to perform the methods performed by the IAB-DU in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. In addition, the units in the communication apparatus 1200 and the foregoing other operations and/or functions are separately for implementing corresponding procedures in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. It should be understood that a specific process in which the units perform the foregoing corresponding steps has been described in detail in the foregoing method embodiments. For brevity, details are not described herein again.

In another possible design, the communication apparatus 1200 may be the IAB-MT in the foregoing method embodiments, or may be a chip configured to implement a function of the IAB-MT in the foregoing method embodiments.

It should be understood that the communication apparatus 1200 may correspond to the IAB-MT in the method 500 to the method 1100 according to embodiments of this application. The communication apparatus 1200 may include units configured to perform the methods performed by the IAB-MT in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. In addition, the units in the communication apparatus 1200 and the foregoing other operations and/or functions are separately for implementing corresponding procedures in the method 500 in FIG. 5, the method 600 in FIG. 6, the method 700 in FIG. 7, the method 800 in FIG. 8, the method 900 in FIG. 9, the method 1000 in FIG. 10, and the method 1100 in FIG. 11. It should be understood that a specific process in which the units perform the foregoing corresponding steps has been described in detail in the foregoing method embodiments. For brevity, details are not described herein again.

It should be further understood that the transceiver unit 1210 in the communication apparatus 1200 may correspond to a transceiver 1320 in a communication device 1300 shown in FIG. 13, and the processing unit 1220 in the communication apparatus 1200 may correspond to a processor 1310 in the communication device 1300 shown in FIG. 13.

It should be further understood that, when the communication apparatus 1200 is a chip, the chip includes a transceiver unit and a processing unit. The transceiver unit may be an input/output circuit or a communication interface. The processing unit may be a processor, a microprocessor, or an integrated circuit that is integrated on the chip.

The transceiver unit 1210 is configured to implement a signal receiving and sending operation of the communication apparatus 1200, and the processing unit 1220 is configured to implement a signal processing operation of the communication apparatus 1200.

Optionally, the communication apparatus 1200 further includes a storage unit 1230, and the storage unit 1230 is configured to store instructions.

FIG. 13 is a schematic block diagram of a communication device 1300 according to an embodiment of this application. As shown in the figure, the communication device 1300 includes at least one processor 1310 and a transceiver 1320. The processor 1310 is coupled to a memory, and is configured to execute instructions stored in the memory, to control the transceiver 1320 to send a signal and/or receive a signal. Optionally, the communication device 1300 further includes a memory 1330, configured to store instructions.

It should be understood that the processor 1310 and the memory 1330 may be integrated into one processing apparatus. The processor 1310 is configured to execute program code stored in the memory 1330, to implement the foregoing functions. During specific implementation, the memory 1330 may alternatively be integrated into the processor 1310, or may be independent of the processor 1310.

It should be further understood that the transceiver 1320 may include a receiver (which is also referred to as a receiver) and a transmitter (which is also referred to as a transmitter). The transceiver 1320 may further include an antenna. There may be one or more antennas. The transceiver 1320 may be a communication interface or an interface circuit.

When the communication device 1300 is a chip, the chip includes a transceiver unit and a processing unit. The transceiver unit may be an input/output circuit or a communication interface. The processing unit may be a processor, a microprocessor, or an integrated circuit that is integrated on the chip. An embodiment of this application further provides a processing apparatus, including a processor and an interface. The processor may be configured to perform the methods in the foregoing method embodiments.

It should be understood that the processing apparatus may be a chip. For example, the processing apparatus may be a field programmable gate array (FPGA), an application specific integrated chip (ASIC), a system on chip (SoC), a central processing unit (CPU), a network processor (NP), a digital signal processing circuit (DSP), a micro controller unit (MCU), a programmable controller (PLD), or another integrated chip.

In an implementation process, the steps in the foregoing methods can be completed by using an integrated logic circuit of hardware in the processor, or by using instructions in a form of software. The steps in the methods disclosed with reference to embodiments of this application may be directly performed and completed by a hardware processor, or may be performed and completed by using a combination of the hardware in the processor and a software module. The software module may be located in a mature storage medium in the art, such as a random access memory, a flash, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, the steps in the foregoing method embodiments can be completed by using an integrated logic circuit of hardware in the processor, or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, such as a random access memory, a flash, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the methods in this specification aims to include, but not limited to, these and any memory of another appropriate type.

According to the methods provided in embodiments of this application, this application further provides a computer program product. The computer program product includes computer program code. When the computer program code is run on a computer, the computer is enabled to perform the method in any one of the embodiments shown in FIG. 5 to FIG. 11.

According to the methods provided in embodiments of this application, this application further provides a computer-readable medium. The computer-readable medium stores program code. When the program code is run on a computer, the computer is enabled to perform the method in any one of the embodiments shown in FIG. 5 to FIG. 11.

According to the methods provided in embodiments of this application, this application further provides a system, including the foregoing donor-CU-CP, donor-CU-UP, IAB-DU, and IAB-MT.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

The network side device and the terminal device in the foregoing apparatus embodiments correspond to the network side device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, in a distributed system, and/or across a network such as the internet interacting with another system by using the signal).

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps in the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A key determining method applied to a donor node central unit containing a control plane entity and a user plane entity, the method comprising:

deriving, by the control plane entity, a first key based on a root key, an internet protocol (IP) address of a distributed unit of an integrated access and backhaul node, and a first IP address of the user plane entity, wherein the first key is different from the root key, and wherein the root key is a key obtained by the control plane entity from a network in a procedure in which the integrated access and backhaul node registers with the network; and sending, by the control plane entity, a first message to the user plane entity, wherein the first message comprises a one-to-one correspondence between the first key and the first IP address, and wherein the first key and first IP address are for establishing a user plane secure transmission channel between the user plane entity and the distributed unit.

2. The method according to claim 1, further comprising:

sending, by the control plane entity, first indication information to the user plane entity; and receiving, by the control plane entity, one or more IP addresses from the user plane entity, wherein the one or more IP addresses comprise the first IP address.

3. The method according to claim 2, wherein the one or more IP addresses further comprises a second IP address, the method further comprises:

deriving, by the control plane entity, a second key based on the root key, the IP address of the distributed unit, and the second IP address, wherein the first message comprises the one-to-one correspondence between the first key and the first IP address and a one-to-one correspondence between the second key and the second IP address.

4. The method according to claim 1, wherein the first key is KIAB, and the root key is KgNB.

5. The method according to claim 1 further comprising:

deriving, by the control plane entity, a third key based on the root key, the IP address of the distributed unit, and an IP address of the control plane entity; and establishing, by the control plane entity, a control plane secure transmission channel between the control plane entity and the distributed unit based on the third key.

6. The method according to claim 1 further comprising:

receiving, by the user plane entity, the first message; and establishing, by the user plane entity, a user plane secure transmission channel between the user plane entity and the distributed unit based on the first key and the first IP address.

7. The method according to claim 6, wherein the first message comprises a one-to-one correspondence between a plurality of IP addresses of the user plane entity and a plurality of keys, wherein the plurality of keys comprise the first key, and wherein the first key is corresponding to the first IP address; and the method further comprises:

determining, by the user plane entity, to establish the user plane secure transmission channel by using the first IP address; and determining, by the user plane entity based on the one-to-one correspondence that a key corresponding to the first IP address is the first key.

8. The method according to claim 7 further comprising:

receiving, by the user plane entity, first indication information from the control plane entity; and sending, by the user plane entity based on the first indication information, the plurality of IP addresses to the control plane entity.

9. A system comprising a control plane entity of a donor node central unit and a user plane entity of the donor node central unit, wherein:

the control plane entity comprises at least one first processor and at least one first memory, and is configured to:

derive a first key based on a root key, an internet protocol (IP) address of a distributed unit of an integrated access and backhaul node, and a first IP address of the user plane entity, wherein the first key is different from the root key, and wherein the root key is a key obtained by the control plane entity from a network in a procedure in which the integrated access and backhaul node registers with the network;

send a first message to the user plane entity, wherein the first message comprises a one-to-one correspondence between the first key and the first IP address; and the user plane entity comprises at least one second processor and at least one second memory, and is configured to:

receive the first message; and establish a user plane secure transmission channel between the user plane entity and the distributed unit based on the first key and the first IP address.

10. The system according to claim 9, wherein the control plane entity is further configured to:

send first indication information to the user plane entity; and receive one or more IP addresses of the user plane entity from the user plane entity, wherein the one or more IP addresses comprise the first IP address; and the user plane entity is further configured to:

receive the first indication information from the control plane entity; and send the one or more IP addresses to the control plane entity based on the first indication information.

11. The system according to claim 10, wherein the one or more IP addresses further comprises a second IP address, the control plane entity is further configured to derive a second key based on the root key, the IP address of the distributed unit, and the second IP address, wherein the first message comprises the one-to-one correspondence between the first key and the first IP address and a one-to-one correspondence between the second key and the second IP address.

12. The system according to claim 9, wherein the control plane entity is further configured to:

derive a third key based on the root key, the IP address of the distributed unit, and an IP address of the control plane entity; and establish a control plane secure transmission channel between the control plane entity and the distributed unit based on the third key.

13. A control plane entity of a donor node central unit, wherein the donor node central unit further contains a user plane entity, and the control plane entity comprises:

a memory configured to store a computer program; and a processor configured to invoke the computer program from the memory and run the computer program so as to enable the control plane entity to:

derive a first key based on a root key, an internet protocol (IP) address of a distributed unit of an integrated access and backhaul node, and a first IP address of the user plane entity, wherein the first key is different from the root key, and wherein the root key is a key obtained by the control plane entity from a network in a procedure in which the integrated access and backhaul node registers with the network; and send a first message to the user plane entity, wherein the first message comprises a one-to-one correspondence between the first key and the first IP address, and wherein the first key and first IP address are for establishing a user plane secure transmission channel between the user plane entity and the distributed unit.

14. The control plane entity according to claim 13, wherein the processor is further configured to invoke the computer program from the memory and run the computer program to further enable the control plane entity to:

send first indication information to the user plane entity; and receive one or more IP addresses from the user plane entity, wherein the one or more IP addresses comprise the first IP address.

15. The control plane entity according to claim 14, wherein the one or more IP addresses further comprises a second IP address, and the processor is further configured to invoke the computer program from the memory and run the computer program so as to further enable the control plane entity to derive a second key based on the root key, the IP address of the distributed unit, and the second IP address, wherein the first message comprises the one-to-one correspondence between the first key and the first IP address and a one-to-one correspondence between the second key and the second IP address.

16. The control plane entity according to claim 13, wherein the processor is further configured to invoke the computer program from the memory and run the computer program to further enable the control plane entity to:

derive a third key based on the root key, the IP address of the distributed unit, and an IP address of the control plane entity; and establish a control plane secure transmission channel between the control plane entity and the distributed unit based on the third key.

17. A non-transitory computer-readable storage medium that stores a computer program and, based on the computer program run by a control plane entity of a donor node central unit, the control plane entity is enabled to:

derive a first key based on a root key, an internet protocol (IP) address of a distributed unit of an integrated access and backhaul node, and a first IP address of a user plane entity of the donor node central unit, wherein the first key is different from the root key, and wherein the root key is a key obtained from a network in a procedure in which the integrated access and backhaul node registers with the network; and send a first message to the user plane entity, wherein the first message comprises a one-to-one correspondence between the first key and the first IP address, and wherein the first key and first IP address are for establishing a user plane secure transmission channel between the user plane entity and the distributed unit.

18. The non-transitory computer-readable storage medium according to claim 17, wherein upon the computer program being run by the control plane entity, the control plane entity is further enabled to:

send first indication information to the user plane entity; and receive one or more IP addresses from the user plane entity, wherein the one or more IP addresses comprise the first IP address.

19. The non-transitory computer-readable storage medium according to claim 17, wherein the first key is KIAB, and the root key is KgNB.

20. The non-transitory computer-readable storage medium according to claim 17, wherein upon the computer program being run by the control plane entity, the control plane entity is further enabled to:

derive a third key based on the root key, the IP address of the distributed unit, and an IP address of the control plane entity; and establish a control plane secure transmission channel between the control plane entity and the distributed unit based on the third key.

\*    \*    \*    \*    \*